(12) United States Patent
Yoshizawa et al.

(10) Patent No.: US 6,470,380 B1
(45) Date of Patent: Oct. 22, 2002

(54) SIGNAL PROCESSING DEVICE ACCESSIBLE AS MEMORY

(75) Inventors: Hideki Yoshizawa; Toru Tsuruta; Norichika Kumamoto; Yuji Nomura, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/955,089

(22) Filed: Oct. 21, 1997

(30) Foreign Application Priority Data

Dec. 17, 1996 (JP) ............................................. 8-337205
Aug. 18, 1997 (JP) ............................................. 9-221617

(51) Int. Cl.⁷ ...................... G06F 15/167; G06F 12/00; G06F 15/76
(52) U.S. Cl. ........................ 709/213; 711/147; 712/27; 712/29
(58) Field of Search ............................... 712/28–31, 35; 709/213–216; 711/152, 147, 150, 151

(56) References Cited

U.S. PATENT DOCUMENTS

| 4,441,152 A | * | 4/1984 | Matsuura et al. | 709/251 |
|---|---|---|---|---|
| 4,823,257 A | * | 4/1989 | Tonomura | 717/7 |
| 4,947,318 A | | 8/1990 | Mineo | |
| 4,999,768 A | * | 3/1991 | Hirokawa | 709/213 |
| 5,446,841 A | * | 8/1995 | Kitano et al. | 709/200 |
| 5,455,920 A | * | 10/1995 | Muramatsu | 709/215 |
| 5,504,918 A | * | 4/1996 | Collette et al. | 712/29 |
| 5,528,549 A | * | 6/1996 | Doddington et al. | 365/230.03 |
| 5,590,284 A | * | 12/1996 | Crosetto | 712/244 |
| 5,611,075 A | * | 3/1997 | Garde | 711/153 |
| 5,671,430 A | * | 9/1997 | Gunzinger | 712/28 |
| 5,677,864 A | * | 10/1997 | Chung | 365/63 |
| 5,678,021 A | * | 10/1997 | Pawate et al. | 711/104 |

(List continued on next page.)

FOREIGN PATENT DOCUMENTS

| EP | 0 584 783 A2 | * | 8/1993 |
| EP | 0 679 998 A1 | * | 4/1995 |
| JP | 6308601 A | | 4/1988 |

OTHER PUBLICATIONS

Workshop Notes on Mixing Logic and DRAM: Chips that Compute and Remember, http://iram.CS.Berkeley.EDU/isca97–workshop/notes.html, Int'l. Symposium on Computer Architecture, Denver, CO, pp. 1–9, Jun. 1997.*

Weems, C., Considerations Leading to An Asynchronous SIMD Architectural Approach for Exploiting Mixed Logic Memory, http://iram.CS.Berkeley.edu/isca97–workshop/w2–108.ps, 24th Annual Int'l. Symposium on Computer Architecture, Denver, CO, pp. 1–9, Jun. 1997.*

(List continued on next page.)

Primary Examiner—Zarni Maung
Assistant Examiner—Andrew Caldwell
(74) Attorney, Agent, or Firm—Staas & Halsey LLP

(57) ABSTRACT

A signal processing device is provided by connecting information processing units to each other using communication links and connecting the information processing units to each other and a host processor using an external bus. Parallel and pipe-line processing is accommodated by communication between the information processing units via the communication links and respective storage units of the information processing units and also by communication between the host processor and the information processing units via the external bus and the respective storage units. The host processor can communicate with the information processing units via the external bus through the respective storage units, the storage units being accessible as memory by the host processor. If each information processing unit is implemented on a single chip as an integrated circuit, the signal processing device can be incorporated in a computer in the same manner as conventional memory device are incorporated.

13 Claims, 44 Drawing Sheets

U.S. PATENT DOCUMENTS

| | | | | |
|---|---|---|---|---|
| 5,717,943 A | * | 2/1998 | Barker et al. ................. | 712/20 |
| 5,724,600 A | * | 3/1998 | Ogi ............................. | 712/11 |
| 5,751,987 A | * | 5/1998 | Mahant-Shetti et al. ....... | 711/5 |
| 5,754,795 A | * | 5/1998 | Kuhlman et al. ........... | 709/234 |
| 5,778,244 A | * | 7/1998 | Putnins et al. ................ | 712/15 |
| 5,892,934 A | * | 4/1999 | Yard .......................... | 712/233 |
| 5,964,865 A | * | 10/1999 | McCulloch et al. .......... | 712/35 |
| 5,987,568 A | * | 11/1999 | Adams et al. ............... | 711/118 |
| 6,000,027 A | * | 12/1999 | Pawate et al. ................ | 712/39 |
| 6,026,478 A | * | 2/2000 | Dowling ...................... | 712/24 |
| 6,185,704 B1 | * | 2/2001 | Pawate et al. .............. | 714/719 |

OTHER PUBLICATIONS

Keeton, K., et al., IRAM and SmartSIMM: Overcoming the I/O Bus Bottleneck, http://iram.CS.Berkeley.edu/isuca97–workshop/w2–120–drafts.ps, 24th Annual Int'l. Symposium on Computer Architecture, Denver, CO, pp. 1–9, Jun. 1997.*

Kim, B., et al., IRAM Design for Multimedia Applications, http://iram.CS.Berkeley.edu/isca97–workshop/w2–109.ps, 24th Annual Int'l. Symposium on Computer Architecture, Denver, CO, pp. 1–8, Jun. 1997.*

Asthana, A., A Memory Participative Architectur for High Performance Communication Systems, INFOCOM '94. Networking for Global Communications., 13th Proceedings IEEE, pp. 167–174, Jun. 1994.*

Patterson, D., et al., A Case for Intelligent RAM, IEEE Micro, vol. 17, No. 2, pp. 34–44, Mar. 1997.*

"TMS320C30 Digital Signal Processor," SPRS032A, Texas Instruments, pp. 1–53, Apr. 1996.*

Reifel, M., et al., "Parallel Digital Signal Processing: An Emerging Market," SPRA104, Texas Instruments, pp. 1–10, Feb. 1994.*

Structure and Theory of Parallel Computers, Korean Sennon Publication, pp. 28–35, published Feb. 20, 1996 (English language translation of text of reference cited in the Office Action listed in AN).

Office Action in the corresponding Korean patent application of the above–refrenced application, Korean Patent Office, dated Dec. 16, 2000 (citing the reference listed in AM, including English translation of figures of the reference).

Notice Requesting Opinion (As to Rejection) Korean Patent Office dated Oct. 26, 2000 (and English Translation), pp. 1–4.

Comments and Recommendations, p. 1.

* cited by examiner

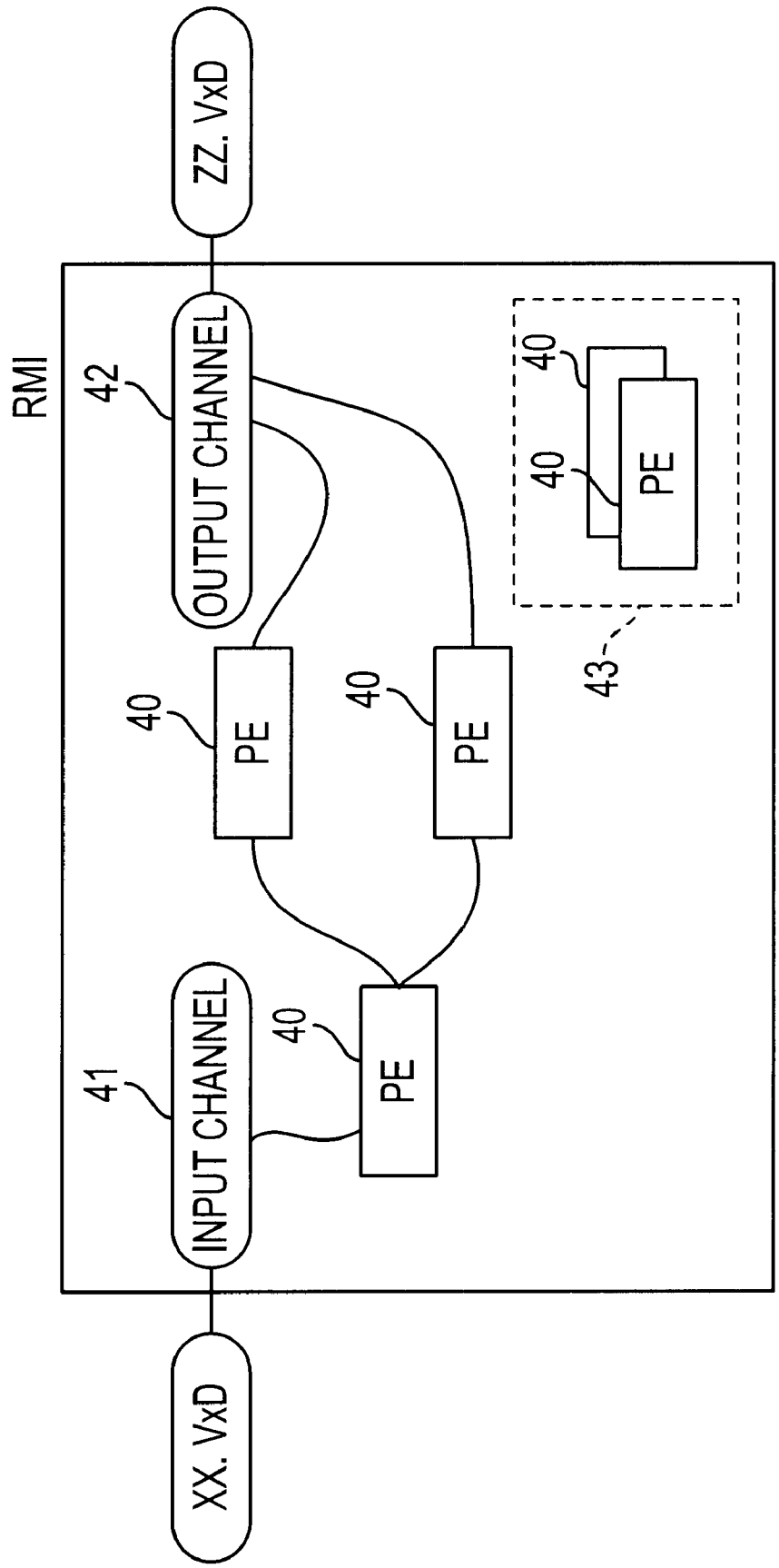

FIG. 10A

| TIME | PE[1] | PE[2] | PE[3] | PE[4] | LK[1,2] | LK[2,3] | LK[3,4] |
|---|---|---|---|---|---|---|---|
| 0 | 0 | 0 | 0 | 0 | 0 | 0 | 0 |
| 1 | 1 | 0 | 0 | 0 | 0 | 0 | 0 |
| 2 | 1 | 2 | 0 | 0 | 0 | 0 | 0 |
| 3 | 0 | 2 | 0 | 0 | 0 | 0 | 0 |
| 4 | 0 | 2 | 3 | 3 | 0 | 0 | M |
| 5 | 0 | 0 | 3 | 3 | 0 | 0 | M |
| 6 | 4 | 4 | 3 | 3 | M | 0 | M |

FIG. 10B

| TIME | PE[1] | PE[2] | PE[3] | PE[4] | LK[1,2] | LK[2,3] | LK[3,4] |
|---|---|---|---|---|---|---|---|
| 0 | 0 | 0 | 0 | 0 | 0 | 0 | 0 |
| 1 | 1 | 0 | 0 | 0 | 0 | 0 | 0 |
| 2 | 1 | 2 | 0 | 0 | 0 | 0 | 0 |
| 3 | 0 | 2 | 0 | 0 | 0 | M | 0 |
| 4 | 3 | 2 | 3 | 0 | M | M | 0 |
| 5 | 3 | 0 | 3 | 0 | M | M | 0 |
| 6 | 3 | 4 | 3 | 4 | M | 2M | M |

FIG. 11A

| NUMBER OF PEs | 8 |
|---|---|
| NUMBER OF TRIALS | 1023 |
| ALLOCATION RATE | 5/6 |
| RELEASE RATE | 1/6 |
| NUMBER OF REQUESTED PEs | 1 ~ 5 |

FIG. 11B

|  | SAME | SMALLER IN PROPOSED ALGORITHM | SMALLER IN SIMPLE ALGORITHM | TOTAL |
|---|---|---|---|---|
| NUMBER | 856 | 113 | 54 | 1023 |
| PERCENTAGE | 83.68% | 11.05% | 5.28% | 100% |

DATA WORD

KEY-CODE : 01001110

0110001111110101011001110111010111111000001011110000100001000100

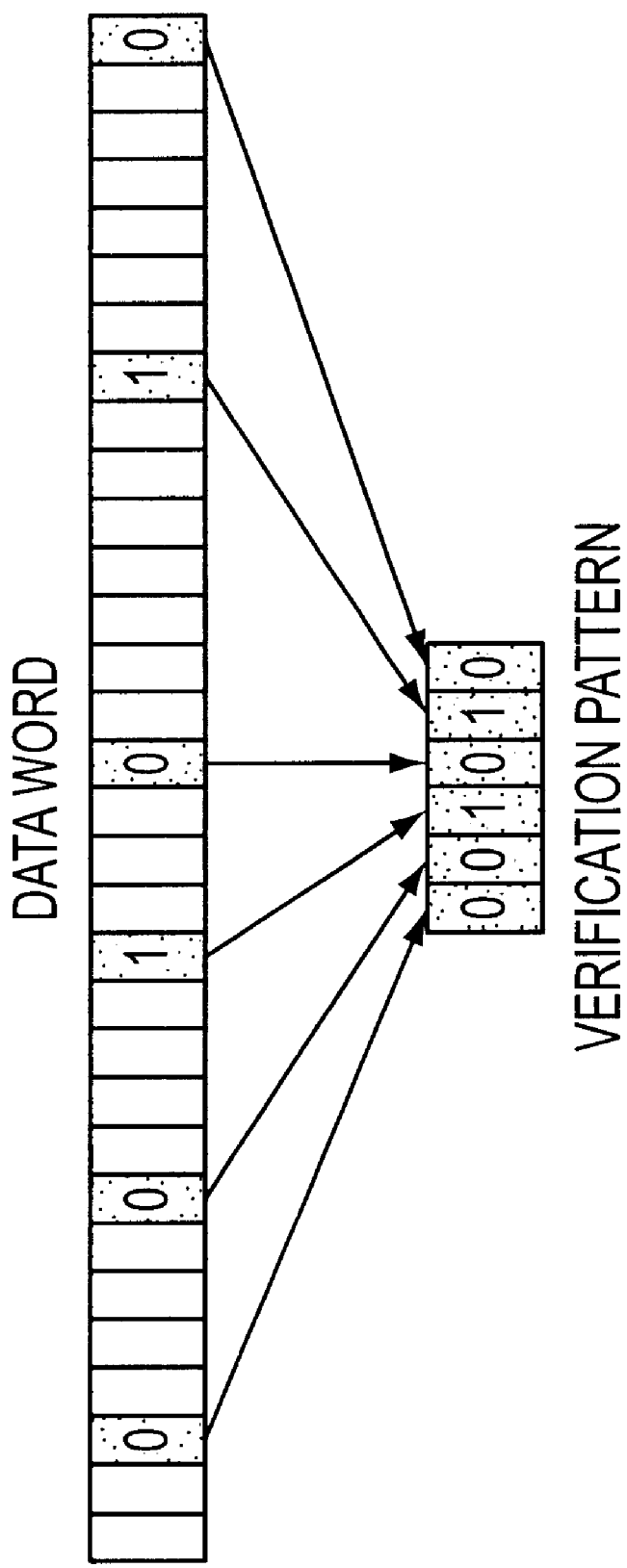
F I G. 35

FIG. 37

| ACCEPTED DATA WORD | 000000000000000000000000000000000<br>111111111111111111111111111111111 |
|---|---|
| REJECTED DATA WORD | 010101001010101001010010101010<br>00000000000000000000000000000001<br>0111111111111111111111111111111111 |

SIGNAL PROCESSING DEVICE ACCESSIBLE AS MEMORY

BACKGROUND OF THE INVENTION

1. Field of the Invention

The present invention generally relates to data processing devices, and particularly relates to a signal processing accelerator which is incorporated into a personal computer to effect high-speed processing of multi-media data or the like.

2. Description of the Related Art

Recent expansion in the number of application fields of data processing has resulted in an increasing demand for a device which can process a vast amount of data such as image and audio data at high speed. In particular, multimedia equipment is required to process image and audio data or the like at high speed in line with the display speed of moving pictures.

Multi-media equipment for high-speed data processing generally has a system configuration which incorporates a number of pieces of dedicated hardware for respective signal processing. When high-speed data processing is achieved through dedicated hardware, however, such a system has drawbacks in costs and lack of expandability and upgradability of the equipment. That is, costs are incurred with respect to design, development, and manufacture of dedicated hardware for respective signal processing, so that a resulting system incorporating the dedicated hardware becomes expensive. Further, dedicated hardware is designed for specific data processing, and, thus, is limited in use thereof because only limited types of processing is executable by such hardware. A problem of lack of expandability and upgradability thus arises when there is a need to apply the hardware to a new application field.

Recent enhancement in speed and performance of general-purpose processors has made it possible to use general-purpose processors for high-speed data processing. When compared with systems of dedicated hardware described above, systems employing such general-purpose processors are characterized in that software is used for achieving various signal processing functions. Such software-based systems for achieving various signal processing functions have advantages in that they are implemented at relatively low cost and have superior functional expandability when compared to the dedicated-hardware systems.

However, software-based systems employing general-purpose processors have disadvantages as follows.

First, since general-purpose processors in these software-bases systems are required to run operating systems (OSs), the general-purpose processors cannot be used exclusively for signal processing. Namely, since OS tasks need to be executed during the signal processing, it is difficult to sufficiently step up the signal processing speed. This poses a problem, especially, when real-time processing is required.

Second, general-purpose processors are designed for handling general data operations, but are not suitable for signal processing. Because of this, general-purpose processors cannot exhibit desirable performance in a field such as image processing where parallel data processing is preferred.

Third, when data transfer is conducted via a bus between a general-purpose processor, memories, I/O ports, etc., an increase in bus access may result in access collisions between data transfer for the signal processing and data transfer for other processes such as OS tasks, thereby reducing the speed of data transfer. For example, when data is first transferred from an I/O port to a memory, then transferred many times between the memory and a general-purpose processor to carry out signal processing, and finally transferred from the memory to the I/O port, the frequency of bus access is quite high. In such a case, a decrease in data-transfer speed due to access collisions cannot be avoided.

The software-based signal processing systems employing general-purpose processors also have a problem in that a sufficient data processing speed cannot be achieved because of the three reasons identified above. This problem becomes particularly conspicuous when a plurality of signal processing operations need to be simultaneously carried out as required in multi-media signal processing.

On the other hand, a system configuration which incorporates DSPs (digital signal processors) or the like specifically designed for signal processing can achieve processing of image and audio data at such a speed as to meet various requirements. Further, so-called multi-media-extended-instruction-set processors (e.g., P55C of the Intel corporation) are now available, and these processors are equipped with signal processing functions as extended instructions in addition to an original set of instructions.

Such a system, however, incurs additional costs for design, development, and manufacture of dedicated hardware portions for signal processing. Also, bus collisions at a time of data transfer place a cap on the data processing speed as described above. Accordingly, this system cannot exhibit a desirable performance because of bus-access conflict between a plurality of signal processing operations particularly when such a plurality of signal processing operations need to be simultaneously carried out as in multi-media signal processing.

Accordingly, there is a need for an architecture of a signal processing accelerator which is incorporated into a personal computer or the like and can achieve a sufficient signal processing speed at a relatively low cost.

SUMMARY OF THE INVENTION

Accordingly, it is a general object of the present invention to provide a signal processing accelerator having an architecture which can satisfy the need described above.

It is another and more specific object of the present invention to provide a signal processing accelerator having an architecture which is incorporated into a personal computer or the like and can achieve a sufficient signal processing speed at a relatively low cost.

In order to achieve the aforementioned objects according to the present invention, a device for signal processing includes a plurality of information processing units and communication links connected between the information processing units. Each of the information processing units includes a signal processing unit for processing data, a communication control unit for communicating with other information processing units via the communication links, and a storage unit for storing data and programs executed by the signal processing unit. The storage unit is used for data exchange between each of the information processing units and an external bus.

In the device described above, the plurality of information processing units can communicate with each other without using the external bus, so that high-speed signal processing is achieved by avoiding a reduction in data processing speed caused by bus conflict. Further, a plurality of processes such as image processing and audio processing can be allocated to different information processing units, so that this device is suited to multi-media signal processing which requires processing of a plurality of different signals.

According to one aspect of the present invention, the storage unit includes a memory for storing the data and the programs and a memory control unit for controlling the memory such that the memory is accessible from the external bus when the data exchange is conducted.

Accordingly, if the signal processing unit, the communication control unit, and the storage unit are implemented on a single chip as an integrated circuit, the device can be incorporated in a personal computer or the like in the same manner as conventional memory devices are incorporated. Because of this, costs for incorporating the above device can be included in the costs of the memory devices, and the device inserted into the memory devices can be utilized by using software. In this manner, costs of hardware extension can be reduced while providing a system having a functional expandability.

According to another aspect of the present invention, the memory control unit includes a key-data storage unit for storing key information, and controls the memory such that the memory is accessible from the external bus only when data matching the key information is provided from the external bus.

In the device described above, the memory of the storage unit is generally conditioned so as not to be accessible as a memory from the external bus, thereby preventing the operation system of a host processor from taking control of the memory for use as an OS memory space. Only when the keys are unlocked, will data exchange between the host processor and the information processing units become possible.

According to yet another aspect of the present invention, when a process is comprised of procedures which can be simultaneously carried out in parallel, the information processing units are operated in parallel, thereby achieving high-speed data processing.

According to yet another aspect of the present invention, when a process is comprised of procedures among which a given procedure requires results of another procedure and any procedure needs to be repeated, the information processing units are operated in a pipe-line manner such that all procedures are carried out at the same time by respective information processing units, thereby achieving high-speed data processing.

According to still another aspect of the present invention, when a host processor (CPU) generates an interruption upon fetching and decoding a particular instruction, the information processing units can serve as a virtual machine by executing this instruction on behalf of the host processor. This configuration allows the system to run a program as if the host processor executed such an instruction.

According to further aspect of the present invention, a first resource-management program and a second resource-management program are provided in an application interface layer and a device-driver layer, respectively, and control process allocation and data connection as well as hardware of the information processing units. Because of this configuration, data to be processed does not have to be brought all the way up to the uppermost application layer where user programs and application programs reside, so that efficient processing is carried out with regard to data transfer.

Other objects and further features of the present invention will be apparent from the following detailed description when read in conjunction with the accompanying drawings.

BRIEF DESCRIPTION OF THE DRAWINGS

FIG. 3 is an illustrative drawing showing resource allocation of the signal processing accelerator under the control of the resource-management programs shown in FIG. 2;

FIG. 10A is a table chart showing results obtained when the dynamic-process-allocation algorithm is used;

FIG. 10B is a table chart showing results obtained when a simple allocation algorithm is used;

FIG. 11A is a table chart showing simulation conditions;

FIG. 11B is a table chart showing simulation results;

FIG. 35 is an illustrative drawing for explaining a process of making a pattern check using a predetermined set of bits included in data;

FIG. 37 is an illustrative drawing for explaining a pattern-check process which is performed based on whether a supplied data word is comprised of a predetermined pattern;

DETAILED DESCRIPTION OF THE PREFERRED EMBODIMENTS

In the following, embodiments of the present invention will be described with reference to the accompanying drawings.

Figure 1:
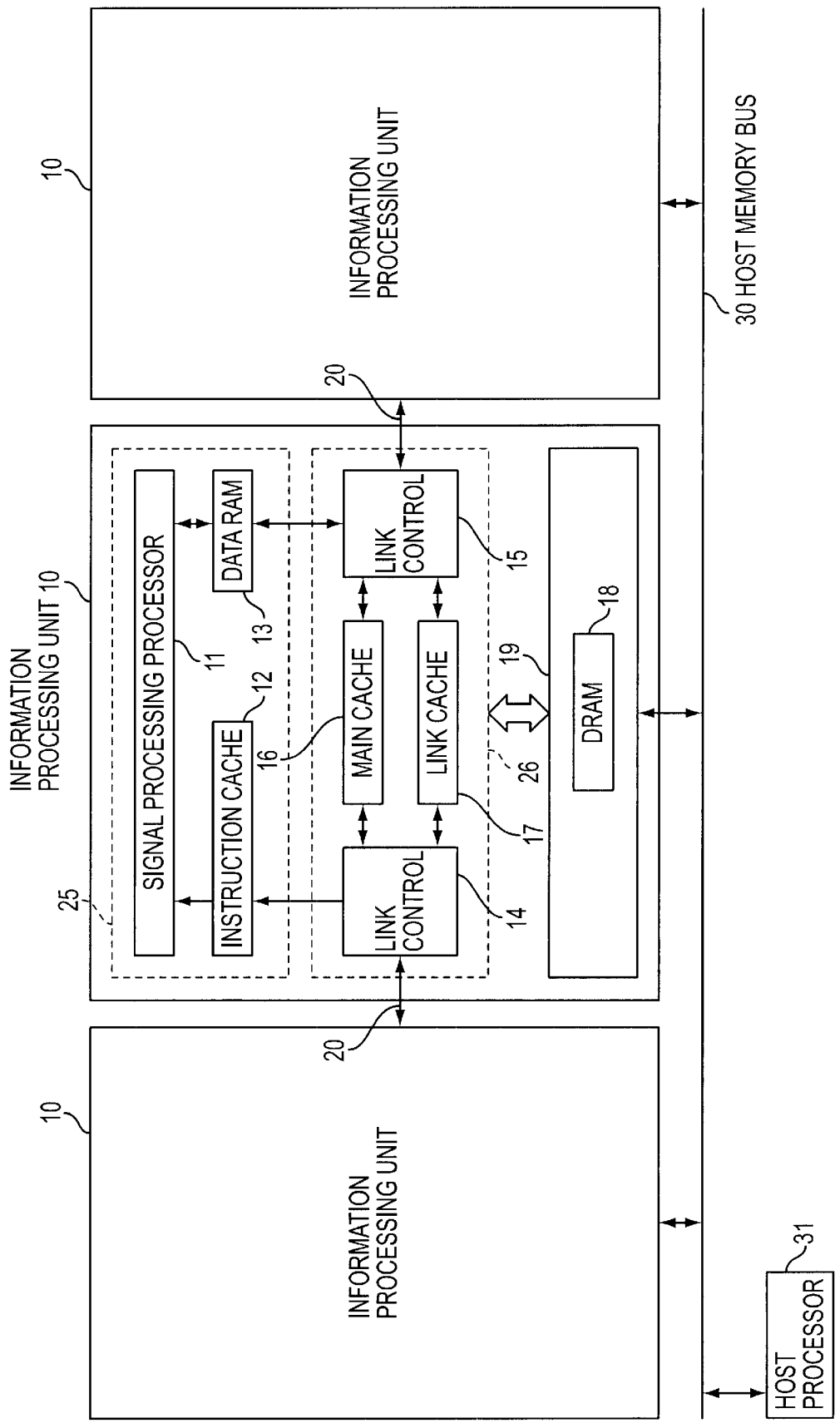
FIG. 1 is a block diagram of a signal processing accelerator according to the present invention.

FIG. 1 is a block diagram of a signal processing accelerator according to the present invention. The signal processing accelerator of FIG. 1 includes a plurality of information processing units 10 which are identical to each other. Each of the information processing units 10 is connected with each other, and, also, is connected to a host memory bus 30.

The information processing unit 10 includes a signal processing processor 11, an instruction cache 12, a data RAM 13, link-control units 14 and 15, a main cache 16, a link cache 17, a DRAM 18, and a DRAM controller 19. The signal processing processor 11, the instruction cache 12, and the data RAM 13 together make up a signal processing unit 25. The link-control units 14 and 15, the main cache 16, and the link cache 17 together form a communication-control unit 26.

A communication link 20 is connected to each of the link-control units 14 and 15. The information processing units 10 are connected in series via the communication links 20 so that each information processing unit 10 can directly communicate with adjacent information processing units 10 via the communication links 20. Communication between two information processing units 10 which are spaced apart from each other can be effected by successively propagating communication data through intervening information processing units 10 from a given unit to the next unit. FIG. 1 shows three information processing units 10 as an example, but any number of information processing units 10 can be provided. Each of the information processing units 10 is connected to the host memory bus 30 via the DRAM controller 19. A host processor 31 is connected to the host memory bus 30.

The signal processing processor 11 carries out signal processing functions. The instruction cache 12 is a cache memory for storing instructions which are frequently used by the signal processing processor 11. Programs carried out by the signal processing processor 11 are stored in the DRAM 18 in addition to the instruction cache 12. The data RAM 13 is used as a memory work area for saving intermediate results or the like obtained while the signal processing processor 11 attends to data processing.

The main cache 16 and the link cache 17 are cache memories for storing data which is processed by the signal processing processor 11. The main cache 16 stores data which is extracted from the DRAM 18 of the same information processing unit 10, whereas the link cache 17 holds data which is transferred from other information processing units 10 via the link-control units 14 and 15. Even when the data stored in the main cache 16 is swapped out, the same data can be retrieved from the DRAM 18 of the same information processing unit 10 when it becomes necessary. On the other hand, if the data in the link cache 17 is swapped out, the same data has to be brought in from other information processing units 10 via the communication links 20. If the main cache 16 and the link cache 17 are structured as one and the same cache memory, a problem may arise in that data transferred from another information processing unit 10 may be swapped out despite a heavy communication load in order to secure storage of data extracted from the DRAM 18 of the same information processing unit 10. Because of this, the main cache 16 and the link cache 17 are provided as separate cache memories in accordance with different functions thereof.

The information processing unit 10 is connected to the host memory bus 30 via the DRAM controller 19, which includes the DRAM 18. Memory space of the DRAM 18 is controlled by the DRAM controller 19, and is allocated to physical address space controlled by the host processor 31. By using physical addresses allocated to the DRAM 18, the host processor 31 can exchange data with the information processing unit 10. Namely, the host processor 31 accesses the DRAM 18 via the host memory bus 30, and writes data and programs in the DRAM 18. The information processing unit 10 uses the data stored in the DRAM 18 as input data, and executes the programs in the DRAM 18 so as to carry out required data processing.

During the data processing, the plurality of information processing units 10 carry out parallel processing or pipe-line processing by communicating with each other. For example, some of the information processing units 10 may perform parallel image-data processing, while other information processing units 10 carry out parallel audio-data processing. As previously described, communications between the plurality of information processing units 10 are conducted via the communication links 20. Because of these dedicated communication links, the host memory bus 30 can provide a data-transfer route for other processes such as OS processes of the host processor 31 without paying attention to the communications between the information processing units 10.

Each of the information processing units 10 stores processed data in the DRAM 18. The host processor 31 accesses the DRAM 18 via the host memory bus 30 so as to read the processed data from the DRAM 18.

The signal processing accelerator of FIG. 1 includes the plurality of information processing units 10 which can communicate with each other without using the host memory bus 30 to carry out parallel processing, so that high-speed signal processing is achieved without suffering a decrease in data processing speed which would be caused by bus-access conflict. Further, each of the information processing units 10 may be assigned to each of a plurality of processes in image processing and/or audio processing, so that the signal processing accelerator of FIG. 1 is suitable for multi-media signal processing since such processing requires simultaneous processing of different signals.

Moreover, the signal processing unit 25 (i.e., the signal processing processor 11, the instruction cache 12, and the data RAM 13), the communication-control unit 26 (i.e., the main cache 16, the link cache 17, and the link-control units 14 and 15), and the memory (i.e., the DRAM 18 and the DRAM controller 19) may be implemented as an integrated circuit on one chip. In this manner, the signal processing accelerator of FIG. 1 can be incorporated into a personal computer in the same manner as prior-art memory devices are incorporated. Because of this, costs for incorporating the signal processing accelerator can be included into the costs of the memory devices, and the signal processing accelerator inserted in the memory devices can be utilized by using software. In this manner, costs of hardware extension can be reduced while providing a system having a functional expandability.

Figure 2:
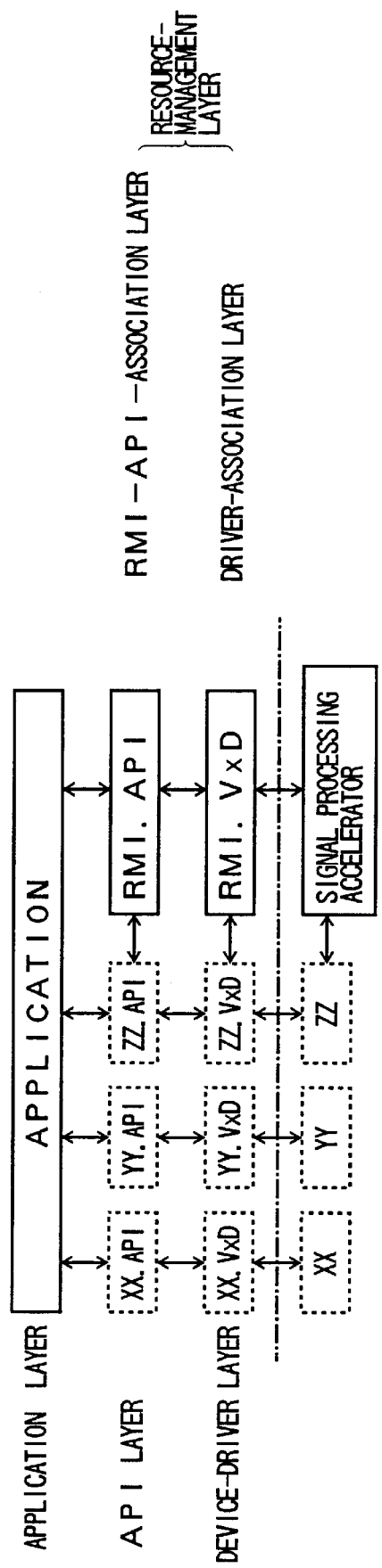
FIG. 2 is an illustrative drawing showing software architecture corresponding to the hardware architecture of the signal processing accelerator shown in FIG. 1.

FIG. 2 is an illustrative drawing showing a software architecture corresponding to the hardware architecture of the signal processing accelerator shown in FIG. 1.

FIG. 2 shows a hierarchy of software structure with regard to a personal computer by superimposing a software structure of the present invention on that of the prior art. In the prior art, a hierarchical structure of software includes an application layer, an API (application interface) layer, and a device-driver layer. The application layer includes user programs and application programs such as Windows application programs. The API layer includes programs such as dynamic loading libraries which are dynamically loaded at a time of process execution. The device-driver layer includes device drivers for controlling hardware of various devices. In FIG. 2, the API layer includes three dynamic loading libraries XX.API, YY.API, and ZZ.API. Each of these library programs operates device hardware XX, YY, and ZZ, respectively, by using device drivers XX.VxD, YY.VxD, and ZZ.VxD, respectively, located in the device-driver layer. The device hardware XX, YY, and ZZ include a hard drive, a display, a memory, a DSP, etc.

The software architecture of the present invention includes a dynamic loading library RMI.API in the API layer for operating the signal processing accelerator of the present invention, and further includes a device driver RMI.VxD in the device-driver layer for controlling the signal processing accelerator.

RMI.API is a dynamic loading library for carrying out processes such as allocation of resources (the information processing units 10) provided in the signal processing accelerator, and is communicable with other dynamic loading libraries of the prior art. The layer which includes RMI.API can be regarded as the API layer as in the prior art. Since this layer serves as a venue in which RMI.API communicates with other dynamic loading libraries, however, this layer is also referred to as an RMI-API-association layer when discussing some features of the present invention.

RMI.VxD is a device driver for controlling the hardware of the signal processing accelerator, and can exchange data with other prior-art device drivers. The layer which includes RMI.VxD can be regarded as the device-driver layer as in the prior art. Since this layer serves as a venue in which RMI.VxD communicates with other device drivers, however, this layer is also referred to as an driver-association layer when discussing some features of the present invention.

The RMI.VxD controls resources (the information processing units 10) of the hardware, but processes closer to the user-application level such as allocation of resources are carried out by RMI.API. Since functional differences between RMI.API and RMI.VxD are not so distinctive as to provide a clear boundary, the RMI-API-association layer and the driver-association layer are collectively referred to as a resource-management layer in the present invention.

Drawbacks of the prior-art software architecture will be illustrated below by taking an example in which an application program applies data processing using the device YY to data stored in the device XX, and outputs processed data to the device ZZ. In this example, the data is brought to the application layer from the device XX via XX.VxD and XX.API in the hierarchy of the software structure shown in FIG. 2. Then, the data is supplied to the device YY via YY.API and YY.VxD. After processing of the data, processed data is brought up to the application layer again, and, finally, is provided to the device ZZ via ZZ.API and ZZ.VxD. Moving the data back and forth between the device hardware and the uppermost layer of the software hierarchy corresponds to repeated data transfer via a bus between respective hardware devices.

In the software architecture of the present invention, when an application program makes a request for processing of data using the signal processing accelerator and outputting of processed data to the device ZZ, RMI.VxD in the resource-management layer receives data from the device driver XX.VxD, and uses the signal processing accelerator for processing of the data before supplying the processed data to the device driver ZZ.VxD. In this manner, there is no need to bring up data all the way to the uppermost layer of the software hierarchy. This is equivalent to reducing the number of bus accesses to a minimum level when data transfer via a bus is taken into consideration.

In multi-media data processing in which a plurality of processes need to be simultaneously carried out as in image-data processing and audio-data processing, the hierarchical software structure of the prior art suffers an increasing number of data transfers between the uppermost application layer and a plurality of devices as the number of processes increases. On the other hand, the hierarchical software structure of the present invention is provided with the resource-management layer which controls the signal processing accelerator to carry out a plurality of processes simultaneously, so that there is no need to bring data all the way up to the uppermost application layer, thereby achieving effective processing in terms of data transfer.

FIG. 3 is an illustrative drawing showing resource allocation of the signal processing accelerator under the control of the resource-management programs (RMI.API and RMI.VxD) in the resource-management layer. As previously described, RMI.API mainly controls resource allocation while RMI.VxD controls hardware in actual data processing.

In FIG. 3, a resource-management program RMI controls a plurality of PEs (processor elements) 40. Each of the PEs 40 corresponds to a respective one of the signal processing processors 11 in FIG. 1, and conceptually represents a data processing function of the signal processing processor 11. An input channel 41 is a pointer pointing to the device driver XX.VxD, and an output channel 42 is a pointer pointing to the device driver ZZ.VxD. In this manner, the resource-management program RMI receives data from the device driver XX.VxD, and uses the plurality of the PEs 40 for processing the data before outputting the processed data to the device driver ZZ.VxD. If input and output device drivers are different from those of this example, reference destinations by the input channel 41 and the output channel 42 are changed.

The resource-management program RMI receives from a user program a pointer pointing to an input-data origin, a pointer pointing to an output-data destination, information on execution programs which are to be executed by the PEs 40, and information about how to connect the PEs 40. The execution programs to be executed by the PEs 40 are written specifically for the signal processing accelerator of FIG. 1, and each of the execution programs may be a program module executed by the respective PEs 40, which serves as a processing element. In this case, the number of execution programs is the same as the number of the PEs 40 to be used. The user program loads the dynamic loading library RMI.API first, and, then, specifies the input-data origin, the output-data destination, names of the execution programs, and connections between the execution programs.

The resource-management program RMI selects a required number of PEs 40 from available PEs 40 stored in a free-resource stack 43, and allocates the selected PEs 40 to respective processing of the execution programs. Further, the resource-management program RMI arranges the input channel 41, the allocated PEs 40, and the output channel 42 so as to establish a connection for data processing between the device driver XX.VxD pointed to by the input channel 41 and the device driver ZZ.VxD pointed to by the output channel 42. After the data processing, the resource-management program RMI releases the allocated PEs 40, and stores them in the free-resource stack 43.

When an execution of a process is requested during an execution of another process, the resource-management program RMI selects a requested number of PEs 40 from available PEs 40 stored in the free-resource stack 43, and allocates the selected PEs 40 to the new process. Control following the allocation is the same as before.

Figure 4A:
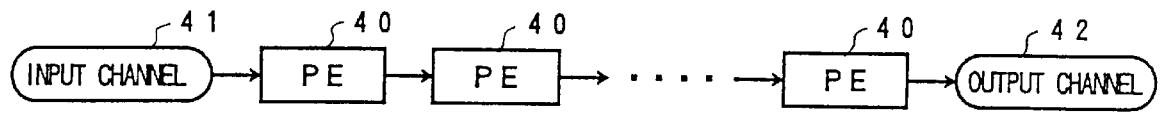
FIGS. 4A through 4C are illustrative drawings showing examples of connections between processor elements.
Figure 4B:
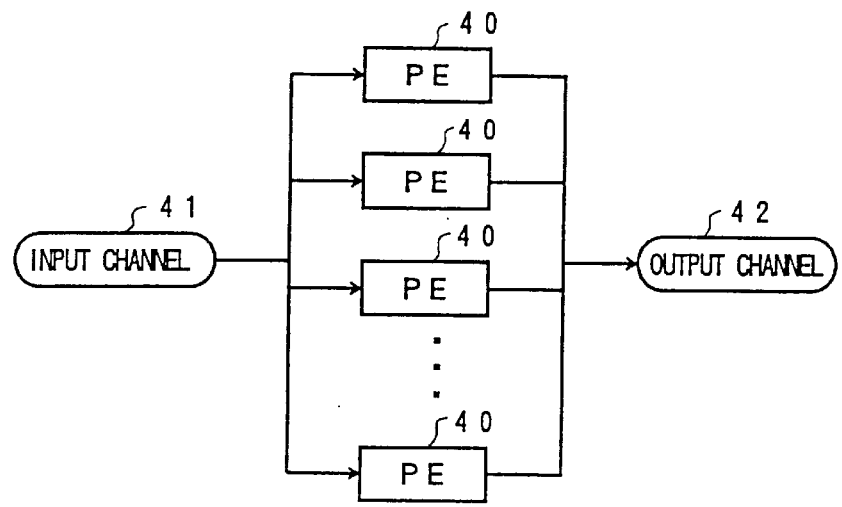
Figure 4C:
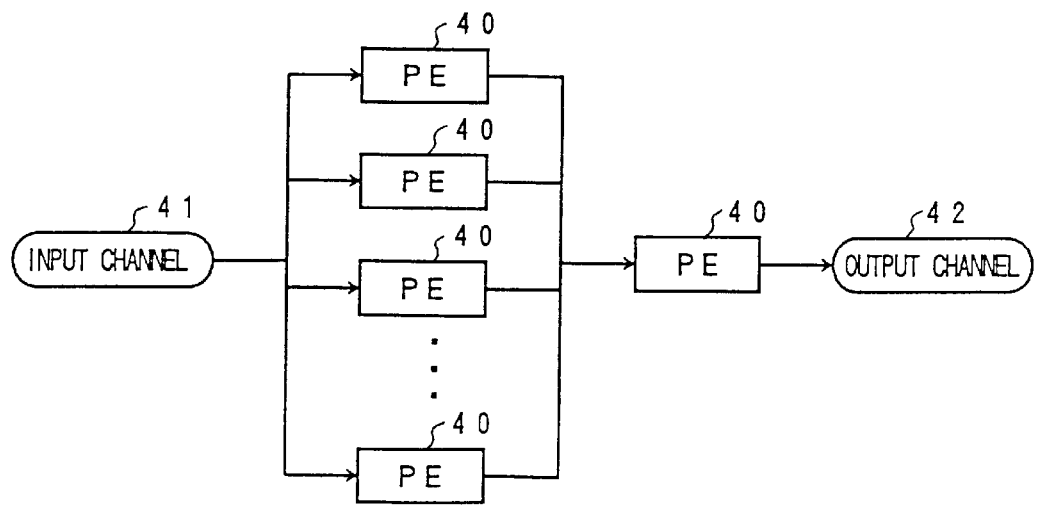

FIGS. 4A through 4C are illustrative drawings showing examples of connections between the PEs 40.

FIG. 4A shows a configuration in which the PEs 40 are arranged in series to carry out pipe-line processing. In computation of computer graphics, for example, various data processing operations are involved, including geometric transformation computation which divides objects into polygons and obtains vertex coordinates, colors, reflection indexes, etc., rasterizing computation which scans interiors of the polygons after dividing the interiors into scan lines, texture mapping computation which maps texture onto pixels on each scan line, and Z-buffer computation which carries out hidden-surface processing based on a distance of each pixel from the viewpoint. In this example, the PEs 40 arranged in series as shown in FIG. 4A are each allocated to the geometric transformation computation, the rasterizing computation, the texture mapping computation, and the Z-buffer computation so as to achieve high-speed processing through a pipe-line operation of these computations.

FIG. 4B shows a configuration in which the PEs 40 are arranged in parallel to perform parallel processing. In image processing, for example, a Laplacian filter is often applied to an image in order to enhance edges. In such a case, a filtering operation needs to be conducted at each position within the image. The configuration of FIG. 4B may be applied to this case by dividing the image into a plurality of small portions and allocating the PEs 40 to filtering operations of respective portions. In this manner, the filtering operation in its entirety can be carried out in parallel, thereby achieving high-speed processing.

The pipe-line operation by a series connection as shown in FIG. 4A can be combined with the parallel processing by a parallel connection as shown in FIG. 4B. FIG. 4C shows an example of connections of the PEs 40 which combines the series connection and the parallel connection. When two images are matched with each other, for example, products of pixel values between the two images are obtained with respect to each pixel, and, then, a sum of the products is calculated. In such a case, PEs 40 arranged in parallel may be used for calculating products of pixel values at a plurality of portions within the image frame, and a PE 40 connected in series with these PEs 40 may be used for obtaining the sum of the products. In this manner, high-speed processing is achieved.

As shown in FIG. 3, the resource-management program RMI in the resource-management layer controls the resource allocation of the signal processing accelerator. Performance of the system will be greatly affected by how PEs 40 (free resources) are allocated to respective programs.

For example, assume that the signal processing accelerator is comprised of four information processing units 10 (i.e., four PEs 40). Further, assume that a process includes two procedures, and each procedure is carried out by a single PE 40. The amount of data transfer between two PEs 40 in operation is denoted as M. In a description given below, two such processes are carried out by allocating the four PEs 40.

Figure 5A:
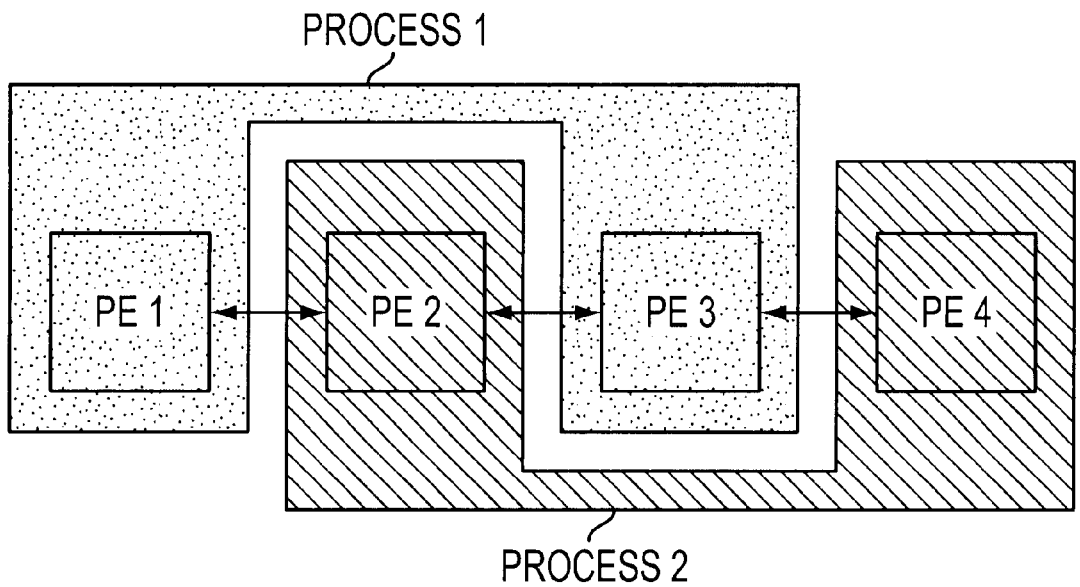
FIGS. 5A and 5B are illustrative drawings showing two different allocations of processes.
Figure 5B:
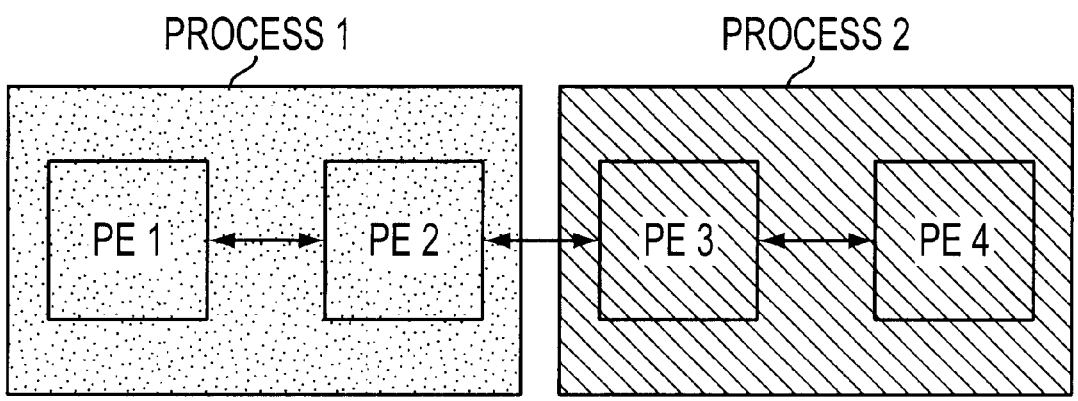

FIGS. 5A and 5B are illustrative drawings showing two different allocations of processes.

In FIG. 5A, a process 1 is allocated to processor elements PE1 and PE3, and a process 2 is allocated to processor elements PE2 and PE4. Since the amount of data transfer between two PEs allocated to the same process is M, M data transfer is conducted between PE1 and PE3 via PE2. By the same token, M data transfer is present between PE2 and PE4 via PE3. Therefore, the amount of data transfer is M between PE1 and PE2, is 2M between PE2 and PE3, and is M between PE3 and PE4.

In FIG. 5B, the process 1 is allocated to the processor elements PE1 and PE2, and the process 2 is allocated to processor elements PE3 and PE4. In this case, the amount of data transfer is M between PE1 and PE2 as well as between PE3 and PE4. No data transfer is present between PE2 and PE3.

If the capacity of data transfer through a link connecting adjacent PEs is 1.5 Mbit/sec, for example, the configuration of FIG. 5A cannot allow both processes to run at the same time. On the other hand, the configuration of FIG. 5B achieves simultaneous computation of both processes. In this manner, the way in which the processes are allocated determines the amount of data transfer on each link, creating one case in which simultaneous computation is possible and the other case in which simultaneous computation is impossible. When simultaneous computation is impossible, data processing speed as a whole is bound to decrease. How many PEs 40 are requested at what timing is totally unknown before the request is actually made, so that allocation of the PEs 40 should be dynamically handled. Because of this, there is a need for an efficient dynamic-process-allocation algorithm.

In the following, a dynamic-process-allocation algorithm according to the present invention will be described. This dynamic-process-allocation algorithm allocates resources according to two criteria. The first criterion requires that data transfer of an allocated process causes the least interference possible to other data transfers. The second criterion requires that a next process can be allocated to cause the least interference possible to other data transfers after the allocation of a current process.

First, various amounts of data transfers on transfer links which result from allocation of a given process are estimated, and a maximum amount of data transfer is identified. This maximum amount is obtained with respect to each different pattern of allocation. Then, an allocation pattern which minimizes this maximum amount is selected. This is a selection of an allocation pattern according to the first criterion.

It is likely that a plurality of allocation patterns are selected according to the first criterion. The second criterion is used to select one of the allocation patterns such that allocation of a next process will suffer the least interference possible as a result of the allocation of the current process.

Figure 6:
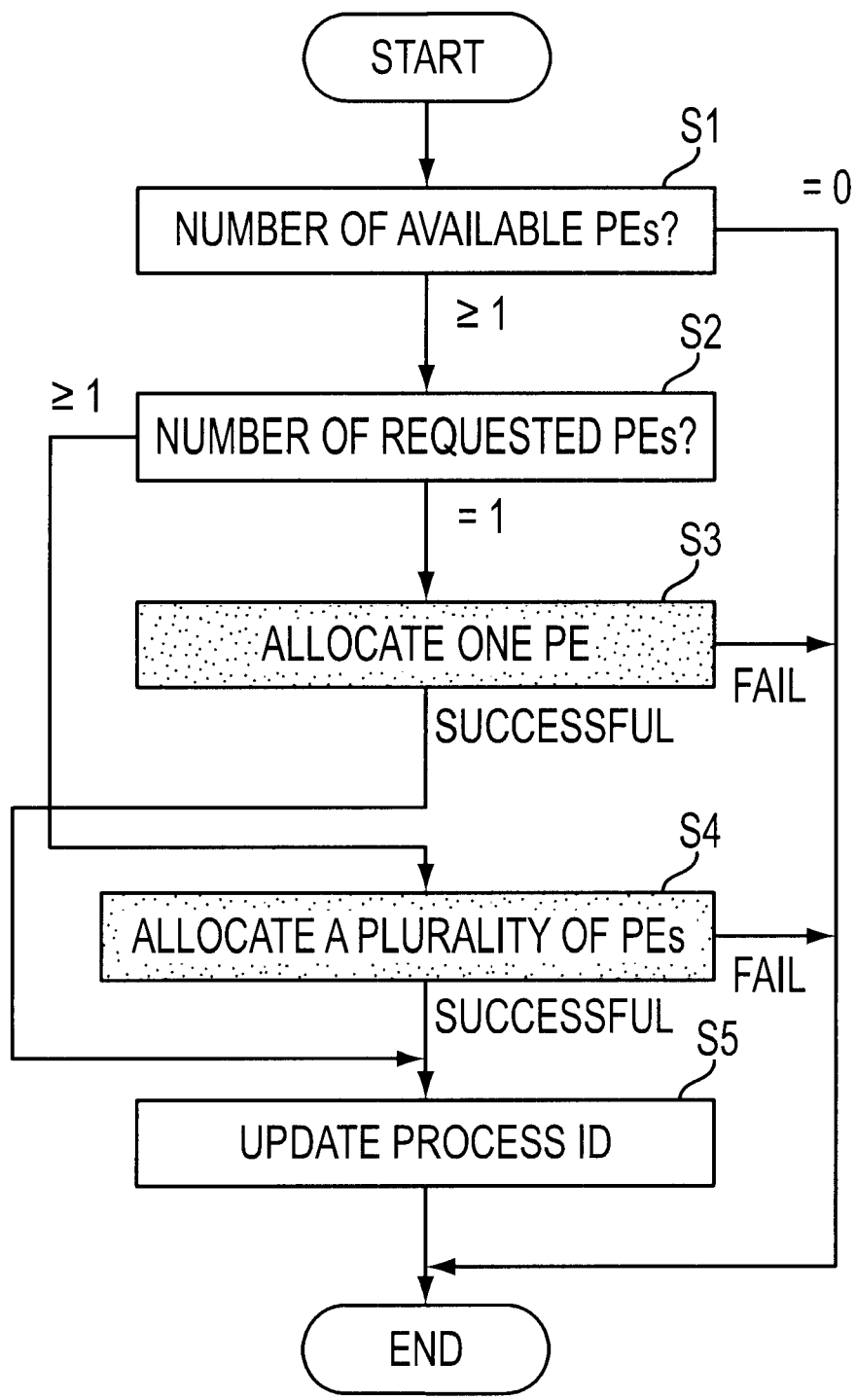
FIG. 6 is a flowchart of a main routine of a dynamic-process-allocation algorithm according to the present invention.

FIG. 6 is a flowchart of a main routine of the dynamic-process-allocation algorithm. As shown in FIG. 6, this algorithm obtains an optimum allocation in a different manner between an allocation of one PE and an allocation of a plurality of PEs. When use of only one PE is requested, no data transfer will result from the allocation of a pertinent process, so that influence on the next process allocation should only be taken into consideration. On the other hand, when a plurality of PEs are requested, data transfer should be conducted via communication links, so that efficiency of the current process varies depending on the way in which the process is allocated to the PEs.

At a step S1 in FIG. 6, a check is made as to how many PEs are available as free resources. If there is no available PE, the procedure ends. Otherwise, the procedure goes to a step S2.

At the step S2, a check is made whether the number of requested PEs is one. If it is one, the procedure goes to a step S3. Otherwise, the procedure goes to a step S4.

At the step S3, one PE is allocated to the process. If the allocation fails, the procedure ends. Otherwise, the procedure goes to a step S5.

At the step S4, a plurality of PEs are allocated to the process. If the allocation fails, the procedure ends. Otherwise, the procedure goes to the step S5.

At the step S5, a process ID is updated. Namely, a new process ID is assigned to the newly allocated process. This ends the procedure.

Figure 7:
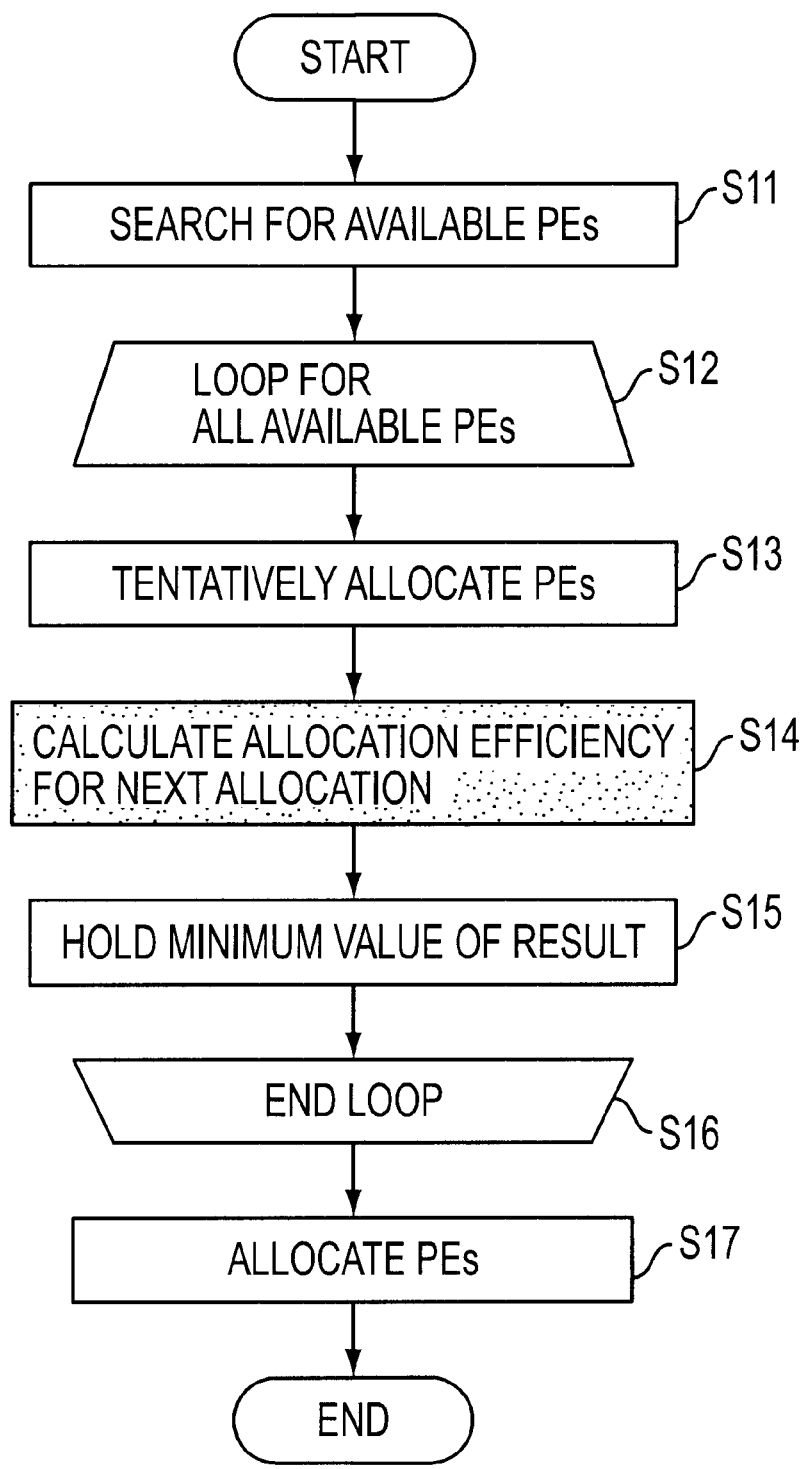
FIG. 7 is a flowchart of step S3 as shown in FIG. 6, where one processor element is allocated to a process.

FIG. 7 is a flowchart of the step S3 shown in FIG. 6 where one PE is allocated to the process.

At a step S11, a search is made for available PEs.

At a step S12, a loop is introduced to all the available PEs. Namely, the following steps are successively carried out for each of the available PEs.

At a step S13, one PE is tentatively allocated to the process.

At a step S14, an allocation efficiency for a next allocation is calculated. The calculation of the allocation efficiency will be described later. A resulting value of the calculation is hereinafter denoted as RESULT.

At a step S15, a minimum value of RESULT is held. That is, if RESULT of the current tentative allocation is smaller than a stored value of RESULT, the stored value is replaced by the newly obtained RESULT.

At a step S16, the loop is ended.

At a step S17, the PE which brought about the minimum value of RESULT is allocated to the process. This ends the procedure.

Figure 8:
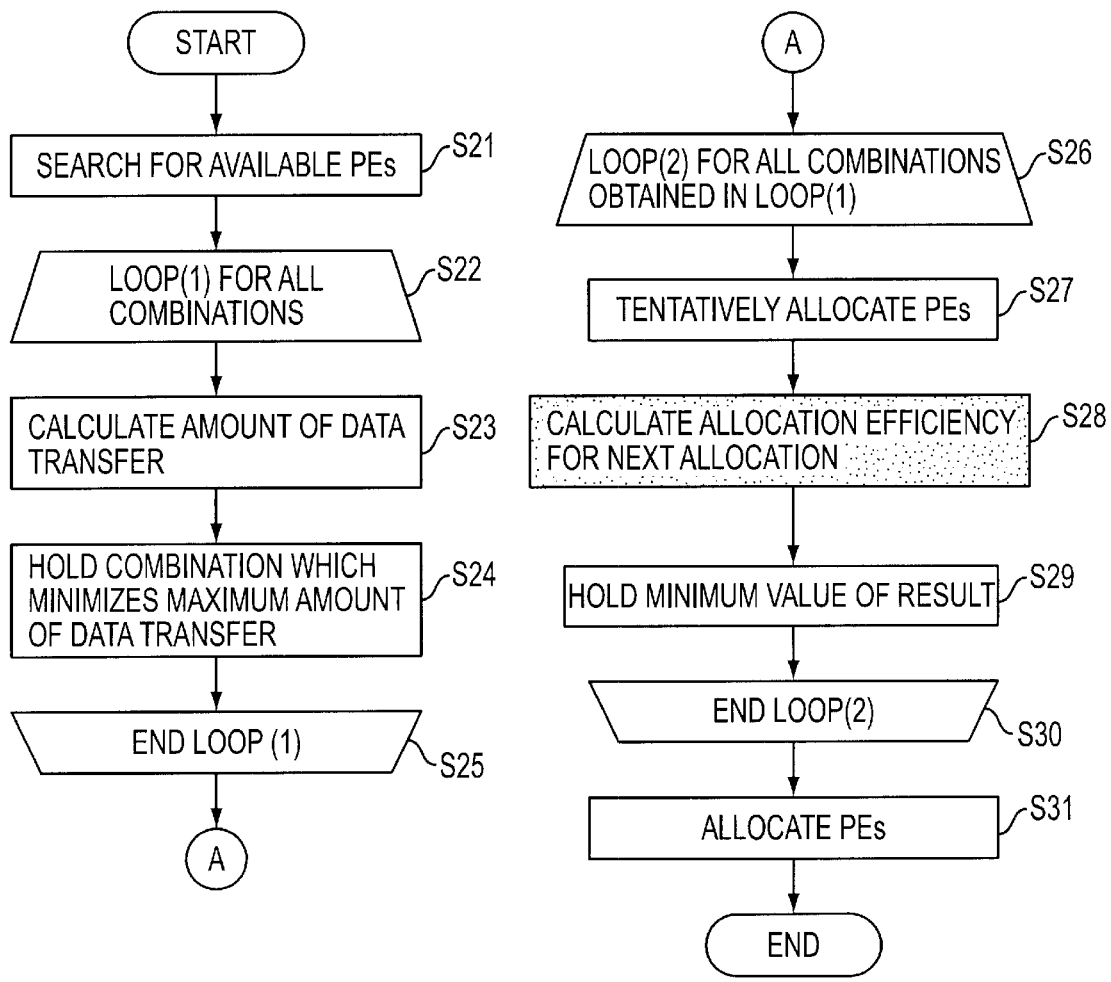
FIG. 8 is a flowchart of step S4 as shown in FIG. 6, where a plurality of processor elements are allocated to a process.

FIG. 8 is a flowchart of the step S4 shown in FIG. 6 where a plurality of PEs are allocated to the process.

At a step S21, a search is made for available PEs.

At a step S22, a first loop is introduced to all combinations of the requested number of available PEs. Namely, the following steps are successively carried out for each of the combinations formed by the requested number of available PEs.

At a step S23, the amount of data transfer is calculated with respect to each communication link by assuming that the process is allocated to a current combination of PEs.

At a step S24, a combination of PEs which minimizes a maximum amount of data transfer is held.

At a step S25, the first loop is ended.

At a step S26, a second loop is introduced to all the selected combinations which equally minimize the maximum amount of data transfer.

At a step S27, a plurality of PEs are tentatively allocated to the process according to one of the selected combinations.

At a step S28, the allocation efficiency for a next allocation is calculated. The calculation of the allocation efficiency will be described later. A resulting value of the calculation is denoted as RESULT.

At a step S29, a minimum value of RESULT is held. That is, if RESULT of the current tentative allocation is smaller than a stored value of RESULT, the stored value is replaced by the newly obtained RESULT.

At a step S30, the second loop is ended.

At a step S31, a combination of PEs which brought about the minimum value of RESULT is actually allocated to the process. This ends the procedure.

Figure 9:
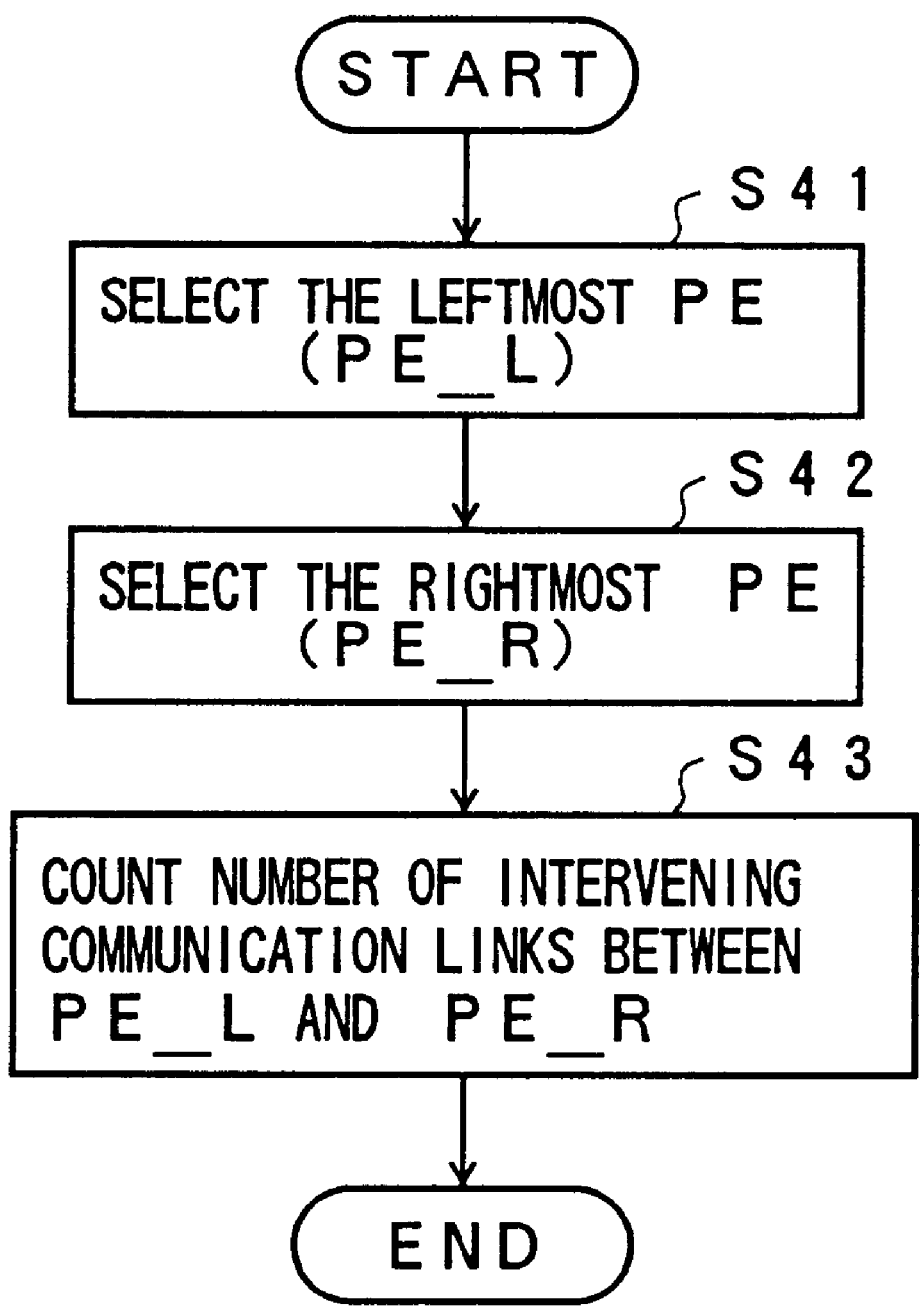
FIG. 9 is a flowchart of calculation of an allocation efficiency for a next allocation which is conducted at the step S14 of FIG. 7 as well as at the step S28 of FIG. 8.

FIG. 9 is a flowchart of the calculation of the allocation efficiency for a next allocation which is conducted at the step S14 of FIG. 7 as well as at the step S28 of FIG. 8.

At a step S41, the leftmost PE is selected from all the available PEs, and is denoted as PE_L.

At a step S42, the rightmost PE is selected from all the available PEs, and is denoted as PE_R.

At a step S43, the number of communication links intervening between PE_L and PE_R is counted, and the obtained number is provided as RESULT. This ends the procedure.

As described above, the flowchart of FIG. 9 selects the leftmost PE and the rightmost PE, and counts the number of intervening communication links. The number of intervening communication links is used here as a measure to indicate the allocation efficiency for a next process. One may appreciate ramifications of use of this measure from the following description. If the number of intervening communication links is small, this indicates that all the available PEs exist in a small pack. If the number of intervening communication links is large, on the other hand, this means that the available PEs are spread over a wide range along the extension of communication links. If the process is allocated to PEs packed in a narrow range, the number of intervening PEs between the allocated PEs should be relatively small, so that the maximum amount of data transfer after the allocation is likely to be small. If the process is allocated to PEs spread over a wide range, the number of intervening PEs is relatively large so that the data transfer for the allocated process is more likely to interfere with other data transfers. In this case, thus, the maximum amount of data transfer after the allocation is likely to be large. In this manner, the flowchart of FIG. 9 provides a criterion indicating to what extent the available PEs remaining after a process allocation are packed in a narrow range. That is, this criterion indicates how efficient the data transfer will be when some of the available PEs remaining after a process allocation are used for a next allocation.

In what follows, a description will be given with regard to a case in which requests for resources and releases of resources are made as follows:

1. a PE is requested (for process 1);
2. a PE is further requested (for process 2);
3. the PE for process 1 is released;
4. two PEs conducting M data transfer therebetween are requested (for process 3);
5. the PE for process 2 is released; and
6. two PEs conducting M data transfer therebetween are requested (for process 4).

FIG. 10A is a table chart showing results obtained when the dynamic-process-allocation algorithm described above is used. FIG. 10B is a table chart showing results obtained when a simple allocation algorithm is used. This simple allocation algorithm allocates available PEs successively selected from the left hand side. In the figures, LK[n, m] represents the amount of data transfer on a communication link between the n-th PE and the m-th PE.

As can be seen from FIG. 10A and FIG. 10B, LK[2, 3] at time 6 is zero when the dynamic-process-allocation algorithm of the present invention is used, and is 2M when the simple allocation algorithm is used. The allocation patterns at time 6 of these two algorithms correspond to allocation patterns shown in FIGS. 5A and 5B. The maximum amount of data transfer over the entire time span is M in the dynamic-process-allocation algorithm of the present invention. On the other hand, the simple allocation algorithm results in the maximum amount of data transfer being 2M. In this manner, the dynamic-process-allocation algorithm of the present invention achieves an efficient process allocation.

A computer simulation was conducted in order to demonstrate the dynamic-process-allocation algorithm of the present invention. FIG. 11A is a table chart showing simulation conditions, and FIG. 11B is a table chart showing simulation results. In this computer simulation, a random number generation is used for determining the number of PEs requested at a time of a resource request. For the sake of simplicity, the amount of data transfer between PEs in each process is set to 1.

In a total of 1023 trials, the sum of maximum amounts of data transfer is 1279 in the case of the simple allocation algorithm. In the case of the dynamic-process-allocation algorithm of the present invention, this sum is 1220. These numbers indicate that the dynamic-process-allocation algorithm of the present invention allocates resources so as to maintain a small amount of data transfer.

FIG. 11B shows a comparison between the algorithm of the present invention and the simple allocation algorithm by using the maximum amount of data transfer as a measure for comparison. As shown in FIG. 11B, only in about 5% of the total trials, did the simple allocation algorithm show superior results to the algorithm of the present invention. The algorithm of the present invention outperformed the simple allocation algorithm in about 11% of the total trials. These figures clearly signify superiority of the algorithm of the present invention.

Figure 12:
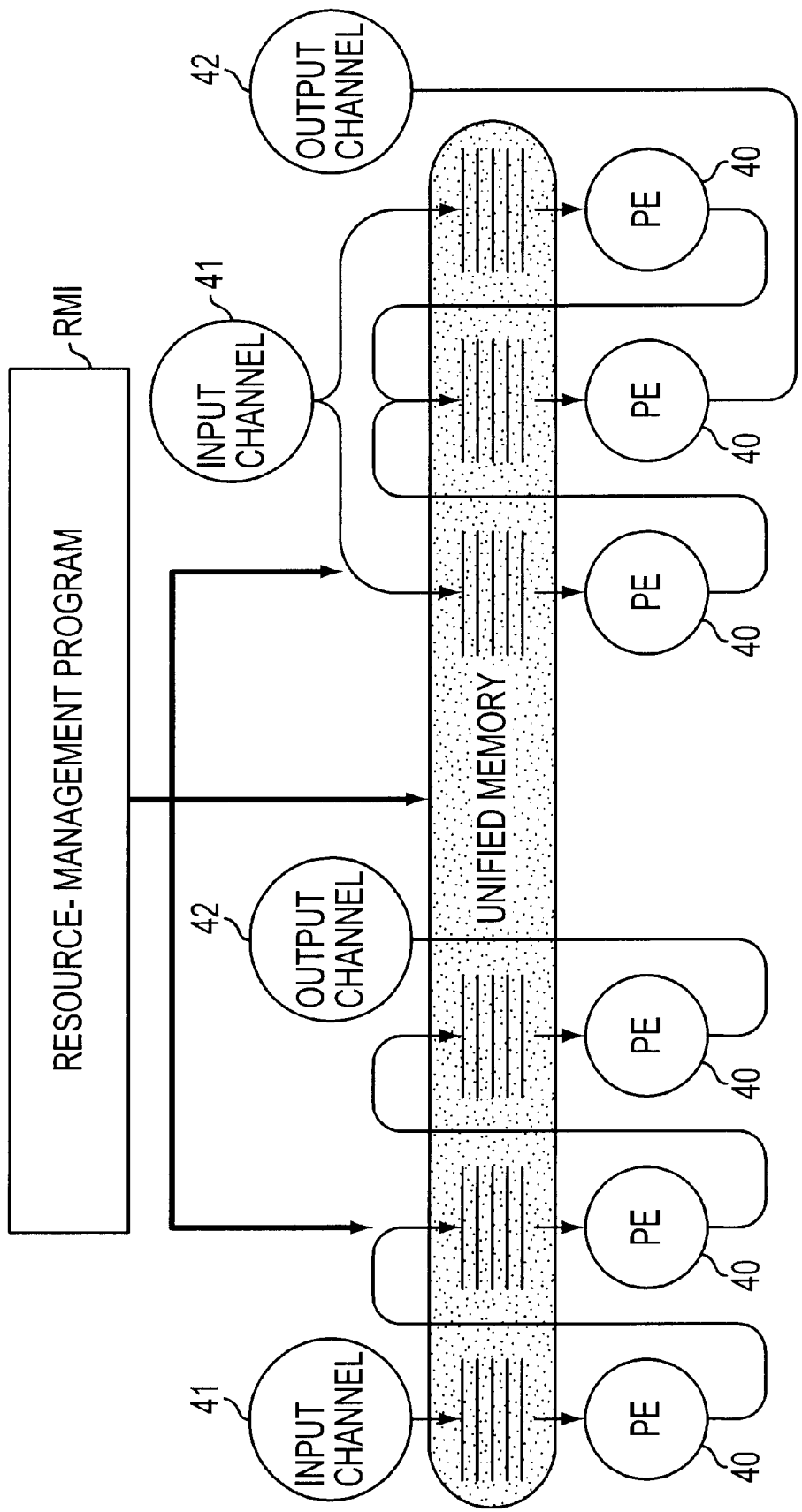
FIG. 12 is an illustrative drawing showing a memory space into which the DRAM of the signal processing accelerator of FIG. 1 is incorporated when the resource-management program controls the processor elements to carry out data processing.

FIG. 12 is an illustrative drawing showing a memory space into which the DRAM 18 of the signal processing accelerator of FIG. 1 is incorporated when the resource-management program controls the PEs 40 to carry out data processing.

As described in connection with FIG. 1, the information processing units 10 of the signal processing accelerator communicate with each other via the communication links 20. In this manner, the signal processing processors 11 of the information processing units 10 can access the DRAMs 18 of other information processing units 10 in order to read and write data. When viewed from each of the signal processing processors 11, the DRAMs 18 of the information processing units 10 form a single unified memory space.

As shown in FIG. 12, the PEs 40 which carry out data processing between the input channel 41 and the output channel 42 exchange data with each other via the unified memory space. Namely, data processed by a given PE 40 is stored at an indicated address in the unified memory, and another PE reads the data from this address of the unified memory to further process the data. In this manner, the DRAMs 18, which are provided for the respective information processing units 10, can make up the unified memory space because of communications between the information processing units 10. Each information processing unit 10 thus can attend to information processing without discriminating a memory space of its own unit against memory spaces of other information processing units 10.

Figure 13:
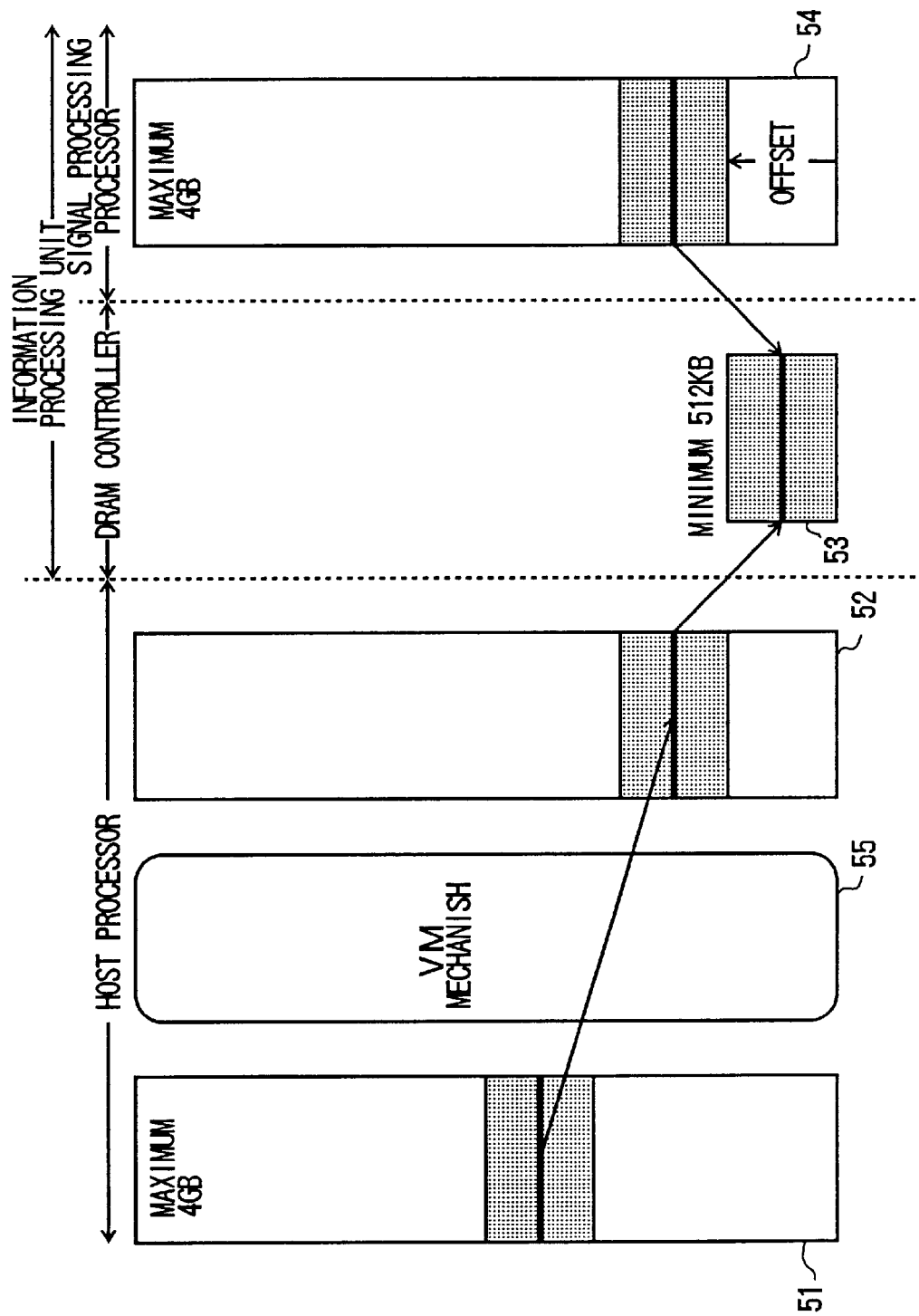
FIG. 13 is an illustrative drawing showing address conversion between a host processor and the signal processing accelerator.

FIG. 13 is an illustrative drawing showing address conversion between the host processor and the signal processing accelerator. As shown in FIG. 13, a VM mechanism 55 for controlling virtual memory on the side of the host processor converts a host-processor virtual-address space 51 into a host-processor physical-address space 52. The host-processor virtual-address space 51 may, for example, constitute a 5-GB memory space at maximum.

An accelerator physical-address space 53 of a given DRAM 18, which is controlled by the DRAM controller 19 of a corresponding information processing unit 10, is allocated to part of the host-processor physical-address space 52. The accelerator physical-address space 53 may, for example, be a 512-KB memory space at maximum. Since the accelerator physical-address space 53 is allocated to the host-processor physical-address space 52 and hence to the host-processor virtual-address space 51, data transfer is achieved between the host processor 31 and the information processing unit 10.

The accelerator physical-address space 53 is allocated to an accelerator processor-address space 54 (i.e., the unified memory space) with a predetermined offset. The accelerator processor-address space 54 may, for example, have a 4-GB memory space at maximum. The accelerator physical-address space 53 of each DRAM 18, which is controlled by the DRAM controller 19 of a corresponding information processing unit 10, is allocated to a respective portion of the accelerator processor-address space 54 by a respective predetermined offset. In this manner, the DRAMs 18 provided in the respective information processing units 10 together make up the unified memory.

Figure 14:
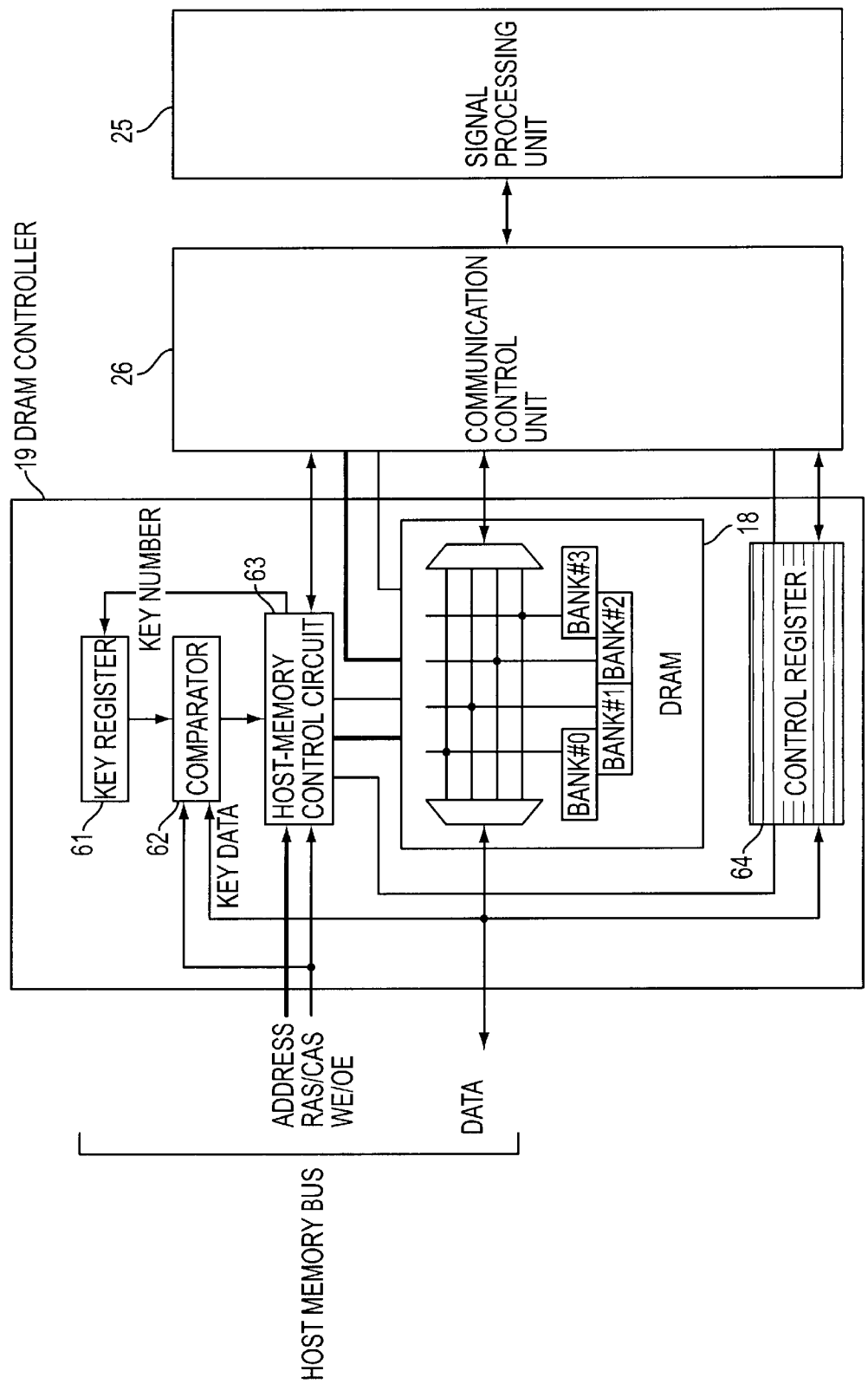
FIG. 14 is a block diagram of a detailed configuration of the DRAM controller of FIG. 1.

FIG. 14 is a block diagram of a detailed configuration of the DRAM controller 19 of the information processing unit 10.

As previously described, the DRAM 18 controlled by the DRAM controller 19 is allocated to the host-processor virtual-address space 51 of the host processor 31. This allocation to the host-processor virtual-address space 51 of the host processor 31 can be controlled by the operating system. When the signal processing accelerator is used with a conventional operating system which does not support such an allocation function, however, a precaution must be taken to prohibit the operating system from taking control of the DRAM 18 and exclusively using it as part of the OS memory space. That is, the DRAM 18 should not be recognized by the operating system as a memory at an initial state. Only when the signal processing accelerator is used, should the DRAM 18 be allocated to the host-processor virtual-address space 51 as a memory accessible from the operating system. Once allocated, the DRAM 18 can serve as a venue through which data is exchanged between the host processor 31 and the signal processing accelerator.

In order to achieve this, the host processor 31 is allowed to allocate the DRAM 18 to the host-processor virtual-address space 51 only after successfully unlocking keys. That is, the host processor 31 supplies data to the DRAM controller 19 as key information such that the DRAM 18 is recognized as a memory by the operating system only when the supplied data matches predetermined key information.

The DRAM controller 19 of FIG. 14 includes the DRAM 18, a key register 61, a comparator 62, a host-memory control circuit 63, and a control register 64. The DRAM 18 is a conventional DRAM which includes memory cells, a word-selection mechanism, a column-selection mechanism, sense amplifiers, a precharging mechanism, etc., and a description thereof will be omitted.

The key register 61 stores a plurality of key data. When a plurality of data provided from the host processor 31 (FIG. 1) matches the plurality of keys stored in the key register 61, the keys are unlocked. The comparator 62 compares the data supplied from the host processor 31 via the host memory bus 30 (FIG. 1) with the plurality of key data stored in the key register 61. The comparator 62 supplies results of the comparison to the host-memory control circuit 63.

The host-memory control circuit 63 controls the DRAM 18, key register 61, and the control register 64. When data is written in a particular register which is provided in the control register 64 for the purpose of key matching, the host-memory control circuit 63 supplies a plurality of key numbers to the key register 61 so that the key register 61 outputs a plurality of keys. The comparator 62 compares the plurality of keys with the plurality of data provided from the host memory bus 30. If all the keys are matched, the host-memory control circuit 63 writes recognition codes in a recognition-code register of the control register 64. The host processor 31 reads and recognizes the recognition codes so that the host processor 31 recognizes the DRAM 18 and the DRAM controller 19 as a memory. Details of this recognition operating will be later described.

In addition to the key matching register and the recognition-code register described above, the control register 64 includes an initialization register for initializing the signal processing unit 25 and the communication-control unit 26, a reset-signal flag for controlling operations of the signal processing unit 25, etc.

Figure 15:
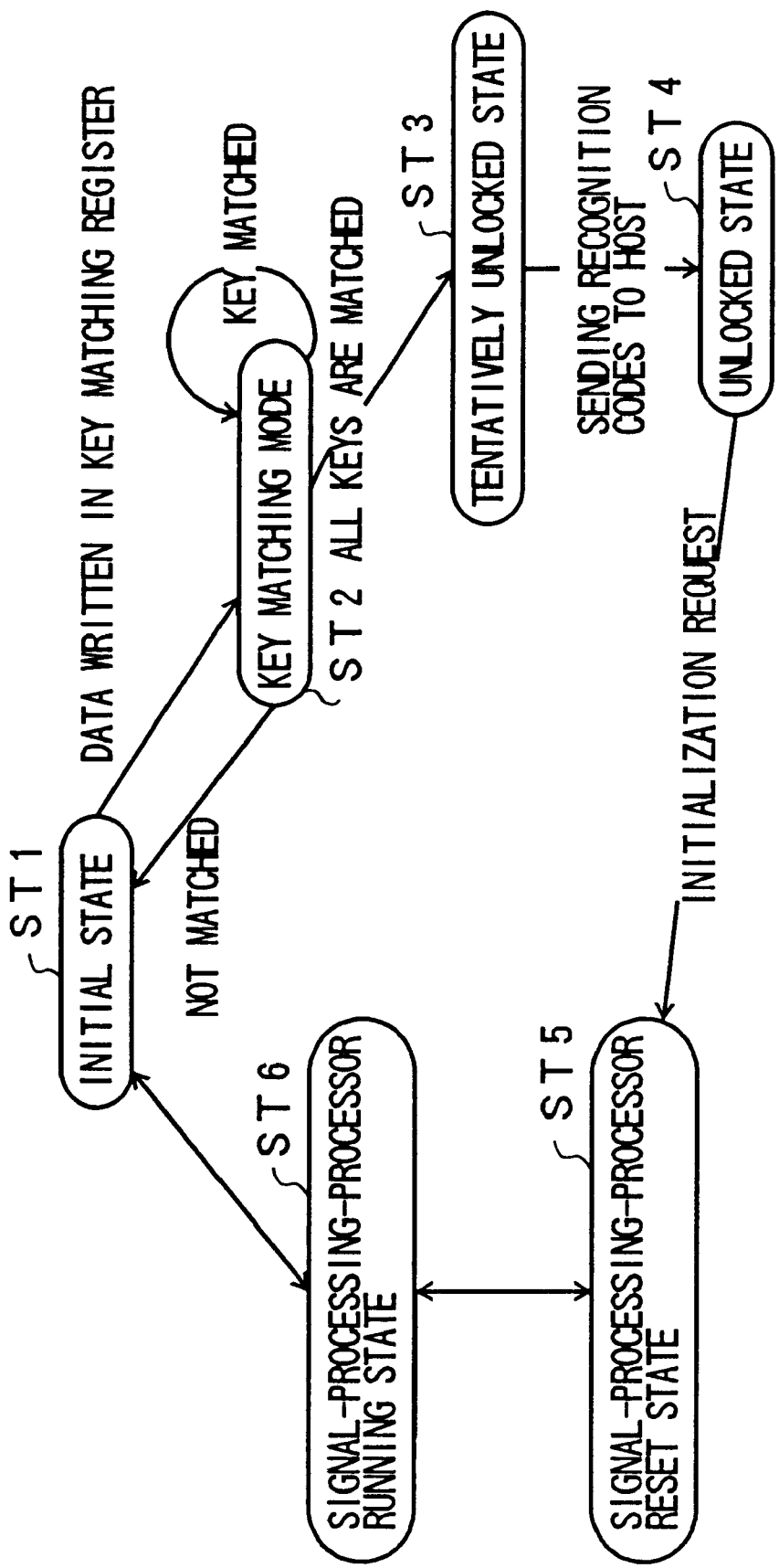
FIG. 15 is an illustrative drawing showing state transitions of an information processing unit of FIG. 1.

FIG. 15 is an illustrative drawing showing state transitions of the information processing unit 10.

Immediately after the system is turned on, the information processing unit 10 is in an initial state ST1. By this time, other conventional DRAMs connected to the host memory bus 30 are recognized as memories. The DRAM 18 of the information processing unit 10, however, is not recognized as memories at this time.

In the initial state ST1, data and storage addresses are supplied from the resource-management program or other programs via the host memory bus 30. At the same time, control signals RAS, /CAS, WE, and /OE are provided in order to access the DRAM controller 19. If data is written in the key matching register of the control register 64, a state transition takes place from the initial state ST1 to the key matching mode ST2.

In the key matching mode ST2, the host-memory control circuit 63 supplies a plurality of key numbers to the key register 61. The key register 61 successively feeds a plurality of keys to the comparator 62 in response to the plurality of key numbers. The comparator 62 compares the plurality of data provided via the host memory bus 30 with the plurality of keys, and sends comparison results to the host-memory control circuit 63. If all the keys match the supplied data, a state transition is made from the key matching mode ST2 to a tentatively unlocked state ST3. If all the keys and the data do not match, the information processing unit 10 goes back to the initial state ST1.

In the tentatively unlocked state ST3, the host-memory control circuit 63 writes recognition codes in the recognition-code register of the control register 64. The host processor 31 reads the recognition codes, and checks the codes to recognize the DRAM 18 as a memory, thereby registering the DRAM 18 in a device table. The access by the host processor 31 to the recognition-code register brings about a state transition to an unlocked state ST4.

In the unlocked state ST4, the host processor 31 write an initialization request in the initialization register of the control register 64. When the initialization request is written, the signal processing unit 25 and the communication-control unit 26 are initialized. The writing of the initialization request changes a state to a signal-processing-processor reset state ST5.

In the signal-processing-processor reset state ST5, the host processor 31 writes information in the DRAM 18 with regard to execution programs, address pointers referring to data input/output buffers, etc. Further, the host processor 31 clears a reset-signal flag of the control register 64. When the reset-signal flag is removed, the signal processing unit 25 starts data processing. With the start of the data processing, a state is changed to a signal-processing-processor running state ST6.

Changing the reset-signal flag back and forth between the cleared status and the set status, a state can be shifted back and forth between the signal-processing-processor reset state ST5 and the signal-processing-processor running state ST6. In this manner, programs can be updated and results can be read out at appropriate timings during the signal-processing-processor reset state ST5.

From the signal-processing-processor running state ST6, a state goes to the initial state ST1 upon completion of the data processing operations. In this state, the host processor 31 does not recognize the DRAM 18 of the information processing unit 10 as a memory.

As described above, the initial state does not allow the DRAM 18 to be recognized as a memory so that the operating system does not take control of the DRAM 18 and use it as OS memory space. When the signal processing accelerator is used, however, keys are unlocked to allow the DRAM 18 to be recognized as a usable memory. Unlocking of the keys is tantamount to searching in the host-processor physical-address space 52 for the DRAM 18 of the information processing unit 10 which is not a conventional DRAM.

Figure 16:
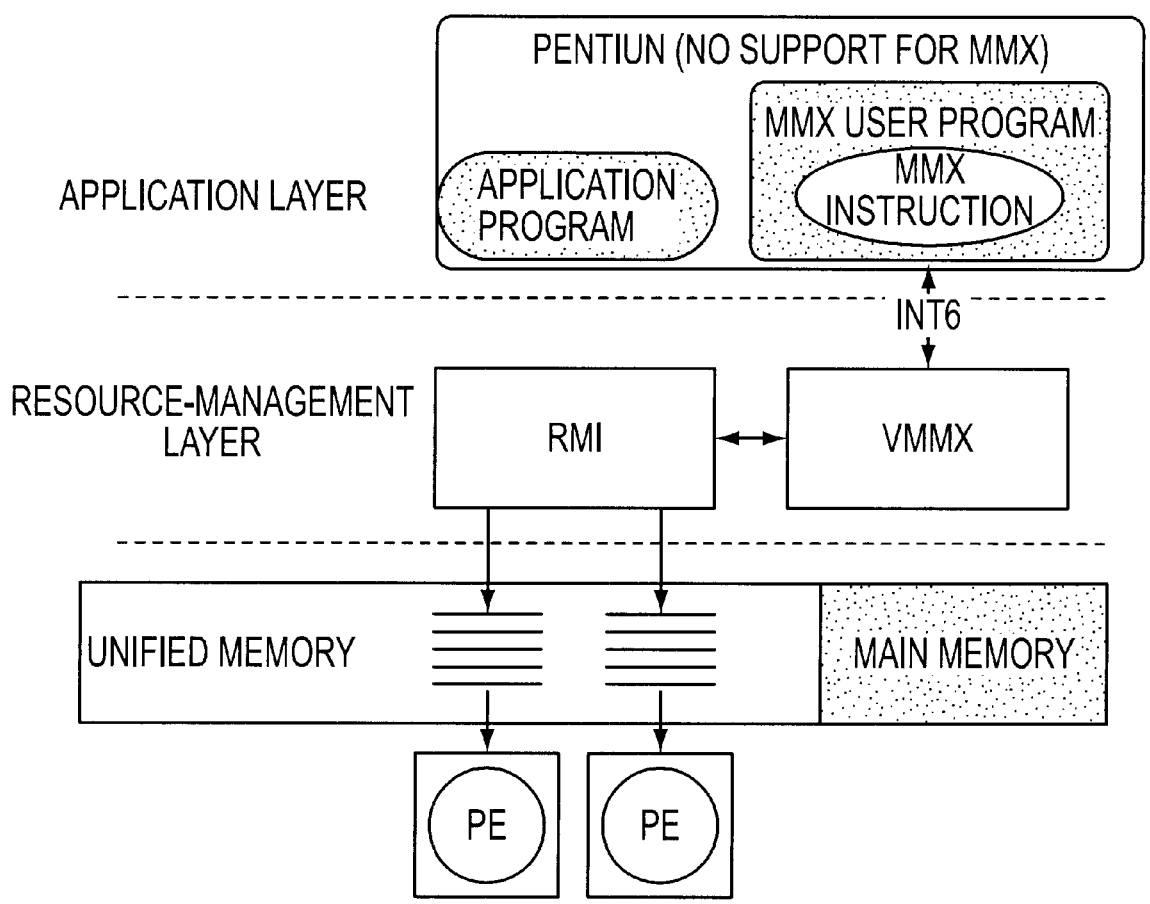
FIG. 16 is an illustrative drawing showing a mechanism for executing virtual-machine codes according to the present invention.

FIG. 16 is an illustrative drawing showing a mechanism for executing virtual-machine codes according to the present invention. Microprocessors of the Intel corporation, for example, include a P55C microprocessor which can execute a multi-media-extended instruction set MMX. This instruction set is provided as an extension to a general-purpose instruction set. If programs using the extended instruction set MMX are executed by a general-purpose processor such as a Pentium processor which does not support extended instructions, an interruption INT6 is generated as an instruction exception at the time of execution of an extended instruction. If an interruption handling routine is provided, however, the signal processing accelerator of the present invention can emulate this extended instruction, thereby serving as a virtual machine.

FIG. 16 shows a software structure for implementing such a virtual machine by taking the Pentium processor and the extended instruction set MMX as an example. As shown in FIG. 16, the application layer includes an ordinary application program and an MMX user program. The extended instruction set MMX is used in the MMX user program, but not used in the ordinary application program. These programs are executed by a Pentium processor which does not support the extended instruction set MMX. When the MMX user program is executed, the Pentium processor generates an interruption INT6 at the time of execution of an extended instruction MMX.

A virtual-machine program VMMX in addition to the resource-management program RMI resides in the resource-management layer. The virtual-machine program VMMX handles interruption. Upon receiving the interruption INT6, the virtual-machine program VMMX writes an extended instruction MMX causing the interruption in an instruction queue (FIFO) of the main memory. The virtual-machine program VMMX reads an extended instruction MMX from the FIFO of the main memory, and supplies it to the resource-management program RMI. The resource-management program RMI writes programs for the signal processing accelerator to emulate the extended instruction MMX, pointers pointing to input/output references, etc., in the unified memory. Each PE of the signal processing accelerator emulates the extended instruction MMX, and stores emulation results in the unified memory. The emulation results are passed to the user program in the application layer via the resource-management program RMI and the virtual-machine program VMMX in the resource-management layer.

In this manner, when a general-purpose processor not supporting the extended instruction set MMX executes an extended instruction MMX, the interruption INT6 is detected to control the signal processing accelerator of the present invention to emulate the extended instruction MMX. In this configuration, programs can be executed as if the processor supports the execution instruction set MMX. Here, the extended instruction set MMX, the interruption INT6, the Pentium processor, etc., are used merely as an example for explanation. That is, emulation by the signal processing accelerator as exceptional handling in response to detection of interruption is not limited to processors and systems of the Intel corporation, but can be applied to any system. Further, the virtual machine (signal processing accelerator) may execute an instruction of a user's own creation as exceptional handling so that the user can create and execute instructions which are not supported by any commercially available processors.

Figure 17:
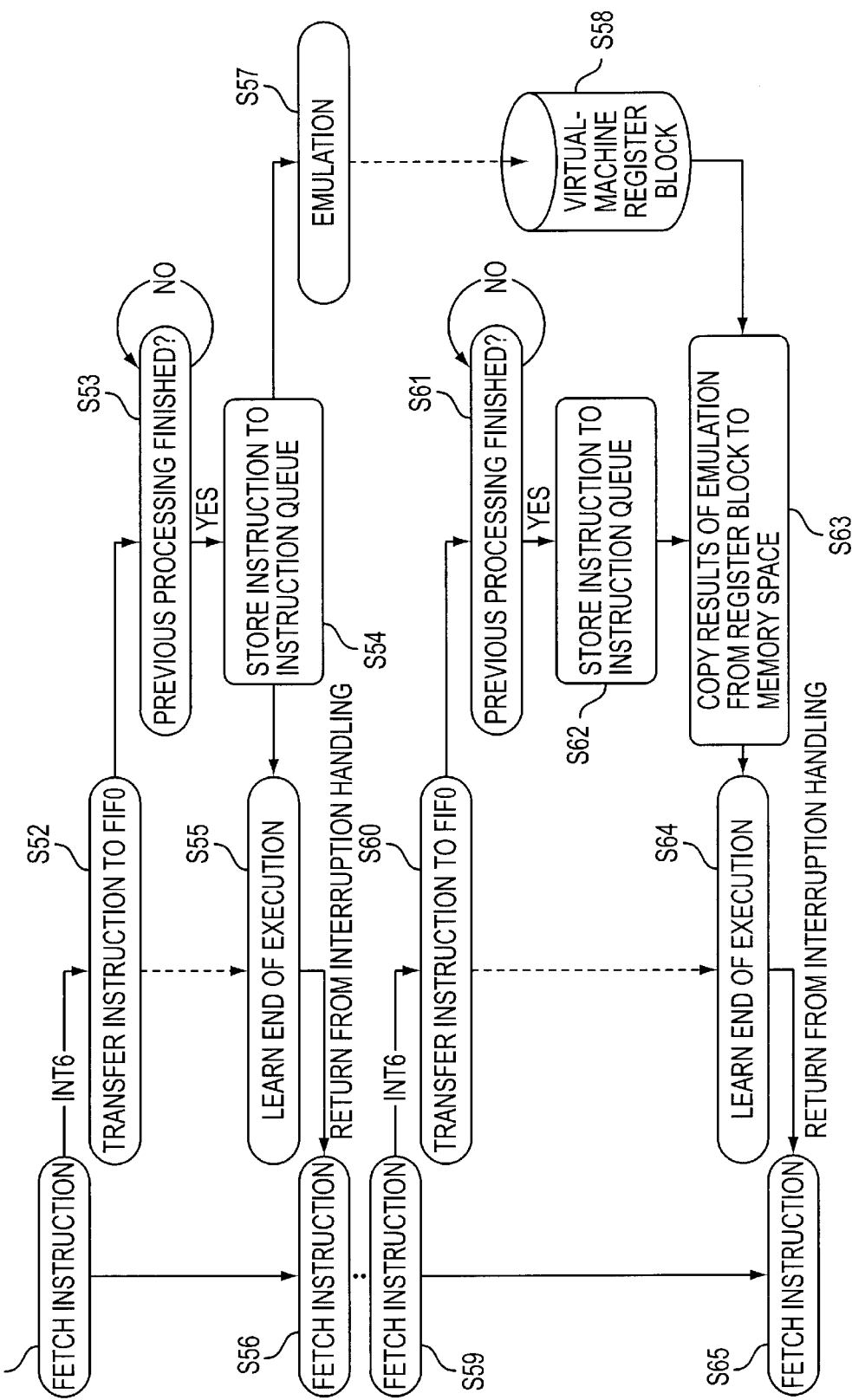
FIG. 17 is a flowchart of exceptional handling by the signal processing accelerator for emulation.

FIG. 17 is a flowchart of exceptional handling by the signal processing accelerator for emulation.

At a step S51, a virtual machine code (virtual machine instruction) of a user program is fetched by the host processor 31 (FIG. 1). The virtual machine code is an instruction which is to be emulated by the signal processing accelerator. The host processor 31 detects an illegal instruction when decoding the virtual machine code, and generates an interruption signal INT6. The interruption signal generated by the host processor 31 does not have to be INT6, but can be any code as long as the code indicates an instruction exception.

At a step S52, a virtual machine program (i.e., an interruption handling routine corresponding to VMMX of FIG. 16) detects the interruption signal INT6, and transfers the virtual machine code causing the interruption to FIFO serving as an instruction queue. In this example, the virtual machine code causing the interruption is assumed to be a data processing instruction.

At a step S53, the resource-management program RMI (RMI.API and RMI.VxD) reads the virtual machine code from the FIFO, and checks whether processing of a previous virtual-machine instruction is finished. After the processing of the previous virtual-machine instruction is completed, the procedure goes to a step S54.

At the step S54, the resource-management program RMI writes the virtual machine code in an instruction queue which stores instructions to be executed by the signal processing processor 11 (FIG. 1). After writing the virtual machine code in the instruction queue, the resource-managenent program RMI gives an instruction to the signal processing accelerator to emulation the virtual machine instruction, and, also, sends a notice of execution completion to the virtual machine program.

At a step S55, the virtual machine program receives the notice of execution completion so as to know that the execution is completed, and prompts the host processor 31 to resume operations after the interruption handling.

At a step S56, the next instruction of the user program is fetched by the host processor 31.

At a step S57, the signal processing accelerator performs the emulation of the virtual machine instruction independently of the execution of the user program by the host processor 31.

At a step S58, results of the emulation are stored in a virtual-machine register block (the DRAM 18 of the information processing unit 10 shown in FIG. 1).

At a step S59, the host processor 31 fetches a virtual machine code of the user program independently of the emulation by the signal processing accelerator. When decoding the virtual machine code, the host processor 31 learns that this virtual machine code is an illegal instruction, and, then, generates an interruption signal INT6. The interruption signal generated by the host processor 31 does not have to be INT6, but can be any code as long as the code indicates an instruction exception.

At a step S60, upon detection of the interruption signal INT6, the virtual machine program transfers the virtual machine code causing the interruption to the FIFO which serves as an instruction queue. In this example, this virtual machine code is assumed to be a data-read instruction.

At a step S61, the resource-management program RMI reads the virtual machine code from the FIFO, and checks whether processing of the previous virtual-machine instruction is finished. After the processing of the previous virtual-machine instruction is completed, the procedure goes to a step S62.

At a step S62, the resource-management program RMI stores the virtual machine code to the instruction queue which is provided for storing instructions to be executed by the signal processing accelerator.

At a step S63, the resource-management program RMI copies the results. of the emulation from the virtual-machine register block to the memory space of the user program. Further, the resource-management program RMI sends a notice of execution completion to the virtual machine program.

At a step S64, the virtual machine program receives the notice of execution completion so as to know that the execution is completed, and prompts the host processor 31 to resume operations after the interruption handling.

At a step S65, the next instruction of the user program is fetched by the host processor 31.

In this manner, when a virtual machine instruction is fetched by the host processor 31, the virtual machine program detects the interruption signal INT6, and the signal processing accelerator emulates the virtual machine instruction under the control of the resource-management program RMI. Therefore, the user program can be executed as if the host processor 31 itself was executing the virtual machine instructions.

In what follows, various methods of controlling a client processor by using a host processor will be described with regard to a system in which the client processor (signal processing processor or signal processing accelerator of the previous embodiments) is connected to the host processor via a memory interface (i.e., host-memory bus to which main memories are connected). Here, the memory interface is an interface through which the host processor accesses the main memories connected to the host-memory bus, and the main memories store data and instruction codes executable by the host processor which are initially read from an auxiliary memory device.

Figure 18:
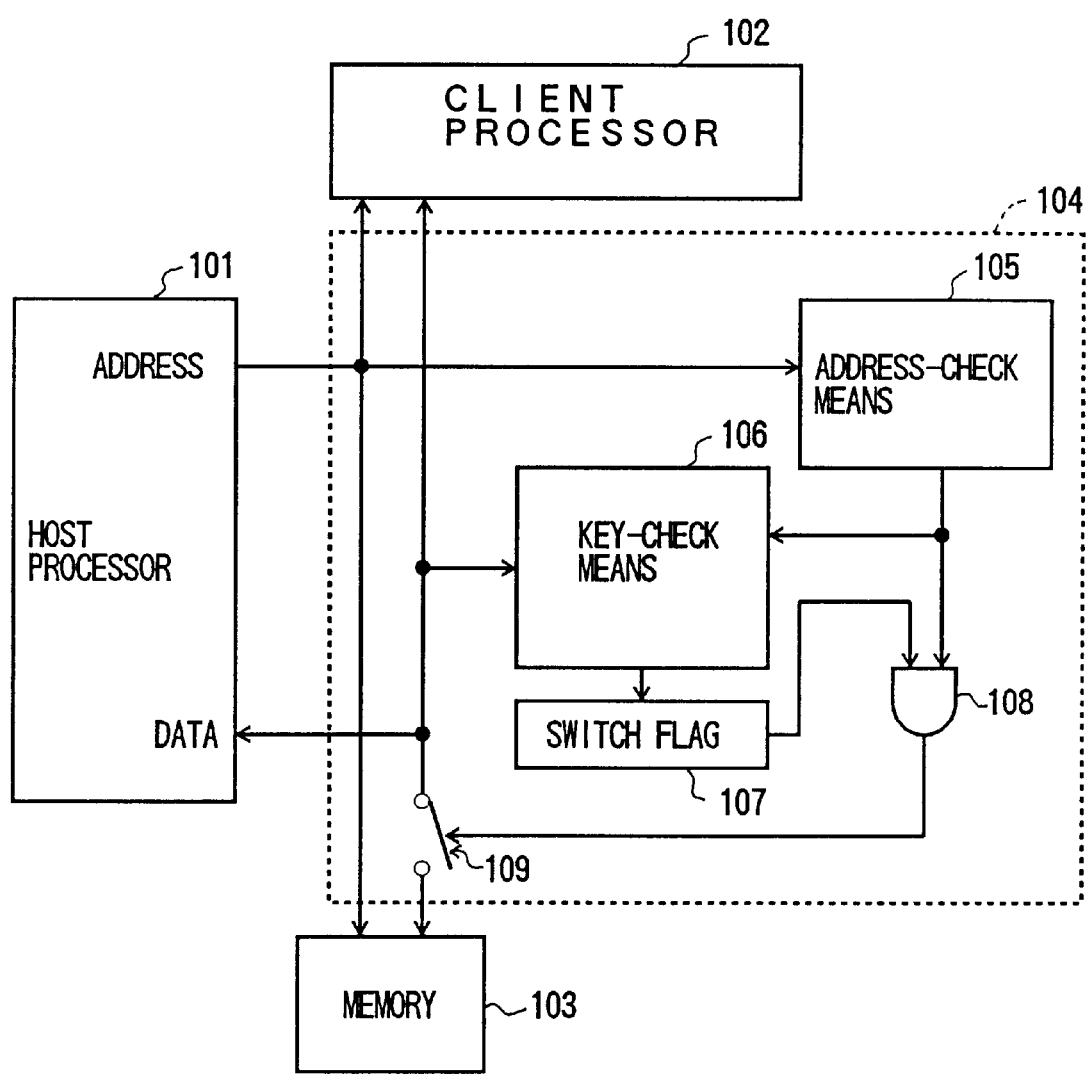
FIG. 18 is a block diagram showing a switching mechanism which switches between a client processor and a memory when the client processor and the memory are connected to a host processor via a memory interface.

FIG. 18 is a block diagram showing a switching mechanism which switches between a client processor and a memory when the client processor and the memory are connected to a host processor via a memory interface.

As shown in FIG. 18, a host processor 101 is connected to a client processor 102 and a memory 103 via a switch means 104. The host processor 101 can access only one of the client processor 102 and the memory 103 at a time, and the switch means 104 controls which one of them is accessible at a given time.

The switch means 104 includes an address-check means 105, a key-check means 106, a switch flag 107, an AND logic 108, and a switch 109. The host processor 101 writes predetermined data at a predetermined address. Upon the address input, the address-check means 105 activates an output thereof. When the output of the address-check means 105 is activated, the key-check means 106 compares the predetermined data supplied from the host processor 101 with predetermined key information. If the supplied data and the key information match, the key-check means 106 sets a flag to the switch flag 107. The switch flag 107 produces an active output when a flag is set. The AND logic 108 opens the switch 109 when both the output of the address-check means 105 and the output of the switch flag 107 are active. In this manner, the host processor 101 accesses the client processor 102 instead of accessing the memory 103. When the client processor 102 needs to access the memory 103, the host processor 101 supplies predetermined data to a predetermined address so as to clear the flag of the switch flag 107.

In this manner, writing of predetermined key data at a predetermined address makes it possible to switch between the client processor 102 and the memory 103. If a comparison between data and key information is made more than one time, a probability of an accidental match between the data and the key can be reduced. Namely, the larger the number of required comparison, the greater the reliability of the match.

The predetermined address described above may be a particular address in a memory space.

Figure 19:
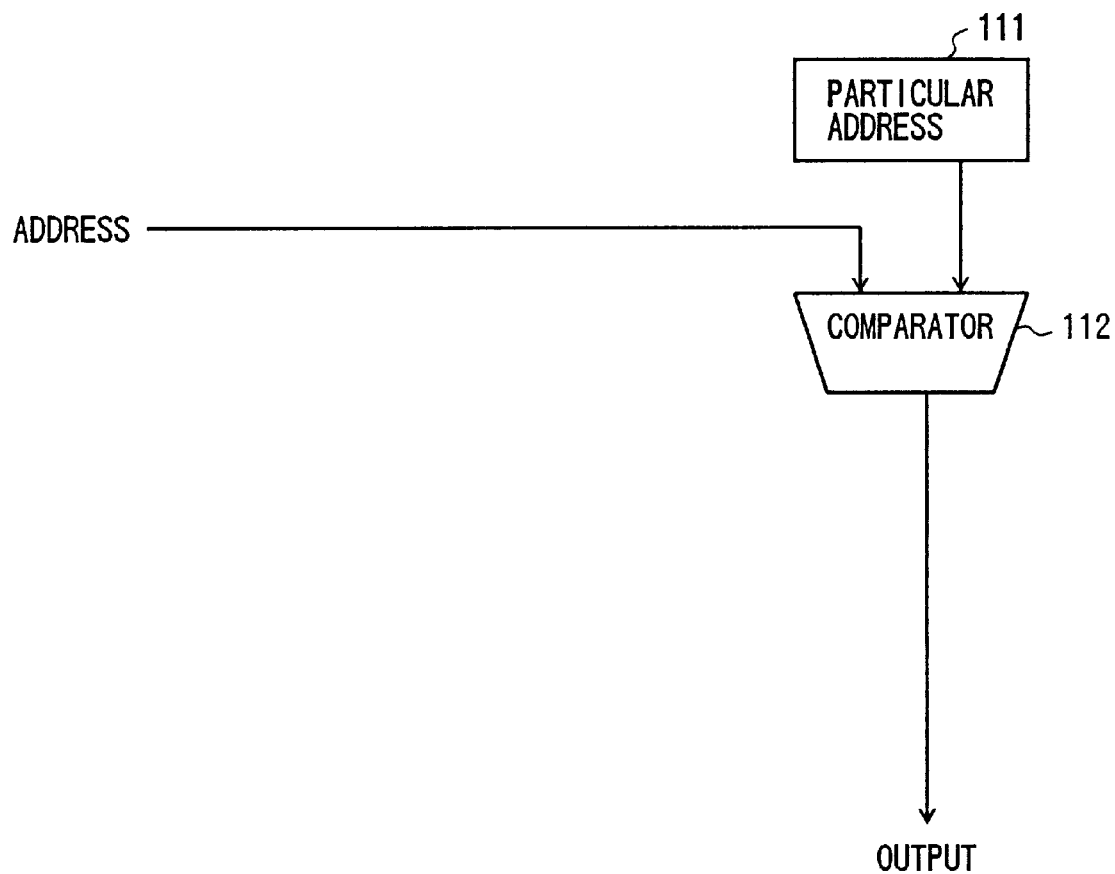
FIG. 19 is a circuit diagram of an address-check means of FIG. 18 which activates an output thereof when a particular address in a memory space is provided.

FIG. 19 is a circuit diagram of the address-check means 105 which activates an output thereof when a particular address in a memory space is provided.

The address-check means 105 includes a storage means 111 for storing the particular address and a comparator 112. When the same address as that stored in the storage means 111 is provided, the address-check means 105 of FIG. 19 activates an output thereof.

Alternately, the predetermined address described above may be an address within a particular range in a memory space.

Figure 20:
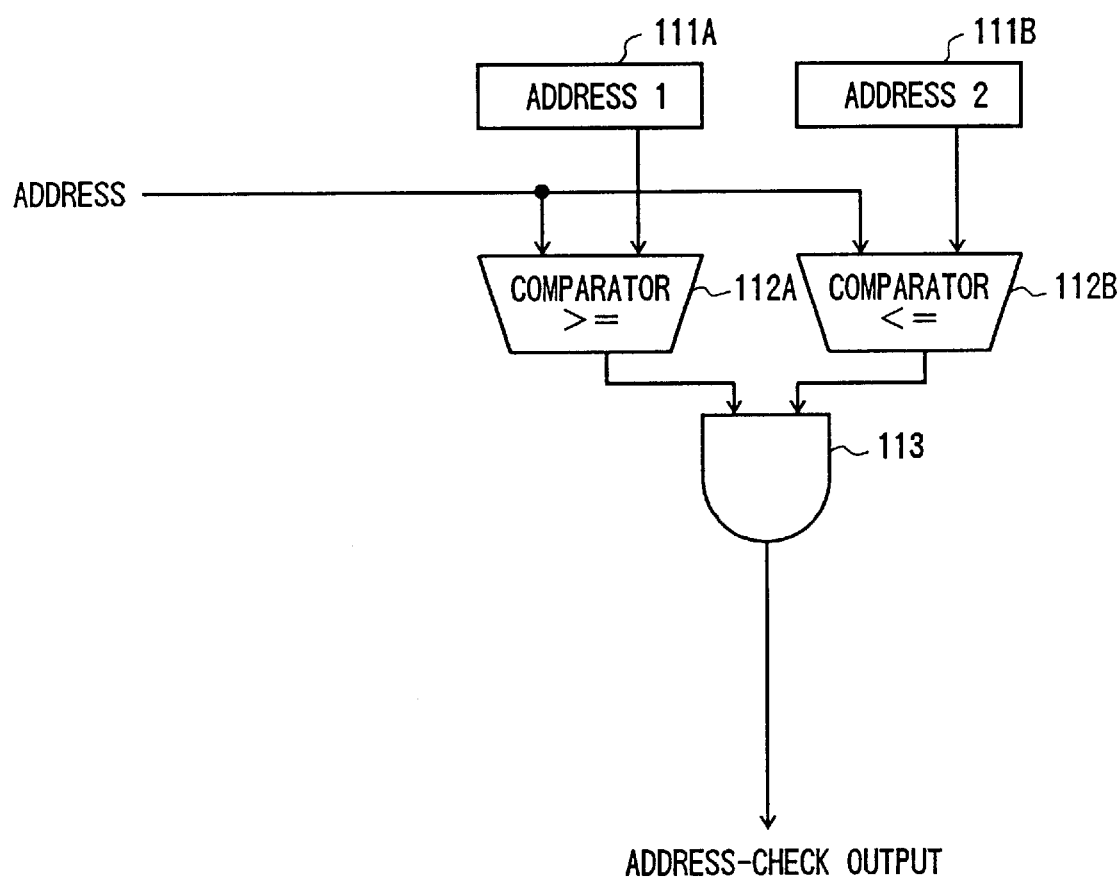
FIG. 20 is a circuit diagram of the address-check means of FIG. 18 which activates an output thereof when an address within a particular memory-space range is provided.

FIG. 20 is a circuit diagram of the address-check means 105 which activates an output thereof when an address within a particular memory-space range is provided.

The address-check means 105 includes a storage means 111A for storing a first address, a storage means 111B for storing a second address, comparators 112A and 112B, and an AND logic 113. The comparator 112A activates an output thereof when a provided address is larger than the first address stored in the storage means 111A. The comparator 112B activates an output thereof when the provided address is smaller than the second address stored in the storage means 111B. An address-check output from the AND logic 113, therefore, becomes active when the provided address is within a range between the first address and the second address.

In FIG. 18, when the key-check means 106 compares supplied data with predetermined key information, shuffling of bit positions in a data-bit arrangement may surface as a problem. In a computer system, generally, bit positions in a data-bit arrangement are changed at a memory interface. Such a change is brought about when a data bus is laid out from a host processor to memories by placing emphasis on factors such as a noise reduction and a layout-area-size reduction while ignoring an order of bit lines of the data bus.

Figure 21:
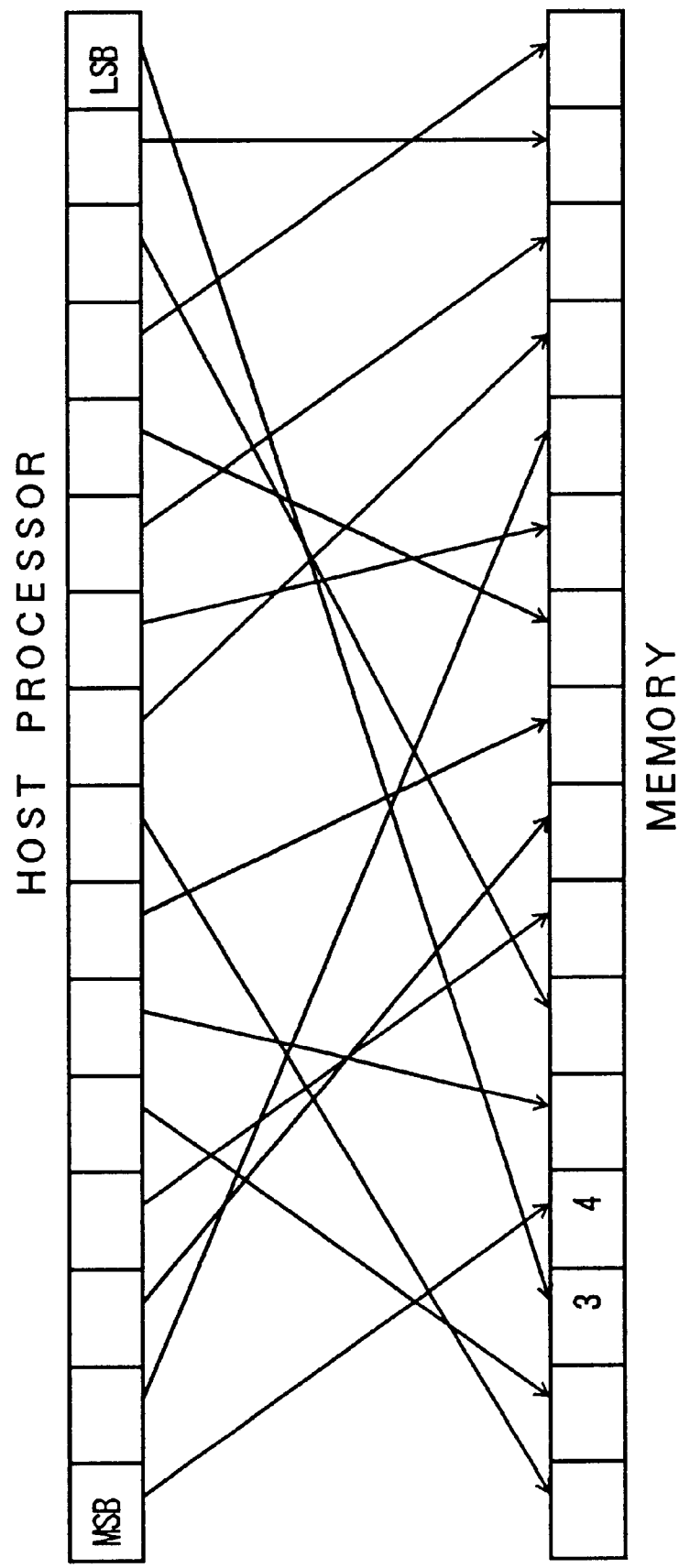
FIG. 21 is an illustrative drawing schematically showing a change of bit positions in a bit arrangement.

FIG. 21 is an illustrative drawing schematically showing a change of bit positions in a bit arrangement. As shown in FIG. 21, the most significant bit MSB on the host-processor side is changed to a fourth bit on the memory side, and the least significant bit LSB is displaced to a third-bit position, for example. Such shuffling of bit positions in a bit arrangement does not surface as a problem in a conventional computer system since data stored in memories in a shuffled bit order is read out and transmitted to the host processor in a rearranged and corrected bit order.

When the key-check means 106 compares supplied data with predetermined key information, however, shuffling of bit positions renders it meaningless to make a direct comparison of bit patterns between the supplied data and the key information. To overcome this problem, various methods as described below are presented.

Figures 22A, 22B:
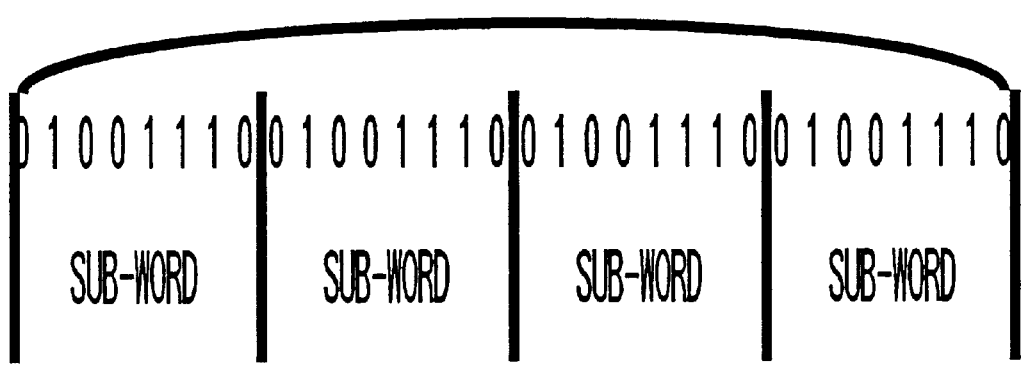
FIG. 22A is an illustrative drawing showing a relation between a data word and sub-words.
FIG. 22B is an illustrative drawing showing a key code (key information)

FIG. 22A is an illustrative drawing showing a relation between a data word and sub-words, and FIG. 22B is an illustrative drawing showing a key code (key information). In many systems, generally, changes of bit positions only occur sub-word by sub-word, and bit positions within a given sub-word are not changed. When the data word is 32 bits including four sub-words of 8 bits, for example, sub-words are switched with each other, but an arrangement of 8 bits within each sub-word does not change in such systems.

In such systems, therefore, a data word in which each sub-word is a key code (key information) may be supplied from a host processor to the key-check means 106 to obviate the problem of the data-bit shuffling. In this case, switching of sub-words during an intervening path does not affect the comparison of each sub-word with the key code by the key-check means 106, and, thus, a correct check result is obtained.

Figure 23:
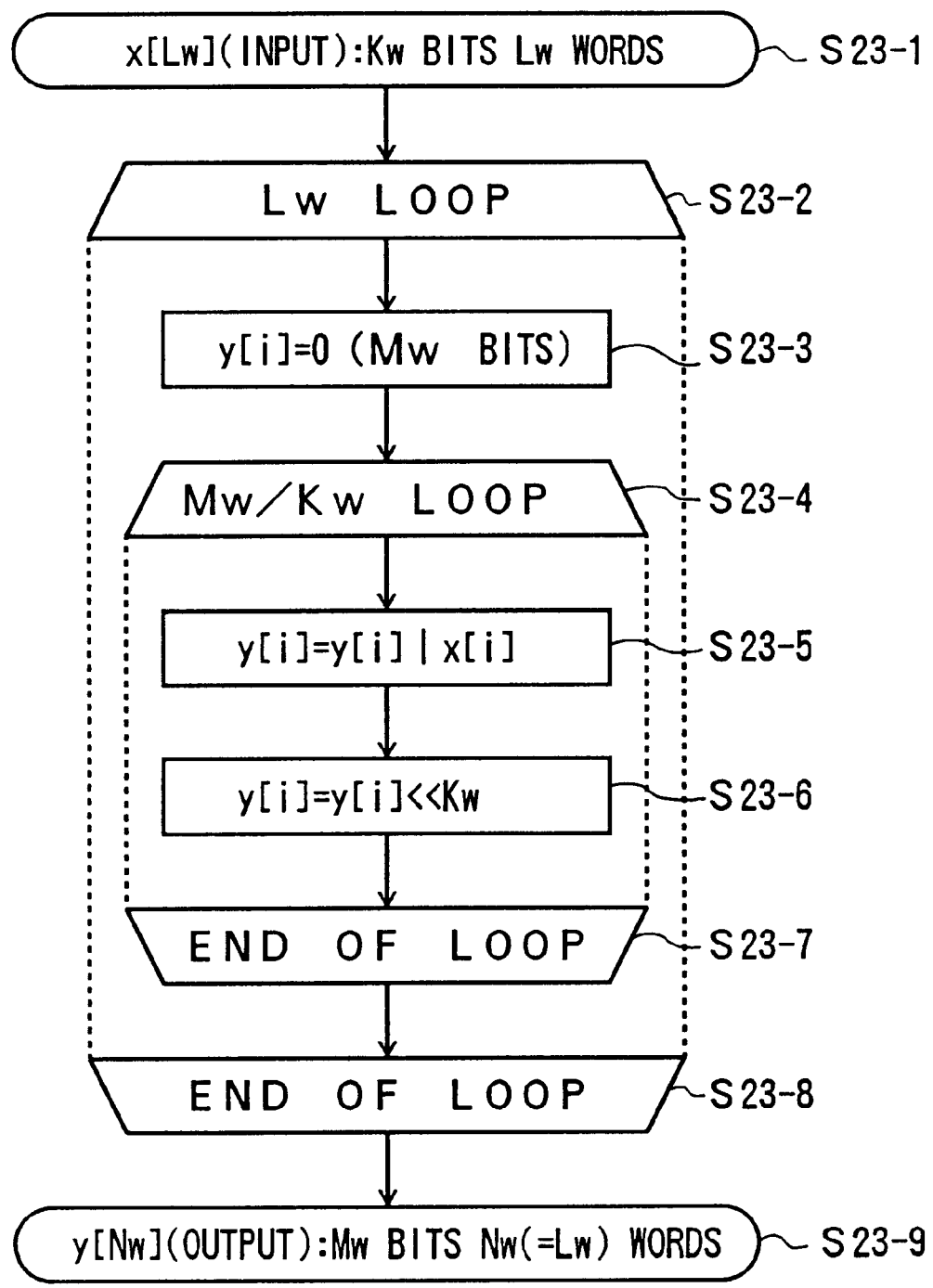
FIG. 23 is a flowchart of a process of generating data words in which each sub-word is comprised of a key code.

FIG. 23 is a flowchart of a process of generating data words in which each sub-word is comprised of a key code.

At a step S23-1, Lw data x[i] (i=1, ..., Lw) are provided. Here, each datum x[i] is a key code which is comprised of Kw bits.

At a step S23-2, a loop repeating Lw times based on a variable i is started.

At a step S23-3, datum y[i] comprised of Mw bits is set to zero.

At a step S23-4, a loop repeating Mw/Kw times is started. Here, Mw is the number of data-word bits (e.g., 32), and Kw is the number of sub-word bits (e.g., 8). At a step S23-5, a bit-wise OR operation is performed between y[i] and x[i], and an obtained result is substituted for an old value of y[i].

At a step S23-6, each bit of y[i] is shifted to the left by Kw bits. That is, the datum x[i] incorporated into y[i] at the step S23-5 is shifted to a sub-word second from the right.

At a step S23-7, a check is made whether the above procedure is repeated Mw/Kw times. If it is, the loop is ended.

At a step S23-8, a check is made whether the loop based on the variable i is repeated Lw times. If it is, the loop is ended.

At a step S23-9, Lw data y[i] are obtained as output data. Each datum y[i] has sub-words each of which is comprised of the key code. When y[i] is written into a predetermined address, thus, a key-code comparison is correctly made even when there is shuffling of sub-word orders.

In the system of FIG. 18, a switch between the client processor and the memory is made when data is written at a predetermined address, as previously described. In this case, it is preferable for the host processor to be able to confirm if a switch is actually made after an attempt to switch over to the client processor is made. To achieve this, the predetermined key data is read from the client processor, and the host processor performs a key comparison.

Figure 24:
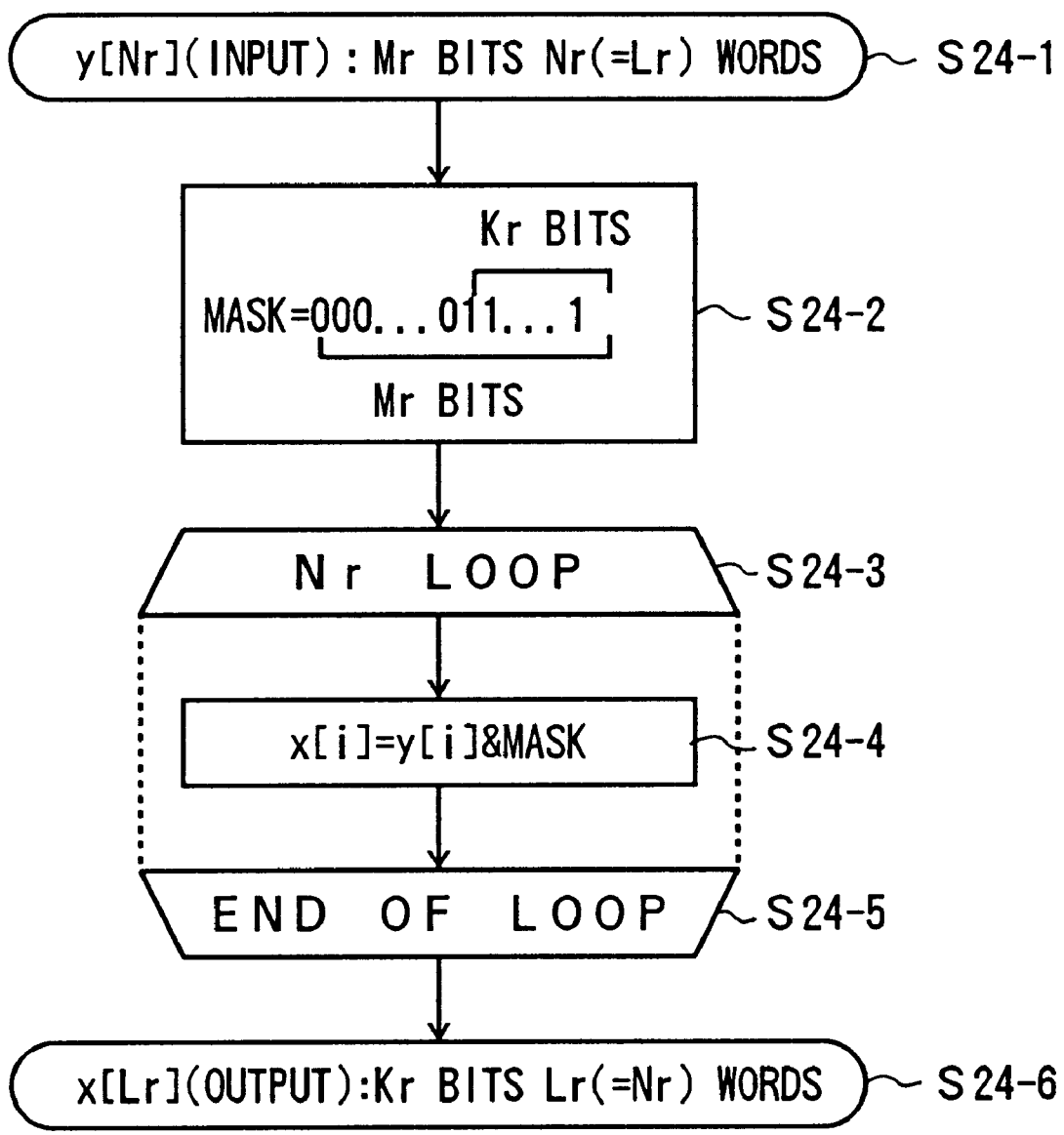
FIG. 24 is a flowchart of a process of reading data words in which each sub-word is comprised of a key code, and extracting the key code from the data words.

FIG. 24 is a flowchart of a process of reading data words in which each sub-word is comprised of a key code, and extracting the key code from the data words.

At a step S24-1, Nr data y[i] (i=1, ..., Nr) are read. Here, each datum y[i] is comprised of Mr bits.

At a step S24-2, a mask MASK which is comprised of Mr bits having lower Kr bits of 1 and the remaining bits of 0 is created.

At a step S24-3, a loop repeating Nr times based on a variable i is started.

At a step S24-4, a bit-wise AND operation is performed between the mask MASK and the datum y[i], and an obtained result is substituted for x[i].

At a step S24-5, a check is made whether the loop based on the variable i is repeated Nr times. If it is, the loop is ended.

At a step S24-6, Nr data x[i] are obtained as output data. Each datum x[i] is compared with the predetermined key code to allow the host computer to check whether an attempted switch has actually taken effect.

Figures 25A, 25B:
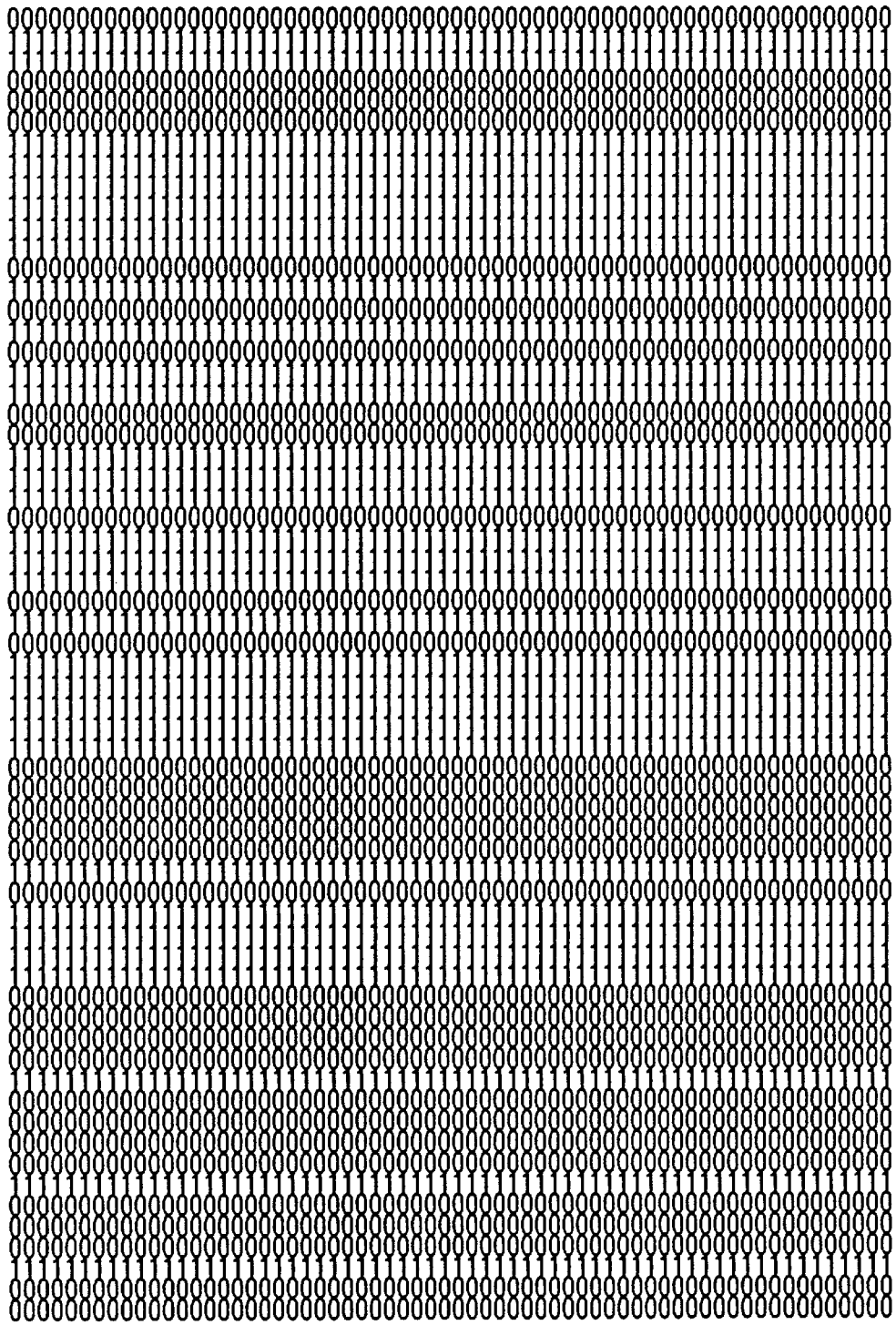
FIGS. 25A and 25B are illustrative drawings for explaining a key comparison which is made by using a time data series to avoid an effect of the shuffling of bit positions.

FIGS. 25A and 25B are illustrative drawings for explaining a key comparison which is made by using a time data series to avoid an effect of the shuffling of bit positions. As shown in FIG. 25A, a plurality of data words, each of which is either an all-zero bit pattern or an all-one bit pattern, are written into the memory space. If one bit is taken out from each of the data words and arranged in a time order, a time data series as shown in FIG. 25B can be formed. This time data series is not affected by whatever shuffling of bit positions occurring through the memory interface, and, thus, can be used as data for a key comparison.

Figure 26:
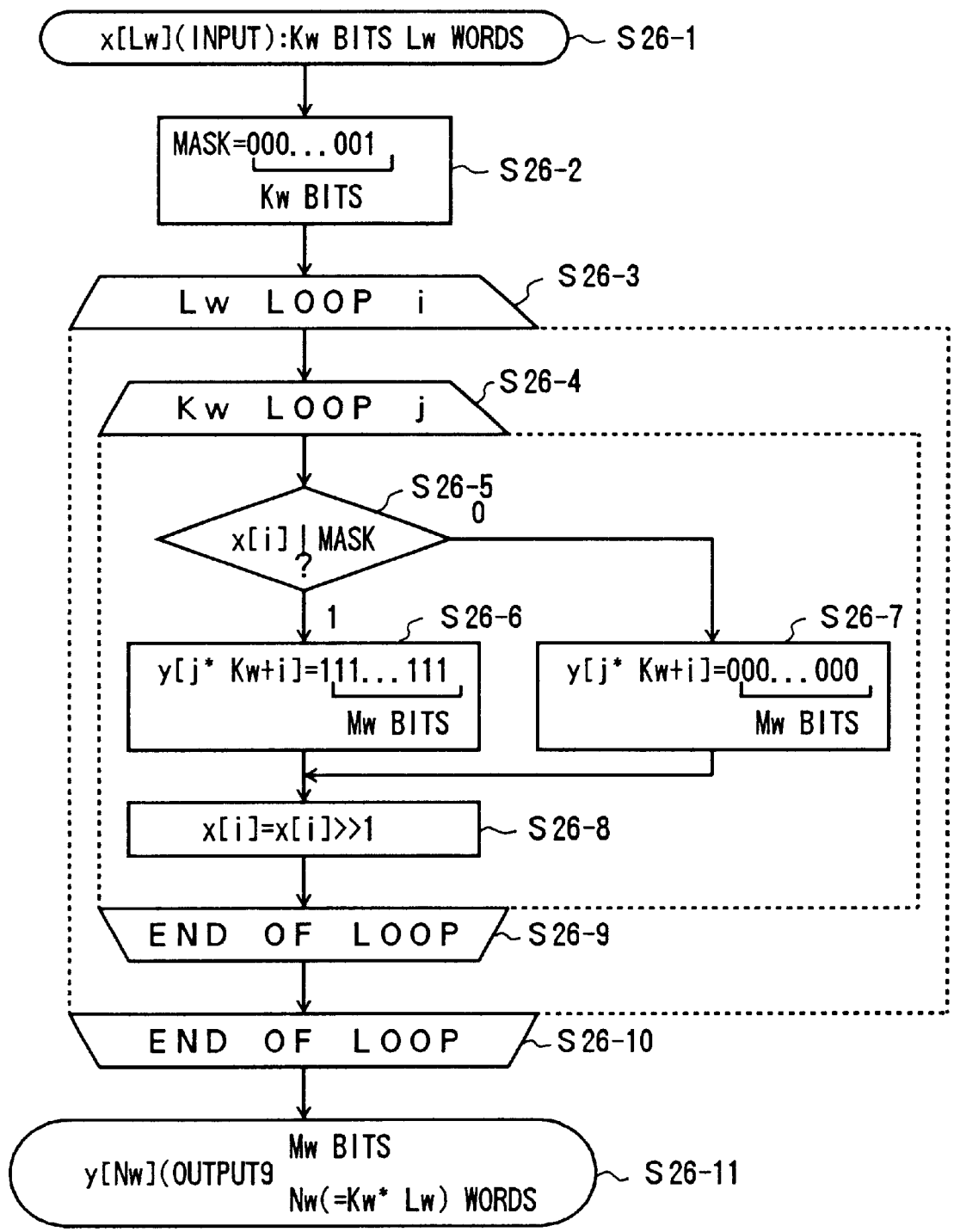
FIG. 26 is a flowchart of a process of generating data based on a key code so that the data has each bit thereof representing one bit of the key code in a time order.

FIG. 26 is a flowchart of a process of generating data based on a key code so that the data has each bit thereof representing one bit of the key code in a time order.

At a step S26-1, Lw data x[i] (i=1, ..., Lw) are provided. Here, each datum x[i] is a key code which is comprised of Kw bits.

At a step S26-2, a mask MASK comprised of Kw bits is created. Only the least significant bit of the mask MASK is 1, and other bits are 0.

At a step S26-3, a loop repeating Lw times based on a variable j is started.

At a step S26-4, a loop repeating Kw times based on a variable i is started.

At a step S26-5, an OR operation is performed between x[i] and the mask MASK. If the resulting value is 1, the procedure goes to a;step S26-6. Otherwise, the procedure goes to a step S26-7.

At the step S26-6, datum y[jKw+i] comprised of Mw bits are set to 1 with respect to all bits thereof.

At the step S26-7, the datum y[jKw+i] comprised of Mw bits are set to 0 with respect to all bits thereof.

At a step S26-8, x[i] is shifted to the right by one bit.

At a step S26-9, a check is made whether the loop based on the variable i is repeated Kw times. If it is, the loop is ended.

At a step S26-10, a check is made whether the loop based on the variable j is repeated Lw times. If it is, the loop is ended.

At a step S26-11, (Kw)×(Lw) data y[i] are obtained as output data. Each datum y[i] is comprised of Mw bits, where either all of the Mw bits are 0 or all of the Mr bits are 1. When a line of bits is taken from the data y[i] along a time line (in a direction in which the variable i changes), the line of bits represents a time series corresponding to the key code. When the data y[i] is written in a predetermined address, a key comparison will produce a correct comparison result even when there a is bit-position shuffling.

Figure 27:
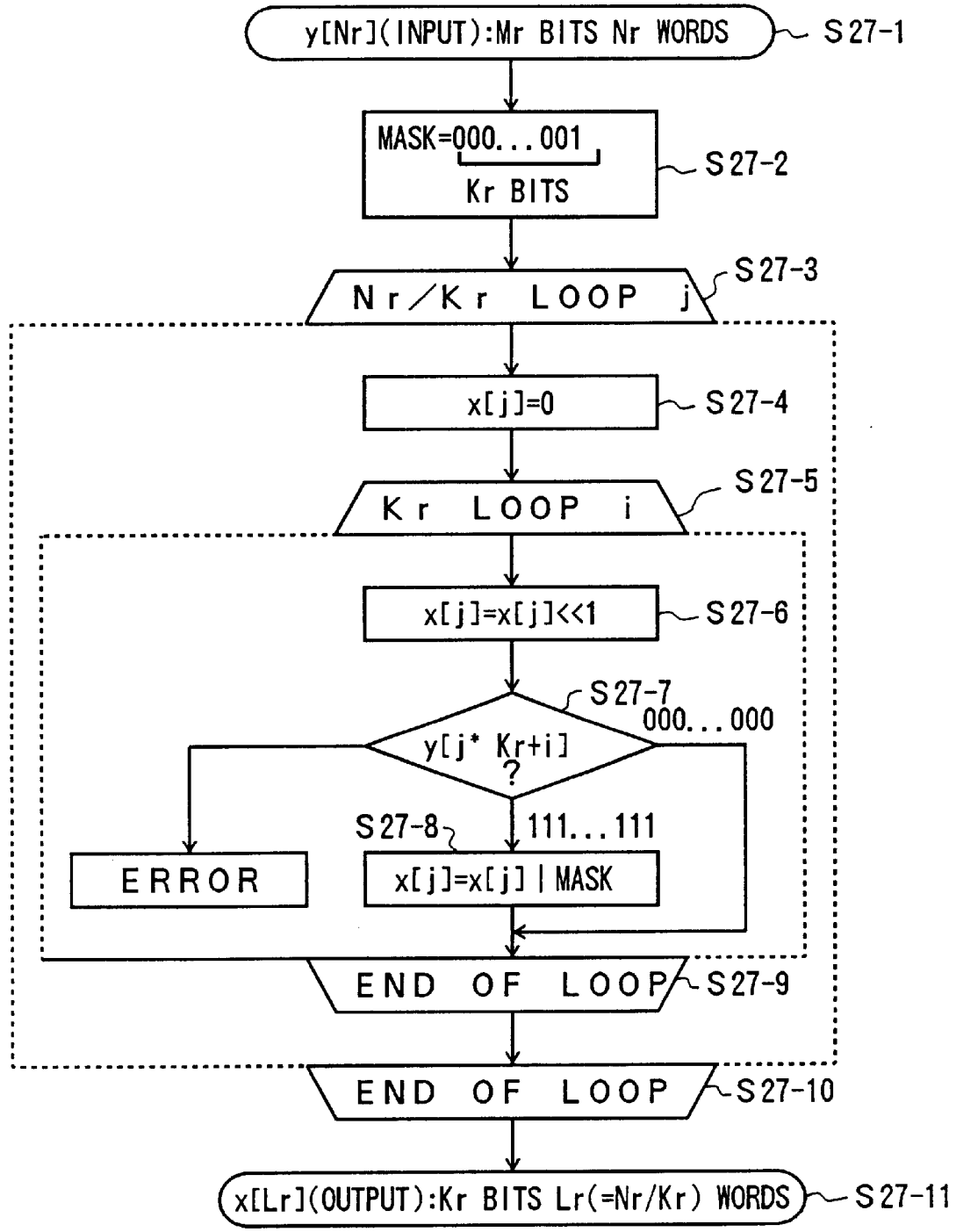
FIG. 27 is a flowchart of a process of extracting a key code from data that is read.

FIG. 27 is a flowchart of a process of extracting a key code from data that is read.

At a step S27-1, Nr data y[i] (i=1, . . . , Nr) are read. Here, each datum y[i] is comprised of Mr bits.

At a step S27-2, a mask MASK which is comprised of Mr bits having a value of 1 only in the least significant bit is created.

At a step S27-3, a loop repeating Nr/Kr times based on a variable j is started.

At a step S27-4, datum x[j] comprised of Kr bits is set to zero.

At a step S27-5, a loop repeating Kr times based on a variable i is started.

At a step S27-6, x[j] is shifted to the left by one bit.

At a step S27-7, a value of y[jKr+i] is checked. If all the bits are 1, the procedure goes to a step S27-8. If all the bits are 0, the procedure goes to a step S27-9. Otherwise, the procedure ends with an error report.

At a step S27-8, a bit-wise OR operation is performed between the mask MASK and the datum x[j], and an obtained result is substituted for x[j].

At a step S27-9, a check is made whether the loop based on the variable i is repeated Kr times. If it is, the loop is ended.

At a step S27-10, a check is made whether the loop based on the variable j is repeated Nr/Kr times. If it is, the loop is ended.

At a step S27-11, Nr/Kr data x[i] are obtained. Each datum x[i] is comprised of Kr bits. Each datum x[i] is compared with the predetermined key code to allow the host computer to check whether an attempted switch has actually taken effect.

Figure 28:
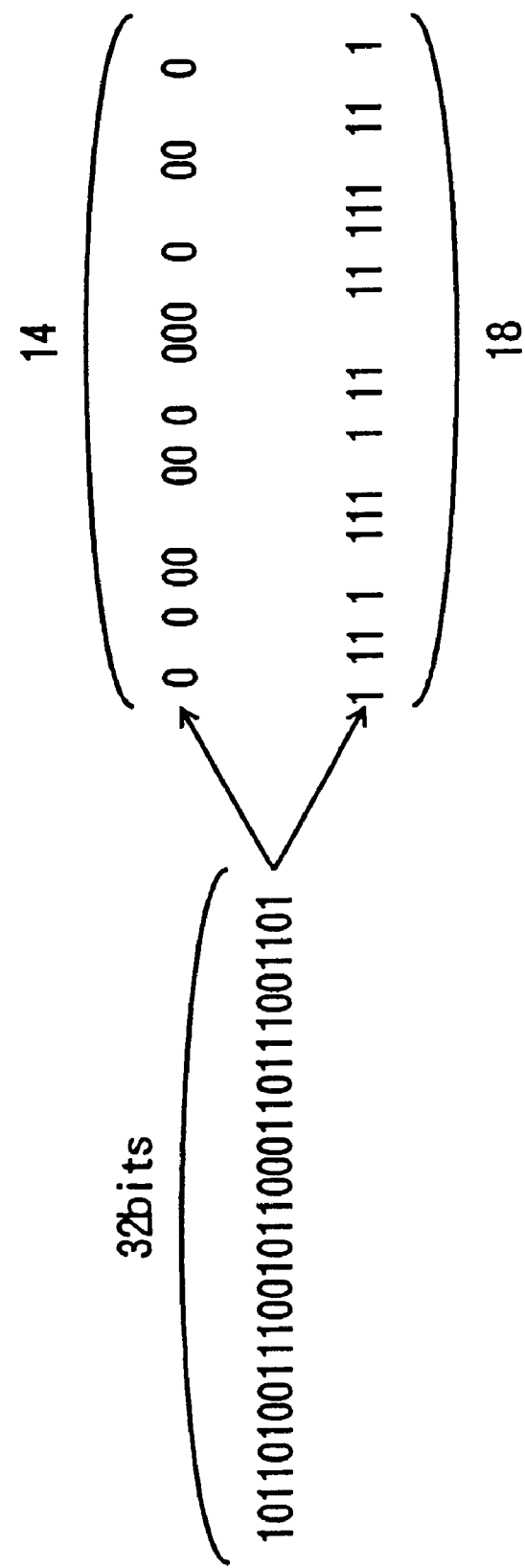
FIG. 28 is an illustrative drawing for explaining a key comparison which is made based on the number of 0s or 1s so as to nullify the effect of the bit-position shuffling.

FIG. 28 is an illustrative drawing for explaining a key comparison which is made based on the number of 0s or 1s so as to nullify the effect of the bit-position shuffling. Counting the numbers of 0s and 1s included in a data word shown in the figure finds that there are fourteen 0s and eighteen 1s. The numbers of 0s and 1s included in a data word do not change whatever bit-position shuffling takes place through the memory interface. The numbers of 0s and 1s thus can be used as data for a key comparison.

Figure 29:
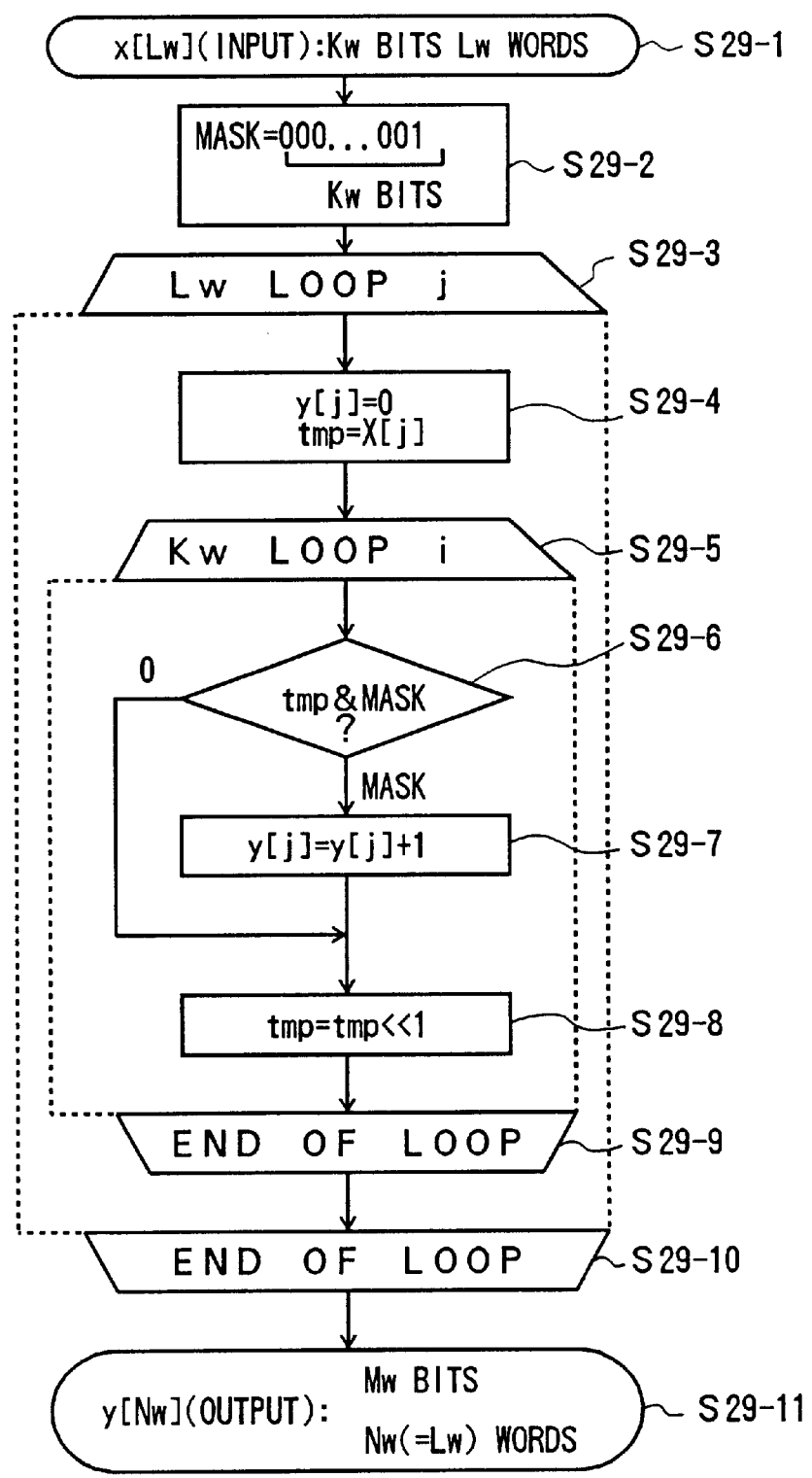
FIG. 29 is a flowchart of a process of counting the number of is included in each data word when a plurality of data words are provided.

FIG. 29 is a flowchart of a process of counting the number of is included in each data word when a plurality of data words are provided.

At a step S29-1, Lw data x[i] (i=1, . . . , Lw) are provided. Here, each datum x[i] is comprised of Kw bits.

At a step S29-2, a mask MASK comprised of Kw bits is created. only the least significant bit of the mask MASK is 1, and other bits are 0.

At a step S29-3, a loop repeating Lw times based on a variable j is started.

At a step S29-4, y[j] is set to zero, and a variable temp is set equal to x[j].

At a step S29-5, a loop repeating Kw times based on a variable i is started.

At a step S29-6, a bit-wise AND operation is performed between the variable temp and the mask MASK. If the resulting value is 0, the procedure skips a step S29-7. If the resulting value is equal to the mask MASK, the procedure goes to the step S29-7.

At the step S29-7, y[j] is incremented by 1.

At a step S29-8, the variable temp is shifted to the right by one bit.

At a step S29-9, a check is made whether the loop based on the variable i is repeated Kw times. If it is, the loop is ended.

At a step S29-10, a check is made whether the loop based on the variable j is repeated Lw times. If it is, the loop is ended.

At a step S29-11, Lw data y[j] (j=1, . . . , Lw) are obtained. Namely, when a plurality of data words x is provided, the number of 1s included in each data word is counted to generate data y representing the numbers of 1s.

Figure 30:
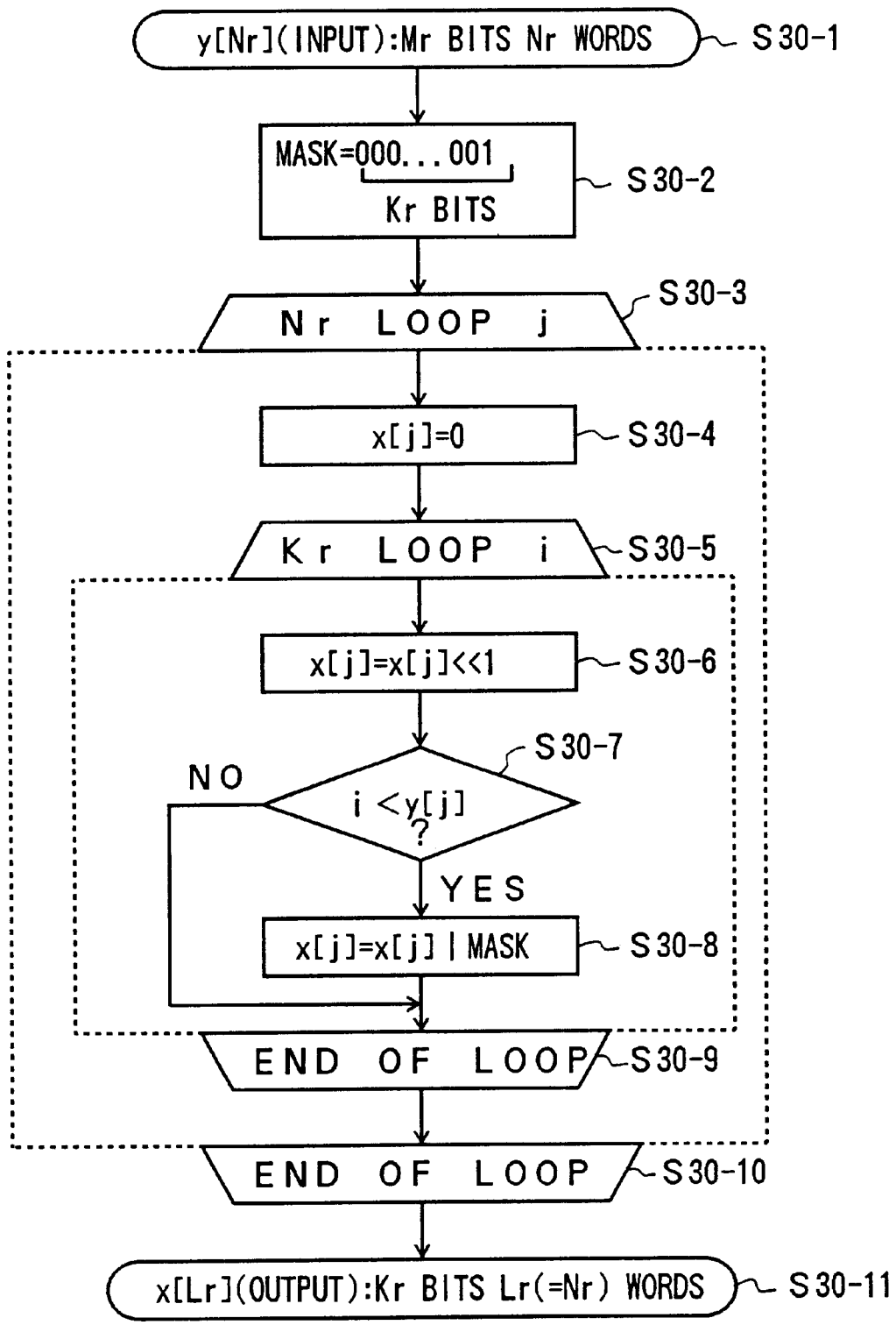
FIG. 30 is a flowchart of a process of generating a plurality of data words such that the number of is included in a given data word is equal to a number that is represented by a corresponding input data word when a plurality of input data words are supplied.

FIG. 30 is a flowchart of a process of generating a plurality of data words such that the number of is included in a given data word is equal to a number that is represented by a corresponding input data word when a plurality of input data words are supplied.

FIG. 30 is a flowchart of a process of extracting a key code from data that is read.

At a step S30-1, Nr data y[i] (i=1,. . . , Nr) are supplied. Here, each datum y[i] is comprised of Mr bits.

At a step S30-2, a mask MASK which is comprised of Mr bits having a value of 1 only in the least significant bit is created.

At a step S30-3, a loop repeating Nr times based on a variable j is started.

At a step S30-4, x[j] is set to zero.

At a step S30-5, a loop repeating Kr times based on a variable i is started.

At a step S30-6, x[j] is shifted to the left by one bit.

At a step S30-7, a check is made whether the variable i is smaller than y[j]. If it is not, the procedure skips a step S30-8. Otherwise, the procedure goes to the step S30-8.

At the step S30-8, a bit-wise OR operation is performed between the mask MASK and the datum x[j], and an obtained result is substituted for x[j].

At a step S30-9, a check is made whether the loop based on the variable i is repeated Kr times. If it is, the loop is ended.

At a step S30-10, a check is made whether the loop based on the variable j is repeated Nr times. If it is, the loop is ended.

At a step S30-11, Nr data x[j] (j=1, . . . , Nr) are obtained. Each datum x[j] is comprised of Kr bits, in which y[j] bits are 1 and remaining bits are 0. Namely, a plurality of data words x are obtained such that the number of 1s included in a given data word x is equal to a number that is represented by a corresponding data word y when a plurality of data words y are supplied.

Figure 31:
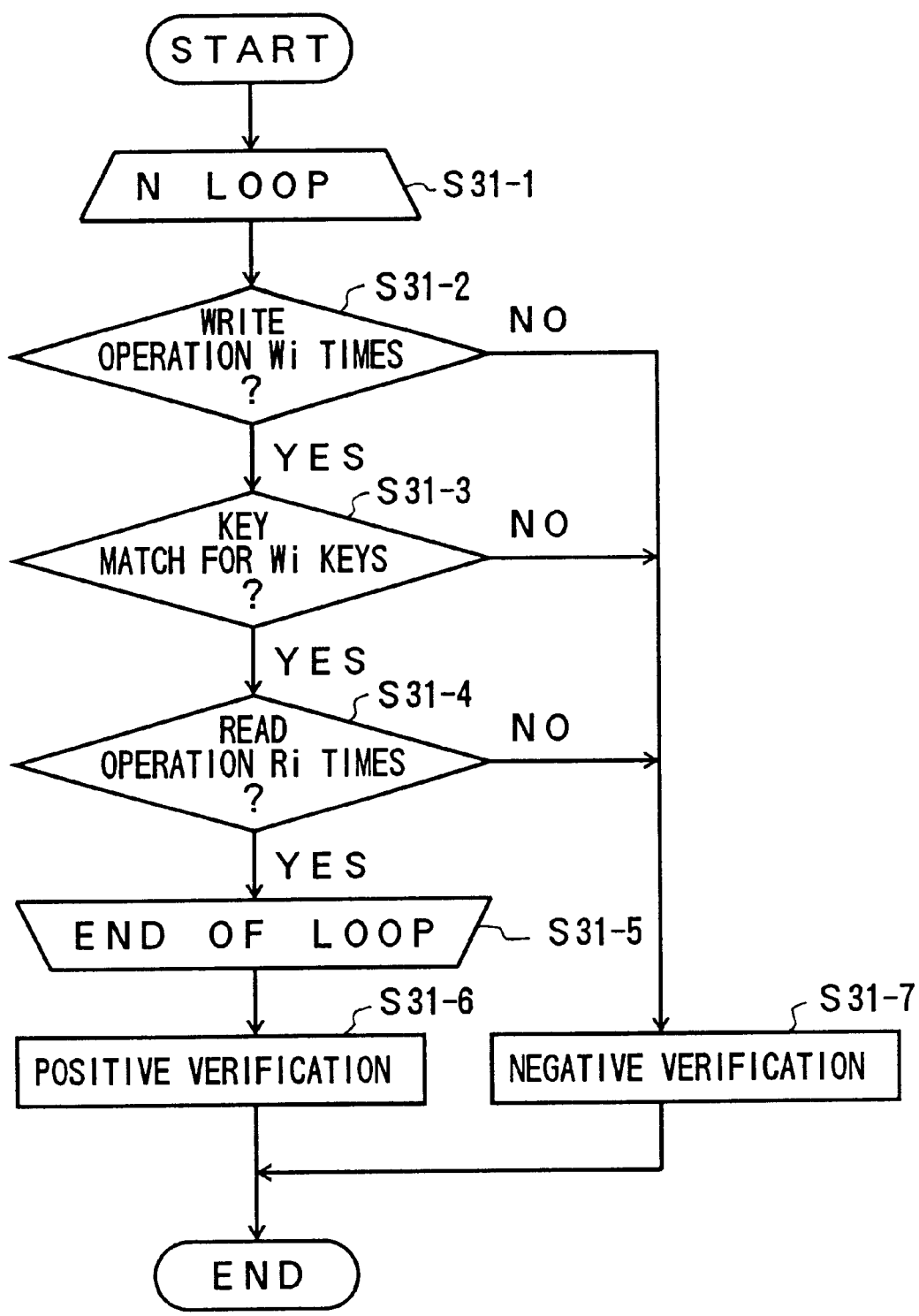
FIG. 31 is a flowchart of a variation of the switching process based on a key comparison.

FIG. 31 is a flowchart of a variation of the switching process based on a key comparison.

As previously described, a plurality of key data may be written in the memory space and compared with a plurality of key codes, so as to achieve a highly reliable verification (i.e., verification of a switch request) excluding a possibility of a coincidental match. A reliability of the verification can be further enhanced by checking the number of write operations and the number of read operations in addition to the checking of key information.

At a step S31-1, a loop repeating N times is started.

At a step S31-2, a check is made whether a write operation for writing key data has been conducted exactly Wi times. If it has, the procedure goes to a step S31-3. Otherwise, the procedure goes to a step S31-7.

At the step S31-3, a check is made whether all of Wi key data match corresponding key codes. If they do, the procedure goes to a step S31-4. Otherwise, the procedure goes to the step S31-7.

At the step S31-4; a check is made whether the number of read operations conducted for reading data is Ri. If it is, the procedure goes to a step S31-5. Otherwise, the procedure goes to the step S31-7. Here, the read operations mean reading some data from a predetermined address. All that matters here is only the number of executed read instructions, and the contents of data obtained through the read operations are irrelevant with regard to this verification operation. Only the counted number is used in the verification process.

At the step S31-5, the loop having repeated N times is finished.

At a step S31-6, it is ascertained that the verification has given a positive result.

At the step S31-7, it is ascertained that the verification has given a negative result.

In this manner, the number of data-read operations and the number of data-write operations are checked in addition to the check of key information so as to achieve a highly reliable verification, excluding a possibility of a coincidental match.

Figure 32:
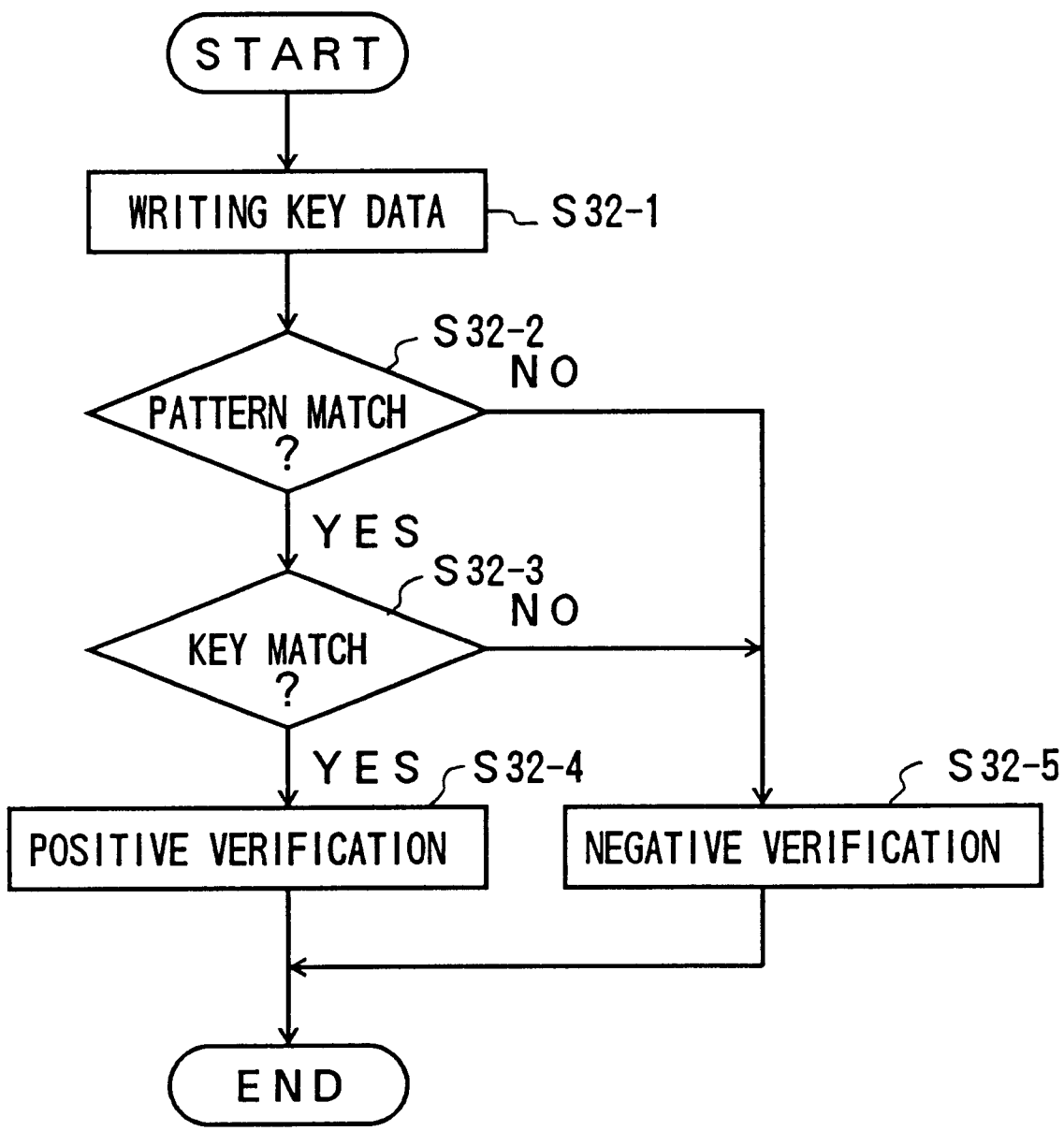
FIG. 32 is a flowchart of another variation of the switching process based on a key comparison.

FIG. 32 is a flowchart of another variation of the switching process based on a key comparison.

In the process of FIG. 32, a check is made whether a predetermined pattern included in key data matches a verification pattern prior to the checking of key information. This process excludes cases in which no pattern match is obtained before conducting the check of key information, so that a verification process can be conducted at a higher speed.

At a step S32-1, key data is written.

At a step S32-2, a check is made whether a predetermined pattern in the key data matches a verification pattern. If it does, the procedure goes to a step S32-3. Otherwise, the procedure goes to a step S32-5.

At the step S32-3, a check is made whether a key match is found. If it is, the procedure goes to a step S32-4. Otherwise, the procedure goes to the step S32-5.

At the step S32-4, it is ascertained that the verification has given a positive result.

At the step S32-5, it is ascertained that the verification has given a negative result.

In this manner, a check is made whether a match is found for a predetermined pattern so as to exclude cases in which no pattern match is obtained before conducting the check of key information, so that a verification process can be conducted at a higher speed.

Here, the above-mentioned predetermined pattern may be a pattern which is included in a data word written as key data when the system does not shuffle bit positions. In systems in which bit positions are shuffled, the predetermined pattern may be a pattern which is contained in key data extracted from written data words, or may be a pattern which is contained in a data word itself.

Figure 33:
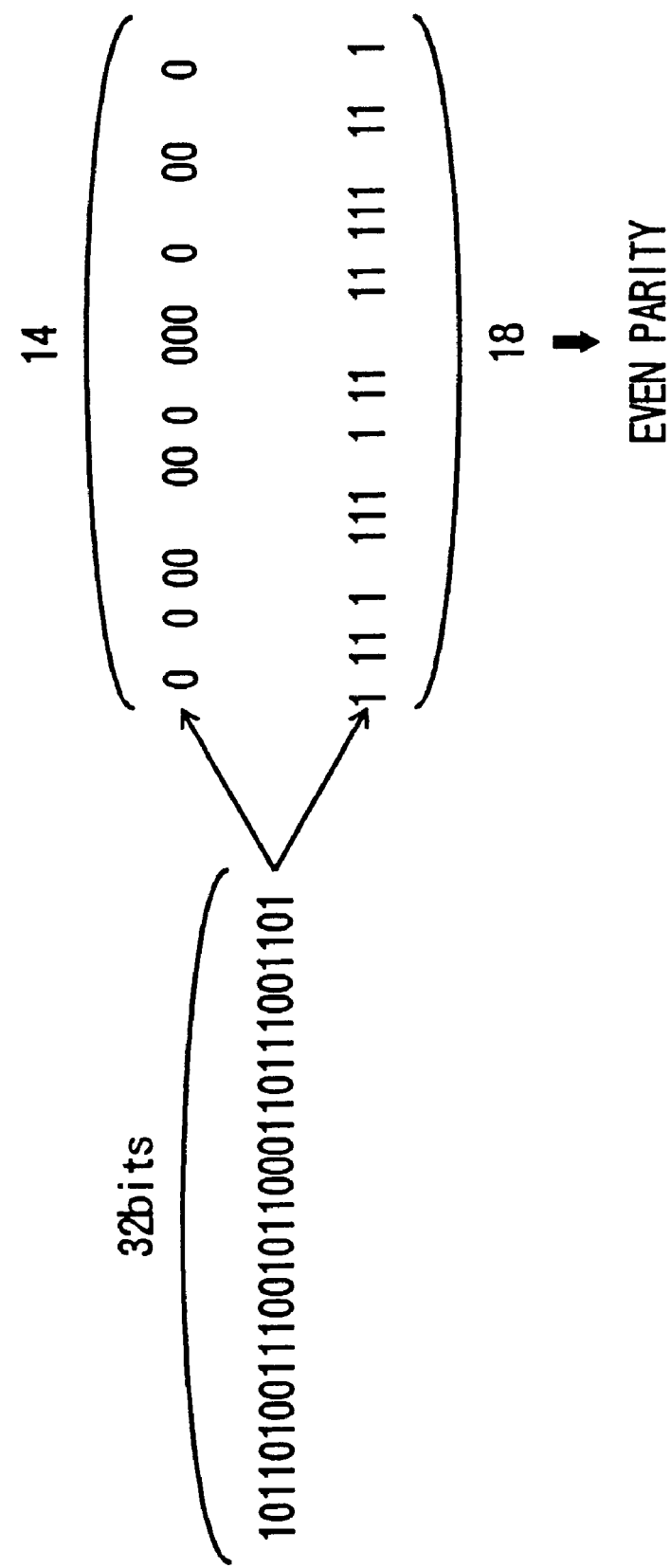
FIG. 33 is an illustrative drawing for explaining a pattern-check process in which parity is used as a predetermined pattern.

FIG. 33 is an illustrative drawing for explaining a pattern-check process in which parity is used as the predetermined pattern.

Counting the number of is included in a 32-bit data word of the figure reveals that there are eighteen is, and parity is even. If such a parity check is conducted prior to the check of key information, cases in which keys do not match can be quickly excluded in advance.

Figure 34:
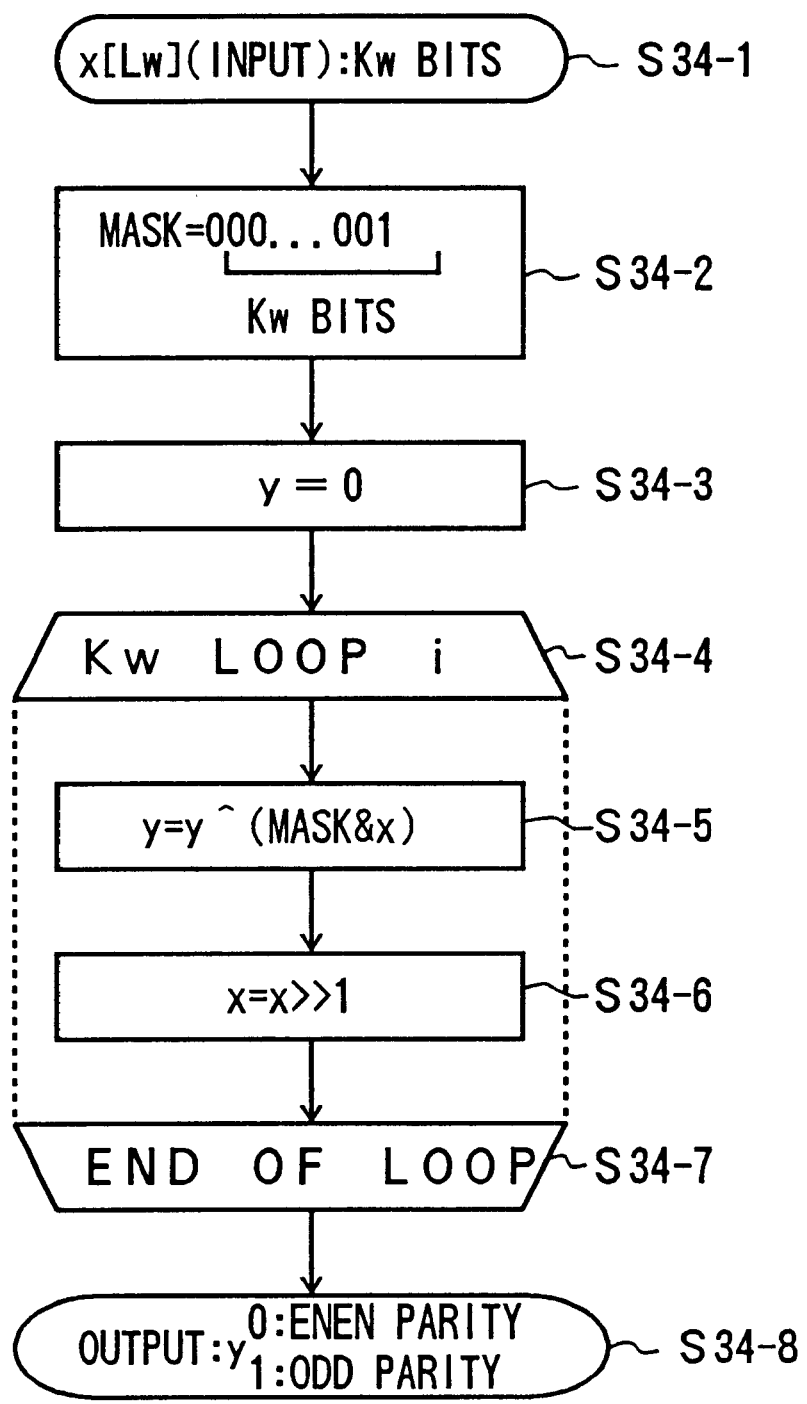
FIG. 34 is a flowchart of a process of checking supplied data with regard to parity thereof.

FIG. 34 is a flowchart of a process of checking supplied data with regard to parity thereof.

At a step S34-1, data x comprised of Kw bits is supplied.

At a step S34-2, a mask MASK which is comprised of Kw bits and has a value of 1 only at the least significant bit is created.

At a step S34-3, a variable y is set to zero.

At a step S34-4, a loop repeating Kw times based on a variable i is started.

At a step S34-5, an AND operation is performed between the mask MASK and the data x, and, further, an EXOR operation is taken between the result of the AND operation and the variable y.

At a step S34-6, the data x is shifted to the right by one bit.

At a step S34-7, the loop is ended when the above-procedure is repeated Kw times.

At a step S34-8, the variable y is checked. If the variable y is 0, the number of 1s in the data x is even. If the variable y is 1, the number of is in the data x is odd.

When a pattern check is to be made, even parity, for example, is used as a verification pattern. Namely, the procedure shown in the flowchart of FIG. 34 is performed with regard to data x, and it is ascertained that the predetermined pattern matches the verification pattern when the obtained result y shows even parity.

FIG. 35 is an illustrative drawing for explaining a process of making a pattern check using a predetermined set of bits included in the data.

As shown in the figure, a plurality of bits are extracted from data at predetermined bit positions, and a set of these bits is to be used as the predetermined pattern for pattern check. If a check is made as to whether this pattern matches a verification pattern prior to the check of key information, cases in which keys do not match can be quickly excluded in advance.

Figure 36:
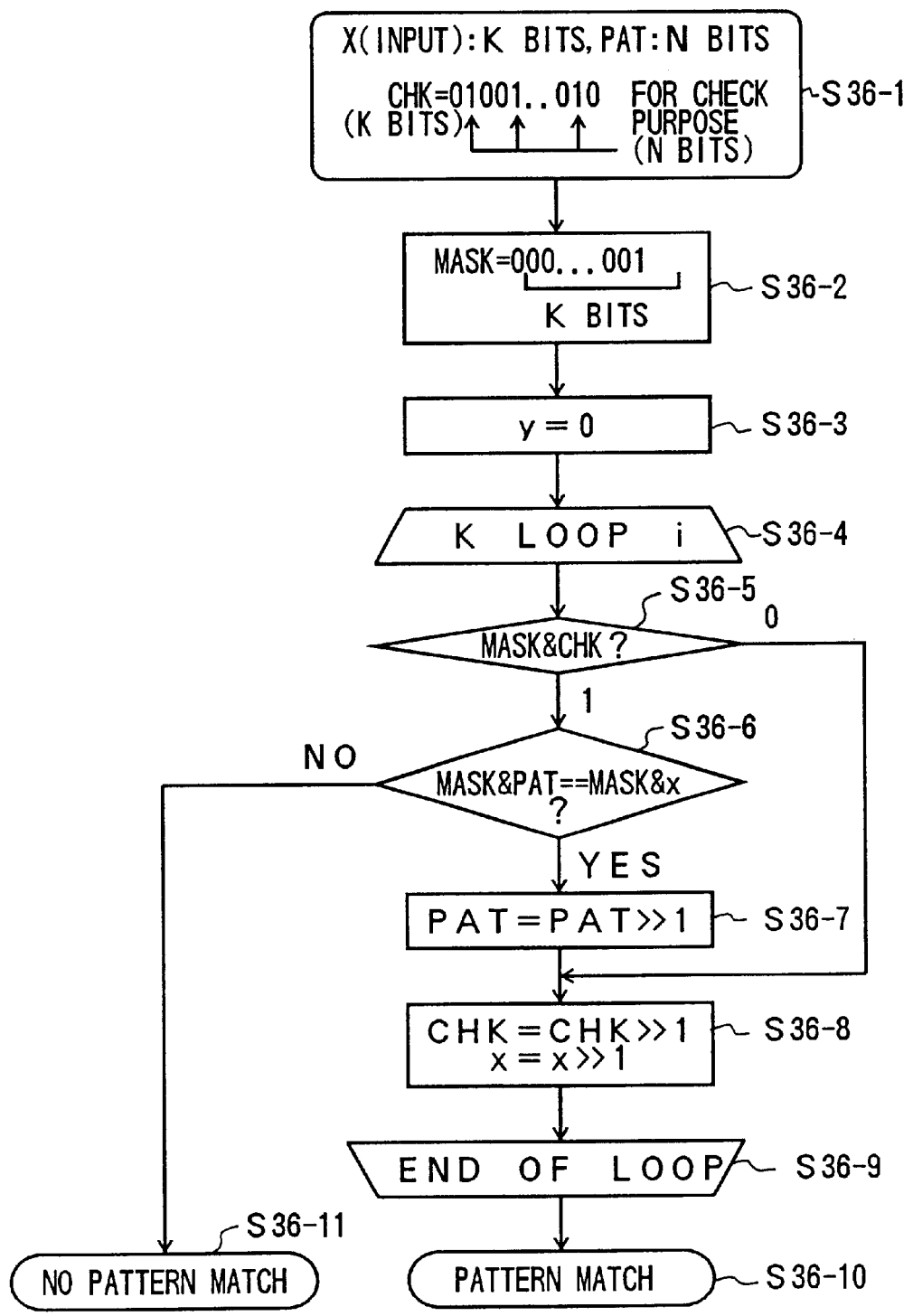
FIG. 36 is a flowchart of a method of extracting a predetermined set of bits from supplied data and using the predetermined set for pattern check.

FIG. 36 is a flowchart of a method of extracting a predetermined set of bits from supplied data and using the predetermined set for pattern check.

At a step S36-1, data x comprised of K bits is supplied. Further, data.CHK comprised of K bits used for check as well as a verification pattern PAT comprised of N bits are prepared. The data CHK has a bit value of 1 at predetermined bit positions, and has a bit value of 0 at other bit positions. The number of bits that are 1 is N.

At a step S36-2, a mask MASK which is comprised of K bits and only the least significant bit thereof is 1 is created.

At a step S36-3, data y is set to zero.

At a step S36-4, a loop repeating K times based on a variable i is started.

At a step S36-5, a check is made whether an AND operation between the mask MASK and the data CHK produces a result of 1 or a result of 0. If the result is 1, the procedure goes to a step S36-6. If the result is 0, the procedure goes to a step S36-8.

At a step S36-6, a check is made whether an AND operation between the mask MASK and the data x produces the same result as an AND operation between the mask MASK and the verification pattern PAT. If it does, the procedure goes to a step S36-7. Otherwise, the procedure goes to a step S36-11.

At the step S36-7, the verification pattern PAT is shifted to the right by one bit.

At a step S36-8, the data CHK and the data x are shifted to the right by one bit.

At a step S36-9, the loop based on the variable i is ended when the loop is repeated K times.

At a step S36-10, it is ascertained that a pattern match is found.

At the step S36-11, it is ascertained that no pattern match is found.

In this manner, a comparison can be made between the verification pattern and a set of bits provided at predetermined bit positions of the data x.

FIG. 37 is an illustrative drawing for explaining a pattern-check process which is performed based on whether a supplied data word is comprised of a predetermined pattern.

Taken as an example here is a case in which, as shown in FIG. 25A, data words either comprised of 0s or comprised of 1s define a time series which is to be used for a key comparison. As shown in FIG. 37, a pattern check is readily performed by checking whether or not a given data word has all bits thereof comprised of the same bits which are either 0 or 1. Namely, if all bits are comprised of the same bits, a positive verification is obtained. If all bits are not comprised of the same bits, the verification process rejects demand for the switch. If this pattern check is performed prior to a key comparison, cases in which keys do not match can be excluded in advance.

Figure 38:
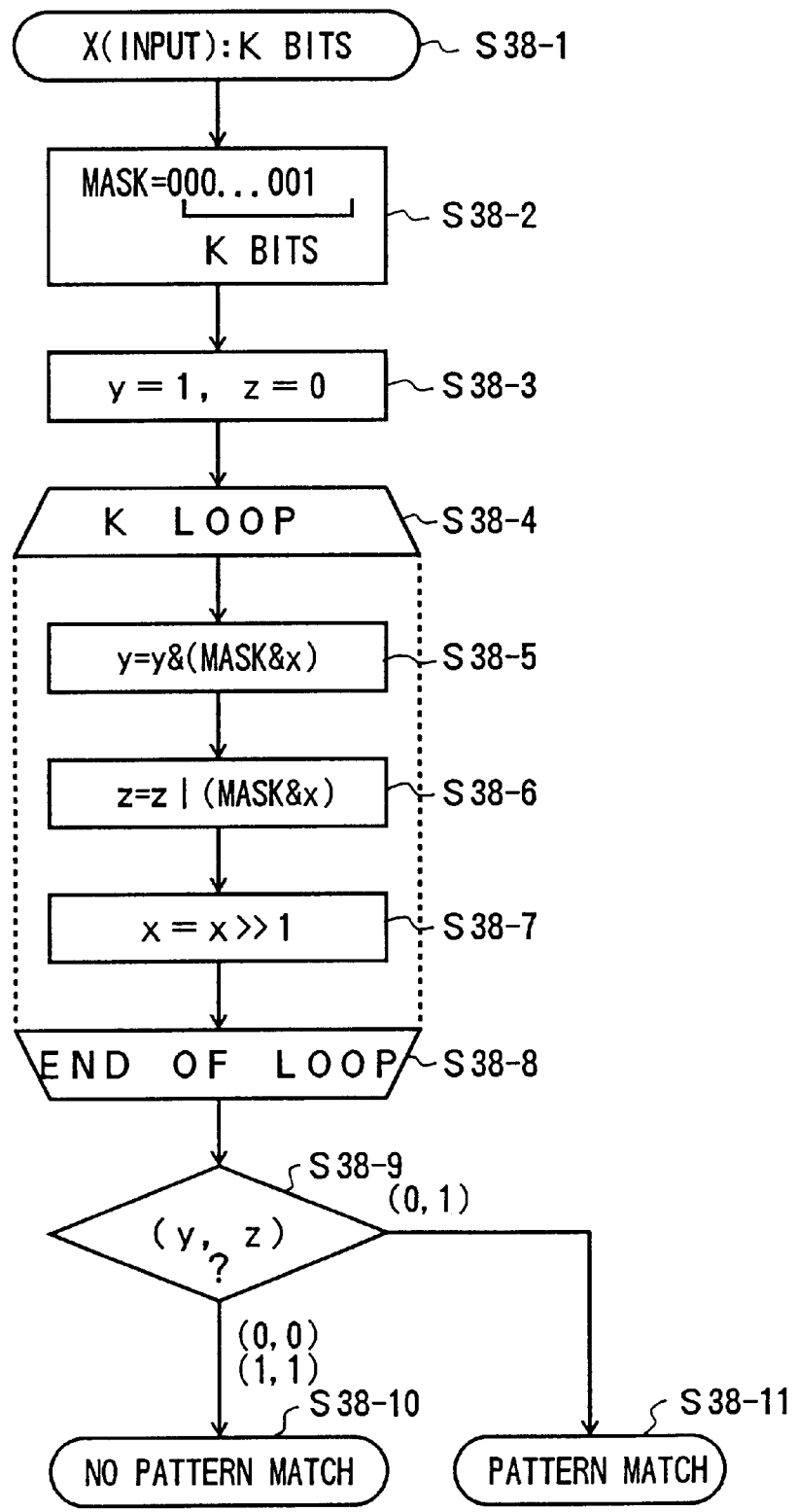
FIG. 38 is a flowchart of a process of checking whether a supplied data word is comprised of 0s or comprised of 1s.

FIG. 38 is a flowchart of a process of checking whether a supplied data word is comprised of 0s or comprised of 1s.

At a step S38-1, datum x comprised of K bits is supplied.

At a step S38-2, a mask MASK which is comprised of K bits and has a bit value of 1 only at the least significant bit thereof is created.

At a step S38-3, datum y is set to 1, and datum z is set to 0.

At a step S38-4, a loop repeating K times based on a variable i is started.

At a step S38-5, an AND operation is taken between the mask MASK and the datum x, and a further AND operation is taken between the result of the AND operation and the datum y. The obtained result is substituted for the datum y.

At a step S38-6, an AND operation is taken between the mask MASK and the datum x, and, further, an OR operation is taken between the result of the AND operation and the datum z. The obtained result is substituted for the datum z.

At the step S38-7, the datum x is shifted to the right by one bit.

At a step S38-8, the loop based on the variable i is ended when the loop is repeated K times.

At a step S38-9, a value of the datum y and a value of the datum z are checked. If both values are 0 or both values are 1, the procedure goes to a step S38-10. Otherwise, the procedure goes to a step S38-11.

At a step S38-10, it is ascertained that a pattern match is found.

At the step S38-11, it is ascertained that no pattern match is found.

In this manner, a check is made as to whether or not all the bits of the datum x are comprised of the same bits of either 0s or 1s. That is, a comparison with a verification pattern is made.

In what follows, a description will be given with regard to a process of allocating a memory area which becomes necessary when the host processor controls the client processor. When an attempt is made to allocate a memory area to the client processor, an area usable by the client processor might be already occupied by another application process. In this case, reallocation of memory areas is necessary in order to provide a memory area for the client processor.

Figure 39:
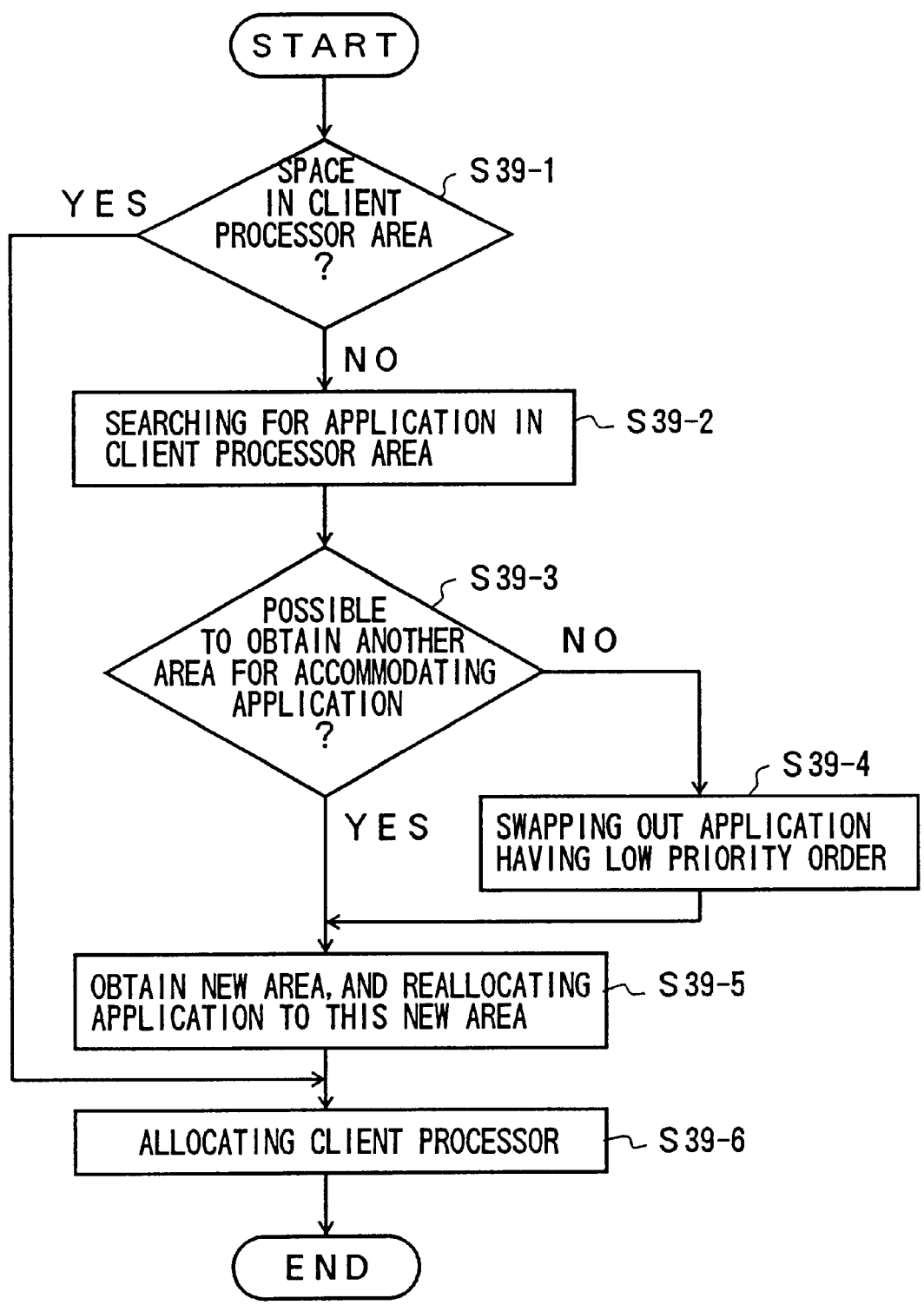
FIG. 39 is a flowchart of a process of acquiring a memory area by means of OS (operating system) functions of a host processor.

FIG. 39 is a flowchart of a process of acquiring a memory area by means of Os (operation system) functions of the host processor.

At a step S39-1, a check is made whether an area usable by the client processor has space to accommodate another process. If there is space, the procedure goes to a step S39-6. Otherwise, the procedure goes to a step S39-2.

At the step S39-2, a search is made for applications which are currently using the client processor area.

At a step S39-3, a check is made whether it is possible to obtain another area for accommodating the applications currently occupying the client processor area. If it is, the procedure goes to a step S39-5. Otherwise, the procedure goes to a step S39-4.

At the step S39-4, an application having a low priority order is swapped out.

At the step S39-5, an area is obtained for accommodating an application which is currently using the client processor area, and the application is reallocated to the newly obtained area.

At the step S39-6, the client processor is allocated to the created vacant area.

In this manner, reallocation of the client processor area is attended to by means of OS functions of the host processor.

Figure 40:
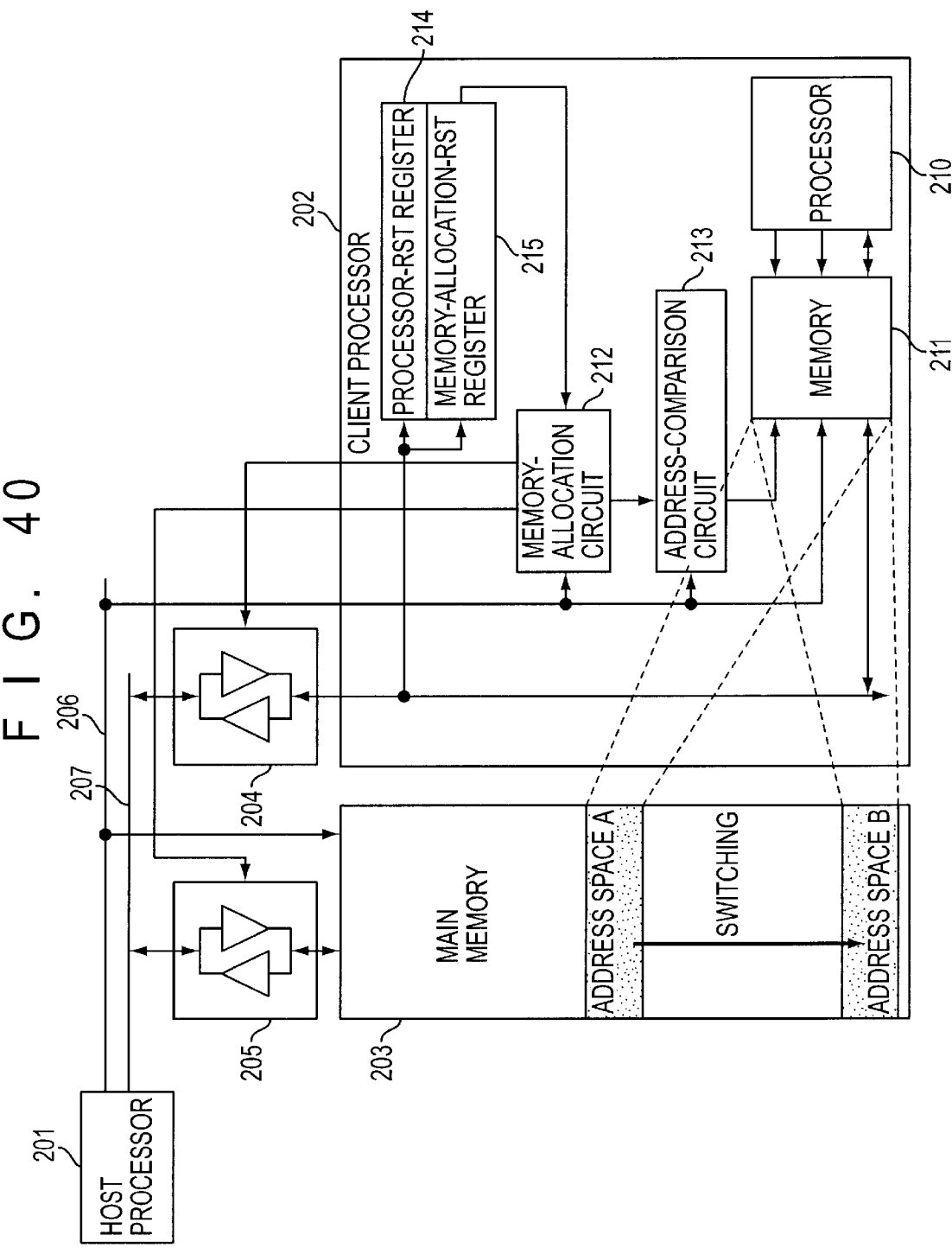
FIG. 40 is a block diagram of a system in which control of allocating memory areas and control of switching applications are carried out independently from each other.

FIG. 40 is a block diagram of a system in which control of allocating memory areas and control of switching applications are carried out independently from each other.

A system of FIG. 40 includes a host processor 201, a client processor 202, a main memory 203, a switch 204, a switch 205, an address bus 206, and a data bus 207.

The host processor 201 allocates a client processor area to the memory space of the main memory 203, and controls the allocated area.

The client processor 202 exchanges data with the host processor 201 through an interface established in the memory space of the main memory 203.

The main memory 203 is a work memory directly connected to the host processor 201.

The client processor 202 includes a processor 210, a memory 211, a memory-allocation circuit 212, an address-comparison circuit 213, a processor-RST register 214, and a memory-allocation-RST register 215.

The host processor 201 writes control information and data in an area which the host processor 201 allocated in the memory space. In response, the processor 210 receives the control information and the data to attend to data processing. Data obtained as a result of the processing is written in the memory 211, and is passed to the host processor 201.

The memory 211 provides a memory space which overlaps the main memory space of the main memory 203. The memory space of the memory 211 is allocated to an address space of the processor 210. Through this allocated memory space, the host processor 201 and the client processor 202 can communicate with each other.

The memory-allocation circuit 212 operates when the client processor 202 is not allocated to the main memory, and monitors an access request which is sent from the host processor 201. The memory-allocation circuit 212 learns which portion of the main memory should be allocated to the client processor 202 when a predetermined access of a special kind (e.g., an access by key information) is attempted, and, then, allocates the client processor 202 to this portion of the memory space.

The address-comparison circuit 213 operates after the client processor 202 is allocated to the main memory. The address-comparison circuit 213 checks whether an access from the host processor 201 is directed to the client processor area, an address of which is kept in the memory-allocation circuit 212.

The processor-RST register 214 is used for resetting the processor 210. When an ASSERT signal is sent to the processor-RST register 214, the client processor 202 is initialized. A new application program is loaded into the memory 211 from the host processor 201 during a reset-ASSERT period, so that a switch to the new application can be made after a reset-NEGATE signal.

The memory-allocation-RST register 215 is used for resetting allocation of the client processor 202 to the main memory space. When an ASSERT signal is sent to the memory-allocation-RST register 215, the memory-allocation circuit 212, which has allocated the client processor 202 to the main memory, is reset. An area where the client processor 202 is allocated is changed from an address space A to an address space B, for example as shown in FIG. 40, during a reset-ASSERT period. By doing so, communication between the host processor 201 and the client processor 202 can be conducted using a newly allocated area in the main memory after a reset-NEGATE signal. In this manner, reallocation of a memory area can be carried out in real-time so as to rearrange the main memory area in a manner convenient to the host processor 201.

The switches 204 and 205 are provided between the data bus 207 and one of the client processor 202 and the main memory 203, respectively, and is controlled by the memory-allocation circuit 212 of the client processor 202. A switch between the main memory 203 and the client processor 202 is made by using the switches 204 and 205 with respect to the host processor 201.

Figure 41:
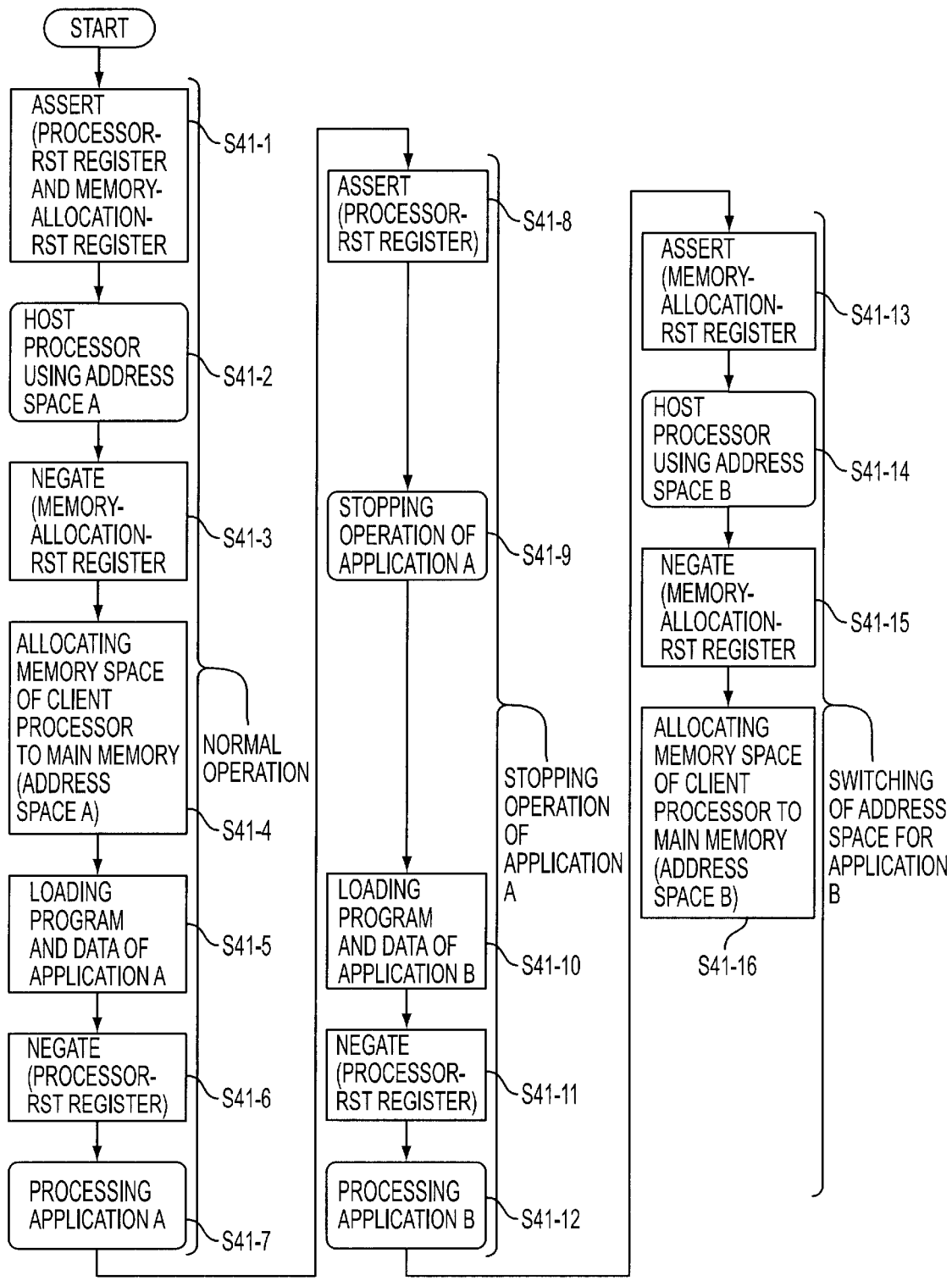
FIG. 41 is a flowchart showing an example of a process of controlling memory allocation and switching applications in the system of FIG. 40.

FIG. 41 is a flowchart showing an example of a process of controlling memory allocation and switching applications in the system of FIG. 40.

At steps S41-1 through S41-7, the memory 211 is allocated to the main-memory address space A during a period when the memory-allocation-RST register 215 is provided with an ASSERT signal, and a program and data of an application A are loaded while the processor-RST register 214 is receiving an ASSERT signal. In this manner, a memory area is allocated to the application A, and data processing can now commence.

At steps S41-8 through S41-12, a program and data of an application B are loaded while the processor-RST register 214 is provided with an ASSERT signal. In this manner, a switch from the application A to the application B can be carried out while the allocated memory area is retained.

At steps S41-13 through S41-16, the memory 211 is allocated to the main-memory address space B while the memory-allocation-RST register 215 is provided with an ASSERT signal. In this manner, the client processor 202 can be reallocated to another memory area which is convenient to the host processor 201 without initializing the application process.

As described above, the processor-RST register 214 for initializing the processor 210 of the client processor 202 and the memory-allocation-RST register 215 for initializing the memory-allocation circuit 212 are separately provided, so that the allocation of a memory area and the switching of applications can be conducted independently from each other.

In what follows, a description will be given with regard to a process of establishing synchronization between client processors or between the host processor and a client processor when a plurality of client processors are provided.

Figure 42:
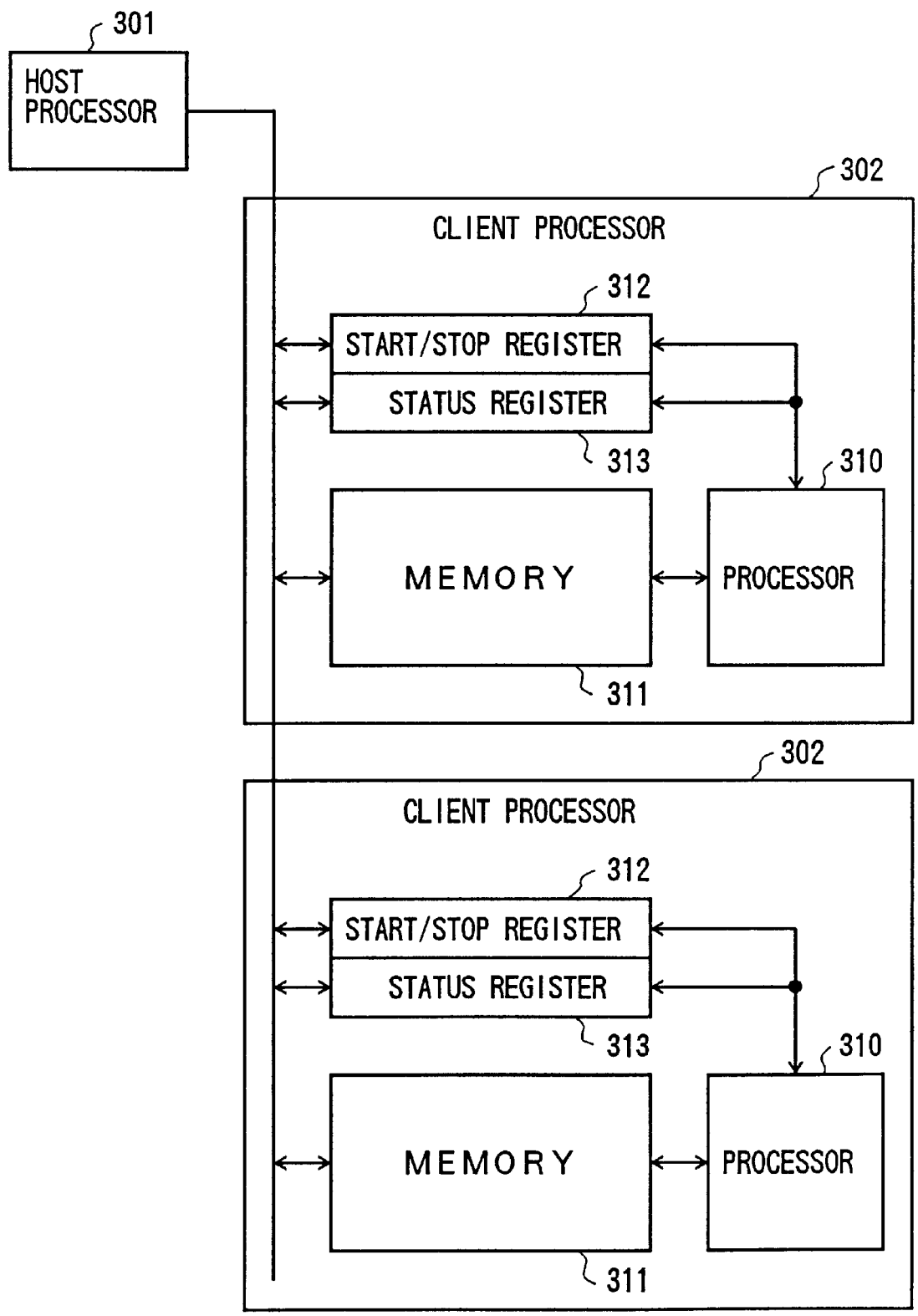
FIG. 42 is a block diagram of a system in which synchronization is established between client processors or between the host processor and a client processor.

FIG. 42 is a block diagram of a system in which synchronization is established between client processors or between the host processor and a client processor.

The system of FIG. 42 includes a host processor 301 and a plurality of client processors 302. The host processor 301 controls the client processors 302 allocated to a host-processor address space.

Each of the client processors 302 includes a processor 310, a memory 311, a start/stop resistor 312, and a status register 313.

The memory 311 is used as a venue to exchange data between the host processor 301 and the client processors 302.

The host processor 301 writes control information and data in an area which the host processor 301 allocated in the memory space. In response, the processor 310 receives the control information and the data to attend to data processing. Data obtained as a result of the processing is written in the memory 311, and is passed to the host processor 301.

The start/stop resistor 312 stores information which indicates the start or stop of operations of the processor 310. The start/stop resistor 312 is accessible for read/write operations from both the host processor 301 and the processor 310.

The status register 313 is set in synchronism with the start/stop resistor 312, and stores status information of the host processor 301 or status information of the client processor 302 at a time of the start or stop of operations of the client processor 302.

Assume that an application 1 and an application 2 are performed by the two client processors 302, respectively. In order to establish synchronization between the applications 1 and 2 by a unit of time or by a unit of processing, the host processor 301 simultaneously activates the two client processors 302 by referring to the start/stop resistor 312 and the status register 313 of the client processor 302. In this manner, synchronization can be established between different applications. Use of these registers also makes it possible to achieve synchronized operations between the host processor 301 and the client processors 302.

Figure 43A:
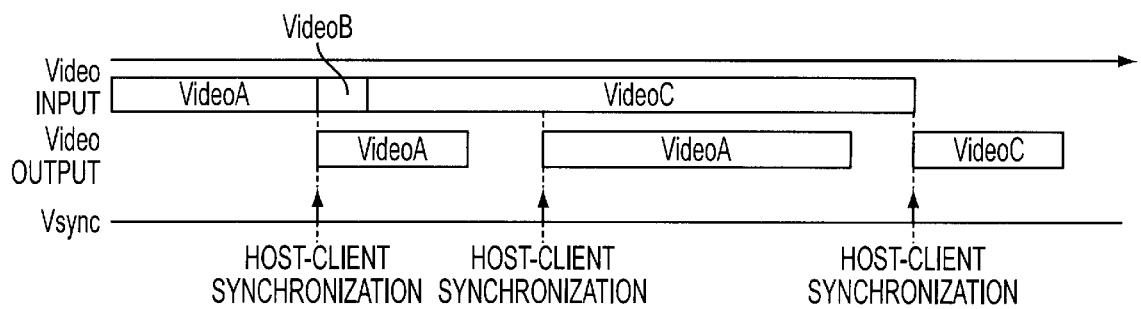
FIGS. 43A and 43B are charts showing an example of synchronized operations between a host processor and a client processor.
Figure 43B:
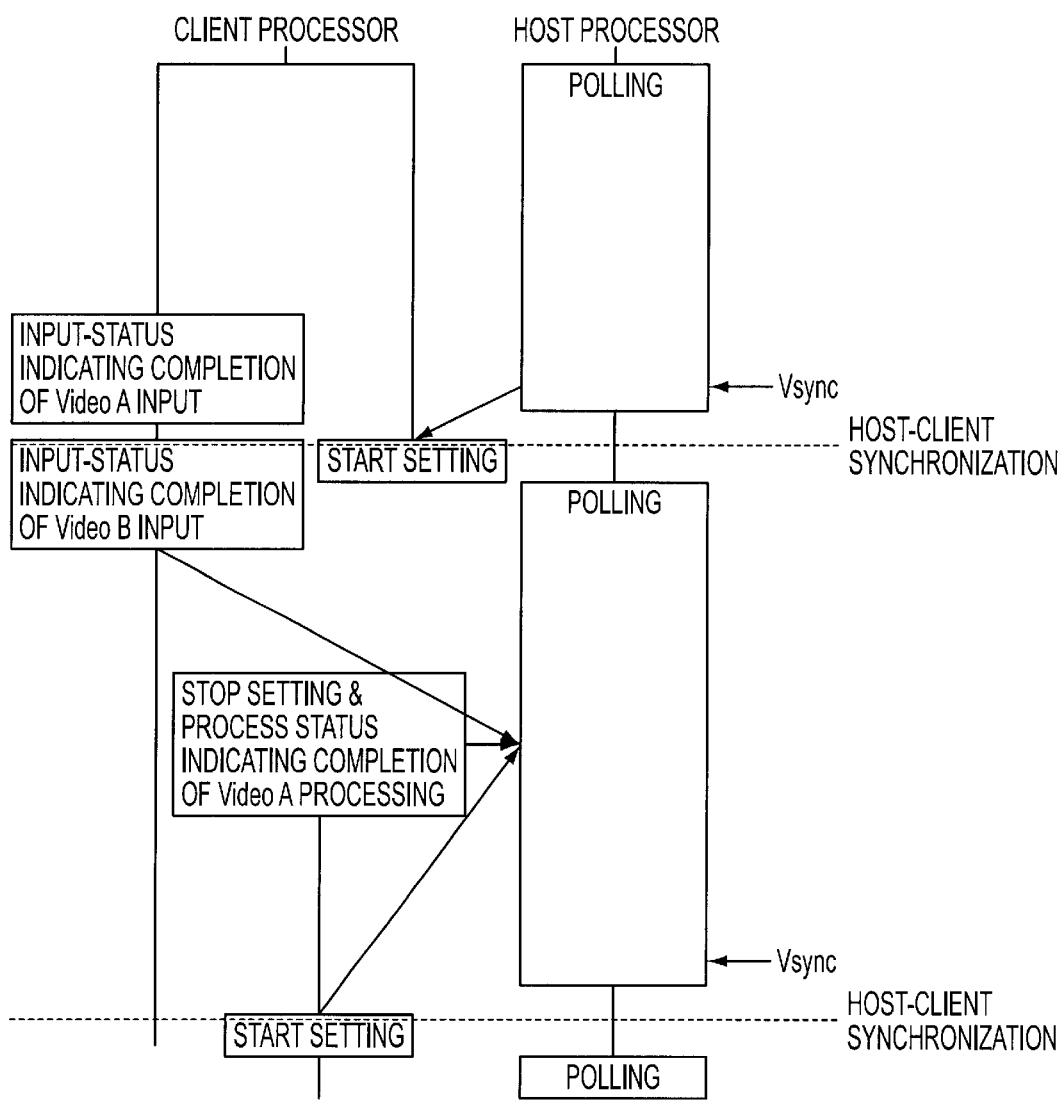

FIGS. 43A and 43B are charts showing an example of synchronized operations between a host processor and a client processor. FIG. 43A shows a timing chart of synchronized operations, and FIG. 43B shows details of the synchronized operations of the host processor and the client processor.

In an example shown in FIGS. 43A and 43B, data streams of video data VideoA, VideoB, and VideoC are supplied from an external network attached to the system, for example. The host processor 301 receives a video-synchronization signal Vsync. The host processor 301 controls the status of the video-synchronization signal Vsync by a unit of one frame, and activates a client processor 302. In doing so, the host processor 301 controls the start/stop resistor 312 and the status register 313 of the client processor 302 in order to control the client processor 302 based on a start setting, a stop setting (i.e., processing status indicating completion of current data processing), an input status indicating whether data for next processing is received, etc.

Figure 44A:
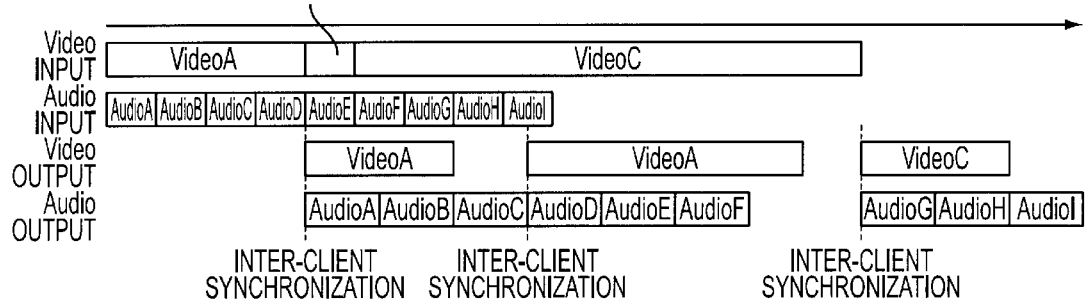
FIGS. 44A and 44B are charts showing an example of synchronized operations between client processors.
Figure 44B:
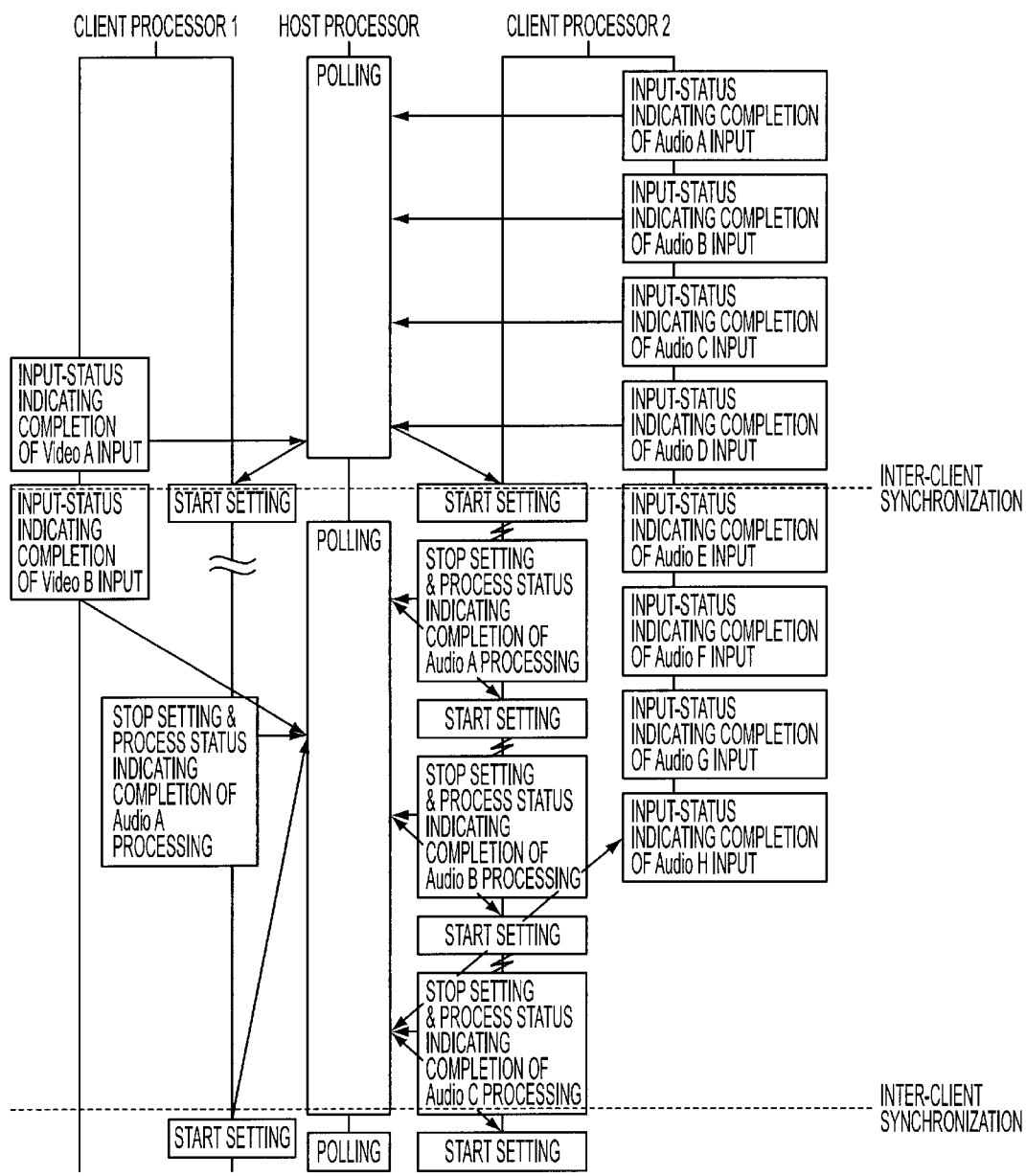

FIGS. 44A and 44B are charts showing an example of synchronized operations between client processors. FIG. 44A shows a timing chart of synchronized operations, and FIG. 44B shows details of the synchronized operations of the host processor and the client processors.

In an example shown in FIGS. 44A and 44B, data streams of video data VideoA, VideoB, and VideoC are supplied from an external network attached to the system, for example, and, further, data streams of audio data AudioA through AudioI are supplied. One of the two client processors 302 attends to processing of the video data VideoA through VideoC, for example, and the other performs the processing of the audio data AudioA through AudioI. The host processor 301 controls the start/stop resistor 312 and the status register 313 of the client processor 302 by a unit of one video frame in order to control the client processor 302 based on a start setting, a stop setting (i.e., processing status indicating completion of current data processing), an input status indicating whether data for next processing is received, etc.

The signal processing described in the above embodiments according to the present invention is not limited to processing of image data or audio data, but can be applied to another type of signal processing such as conversion of communication protocols.

Further, the present invention is not limited to these embodiments, but variations and modifications may be made without departing from the scope of the present invention.

What is claimed is:

1. A device for signal processing connected to an external bus, comprising:

information processing units; and communication links connected between said information processing units, wherein each of said information processing units comprises:

a signal processing unit processing data;

a first storage unit storing data and programs executed by said signal processing unit, said first storage unit directly connected to the external bus without any intervening elements therebetween and functioning as a memory for a host device connected to the external bus;

a second storage unit which functions as a work area for said signal processing unit, said second storage unit being separate from said first storage unit and not connected to the external bus; and a communication control unit communicating data with at least one other information processing unit via at least one of the communication links and connected to the first and the second storage units, the communication control unit comprising a first cache memory of the signal processing unit that stores the data received from the first storage unit and the data received via the communication links and a second cache memory of the signal processing unit that stores the data received via the communication links and used to exchange data with the other information processing units via the communication links.

2. The device as claimed in claim 1, wherein said information processing units are connected in series via said communication links.

3. The device as claimed in claim 2, wherein said first storage unit comprises:

a memory storing said data and said programs;

a memory control unit in communication with the memory and controlling said memory so that said memory is accessible by the host device using said external bus to write and read said data in and from the first storage unit.

4. The device as claimed in claim 3, wherein said memory control unit comprises a key-data storage unit for storing key information, and controls said memory so that said memory is accessible from said external bus only when data matching said key information is provided from said external bus.

5. The device as claimed in claim 2, wherein said information processing units process data in parallel.

6. The device as claimed in claim 2, wherein said information processing units process data through a pipe-line operation by successively passing data from one of said information processing units to another one of said information processing units via said communication links.

7. A device for signal processing, comprising:

information processing units;

communication links connected between said information processing units; and a shared bus connected to each of said information processing units, wherein each of said information processing units comprises:

a signal processing unit processing data;

a first storage unit storing data and programs executed by said signal processing unit, said first storage unit directly connected to the shared bus without any intervening elements therebetween and functioning as a memory for a host device connected to the shared bus;

a second storage unit which functions as a work area for said signal processing unit, said second storage unit being separate from said first storage unit and not connected to the shared bus; and a communication control unit communicating data with at least one other information processing unit via at least one of the communication links and connected to the first and the second storage units, the communication control unit comprising a first cache memory of the signal processing unit that stores the data received from the first storage unit and the data received via the communication links and a second cache memory of the signal processing unit that stores the data received via the communication links and used to exchange data with the other information processing units via the communication links.

8. The device as claimed in claim 1, wherein said information processing units are connected in series via said communication links.

9. A device as claimed in claim 8, wherein said first storage unit comprises:

a memory storing said data and said programs;

a memory control unit in communication with the memory and controlling said memory so that said memory is accessible by the host device using said shared bus to write and read said data in and from the first storage unit.

10. The device as claimed in claim 9, wherein said memory control unit comprises a key-data storage unit for storing key information, and controls said memory so that said memory is accessible from said shared bus only when data matching said key information is provided from said shared bus.

11. The device as claimed in claim 8, wherein said information processing units process data in parallel.

12. The device as claimed in claim 8, wherein said information processing units process data through a pipe-line operation by successively passing data from one of said information processing units to another one of said information processing units via said communication links.

13. The device as claimed in claim 8, further comprising a CPU which controls said information processing units via said shared bus and conducts data processing, wherein said information processing units execute an instruction when said instruction fetched by said CPU causes an instruction exception.

* * * * *

UNITED STATES PATENT AND TRADEMARK OFFICE
CERTIFICATE OF CORRECTION

PATENT NO.   : 6,470,380 B1
DATED        : October 22, 2002
INVENTOR(S)  : Hideki Yoshizawa et al.

It is certified that error appears in the above-identified patent and that said Letters Patent is hereby corrected as shown below:

Column 32,
Line 31, change "claim 1" to -- claim 7 --.

Signed and Sealed this

Twenty-ninth Day of April, 2003

JAMES E. ROGAN
*Director of the United States Patent and Trademark Office*